(12) United States Patent
Davis et al.

(10) Patent No.: US 10,668,978 B2
(45) Date of Patent: Jun. 2, 2020

(54) PEDAL WITH LOCKING AND UNLOCKING MECHANISM

(71) Applicant: Vectus Sport, San Jose, CA (US)

(72) Inventors: Gregory William Davis, San Jose, CA (US); Robert Edward Glaspie, Tehachapi, CA (US)

(73) Assignee: Vectus Sport, San Jose, CA (US)

( * ) Notice: Subject to any disclaimer, the term of this patent is extended or adjusted under 35 U.S.C. 154(b) by 0 days.

(21) Appl. No.: 16/366,986

(22) Filed: Mar. 27, 2019

(65) Prior Publication Data

US 2019/0384346 A1 Dec. 19, 2019

Related U.S. Application Data

(63) Continuation of application No. 16/011,368, filed on Jun. 18, 2018, and a continuation-in-part of application No. 16/011,130, filed on Jun. 18, 2018.

(51) Int. Cl.
    *B62M 3/08* (2006.01)

(52) U.S. Cl.
    CPC .............. *B62M 3/08* (2013.01); *B62M 3/083* (2013.01); *B62M 3/086* (2013.01)

(58) Field of Classification Search
    CPC ........ B62M 3/08; B62M 3/083; B62M 3/086; B62M 3/10; B62M 3/00
    See application file for complete search history.

(56) References Cited

U.S. PATENT DOCUMENTS

| | | |
|---|---|---|
| 4,458,910 A | 7/1984 | Stillwagon |
| 4,488,453 A | 12/1984 | Drugeon et al. |
| 4,794,817 A | 1/1989 | Romano |
| 4,819,504 A | 4/1989 | Sampson |
| 4,856,365 A | 8/1989 | Romano |
| 4,889,010 A | 12/1989 | Ross |
| 4,922,786 A | 5/1990 | Romano |
| 4,969,373 A | 11/1990 | Good |
| 5,456,138 A | 10/1995 | Nutile et al. |
| 6,035,743 A | 3/2000 | Gapinski et al. |

(Continued)

FOREIGN PATENT DOCUMENTS

WO    WO 98/54047 A1    12/1998

OTHER PUBLICATIONS

PCT International Search Report and Written Opinion, PCT Application No. PCT/US2019/032042, dated Jul. 25, 2019, 13 pages.

(Continued)

*Primary Examiner* — Luis A Gonzalez
(74) *Attorney, Agent, or Firm* — Fenwick & West LLP

(57) ABSTRACT

Embodiments relate to a pedal system having a pedal coupled to a main drive shaft having a locked mode where the pedal does not rotate relative to the main drive shaft and a released mode where the pedal can rotate relative to the main drive shaft. In the locked mode, rotation of the pedal relative to the main drive shaft is prevented by a plunger that engages the main drive shaft. In the released mode, rotation of the pedal relative to the main drive shaft is enabled by having the plunger disengage from the main drive shaft. The pedal system is switchable between the locked and released modes. When a user's foot or footwear is engaging the pedal, the pedal is placed in the released mode, and when the user's foot or footwear is disengaged from the pedal, the pedal is placed in the locked mode.

20 Claims, 32 Drawing Sheets

(56) References Cited

U.S. PATENT DOCUMENTS

2006/0260434 A1 11/2006 Tseng
2011/0048165 A1 3/2011 Lee

OTHER PUBLICATIONS

PCT International Search Report and Written Opinion, PCT Application No. PCT/US18/38113, dated Sep. 17, 2018, 14 pages.
United States Office Action, U.S. Appl. No. 16/011,130, dated Apr. 15, 2019, 12 pages.

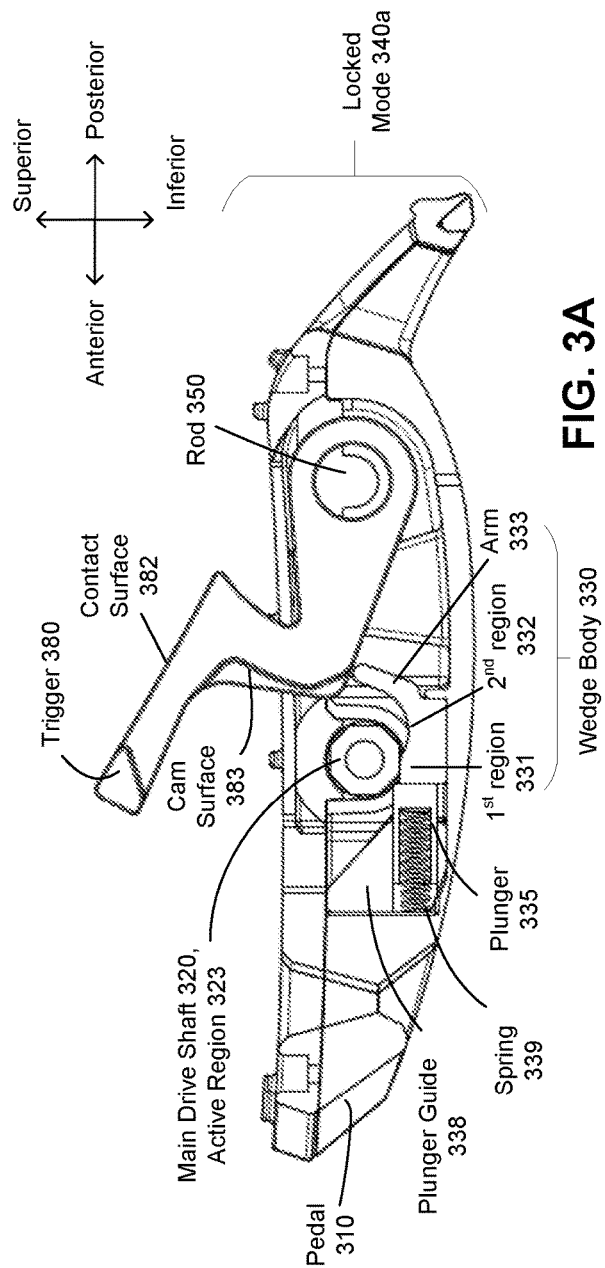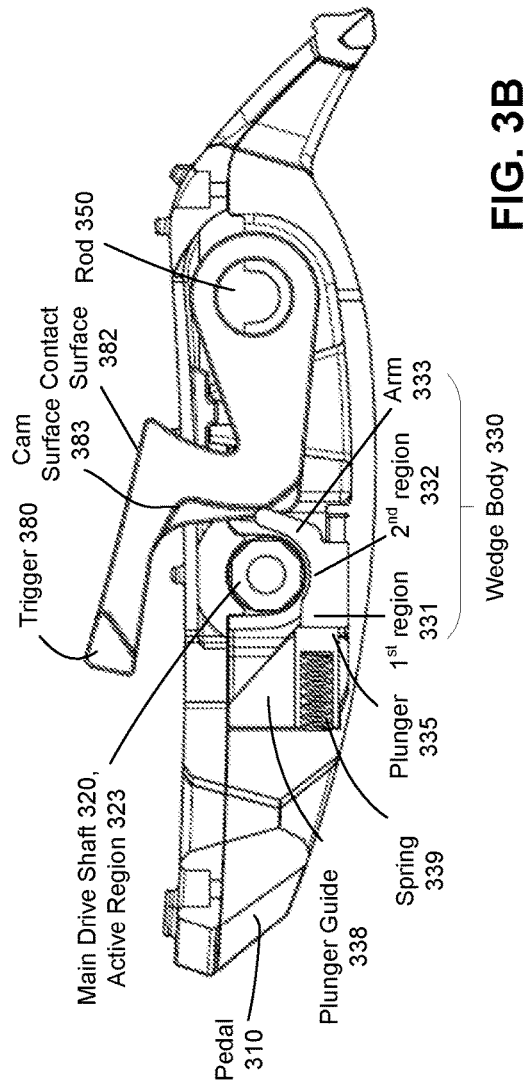
FIG. 3A
FIG. 3B

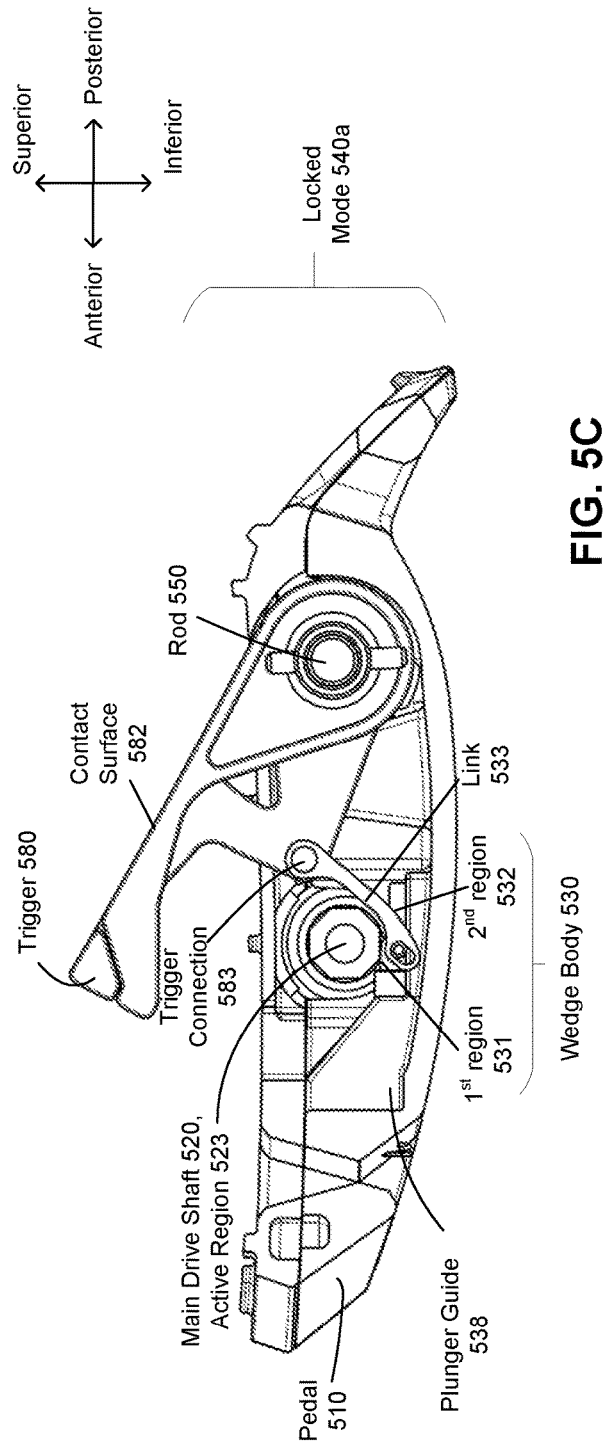
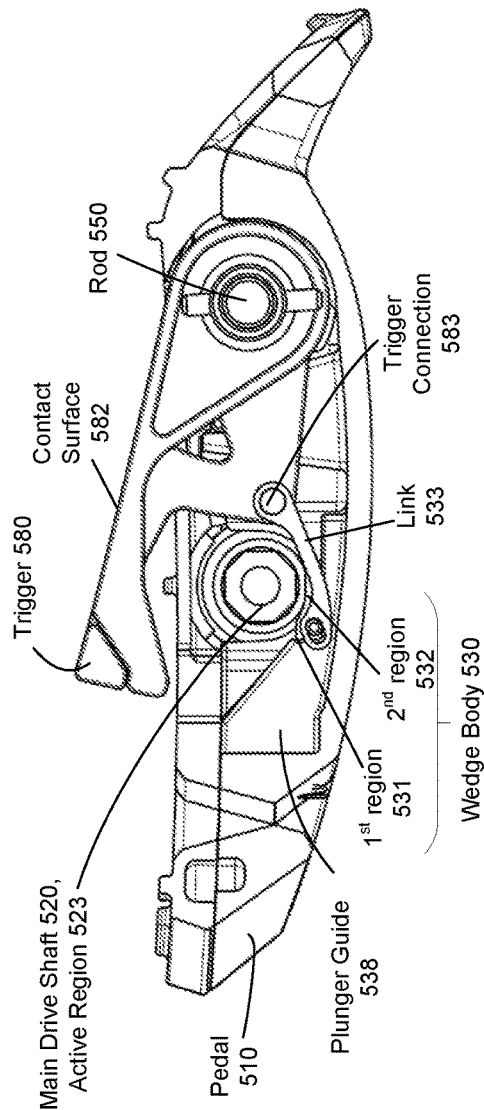
FIG. 5C
FIG. 5D

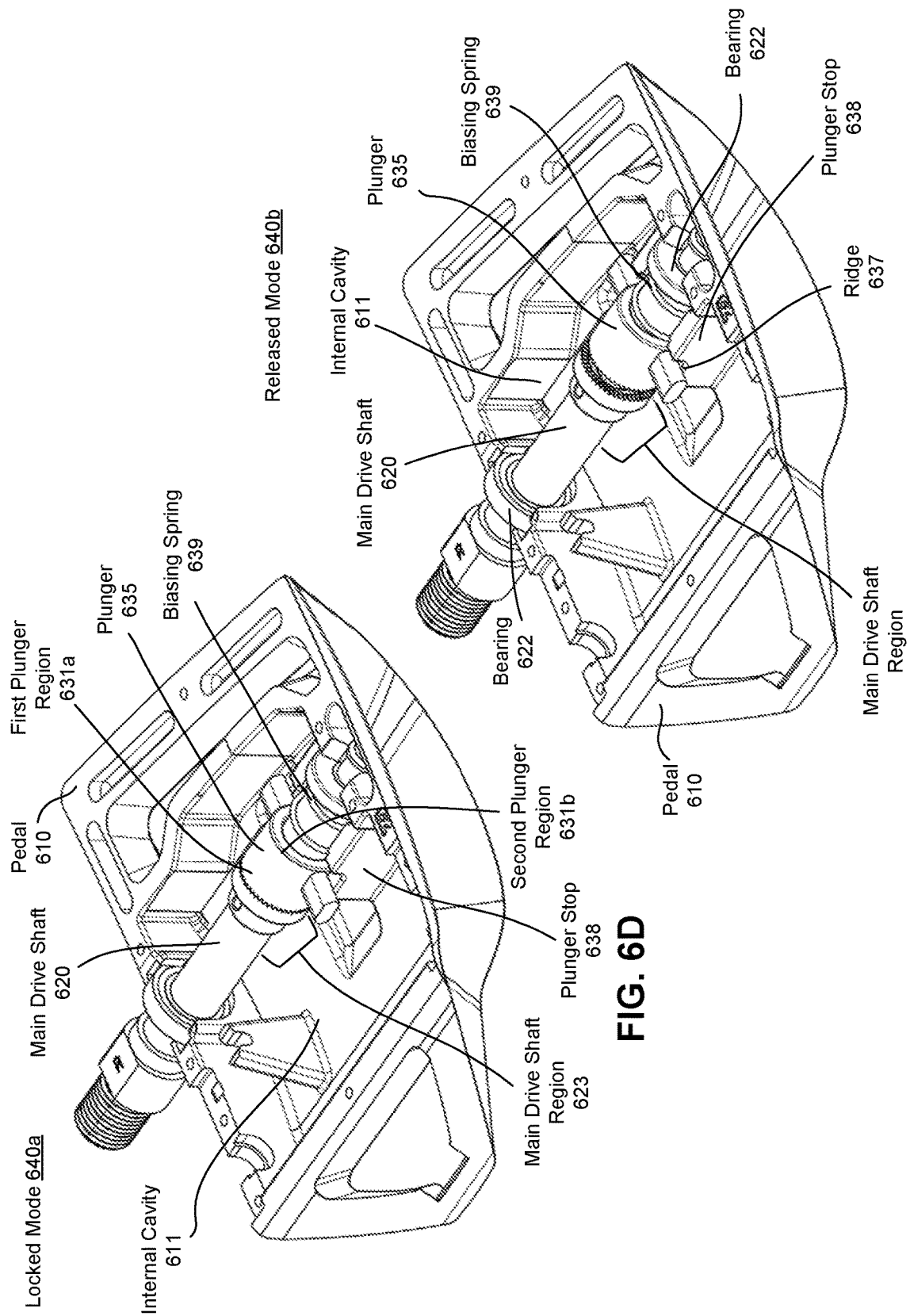

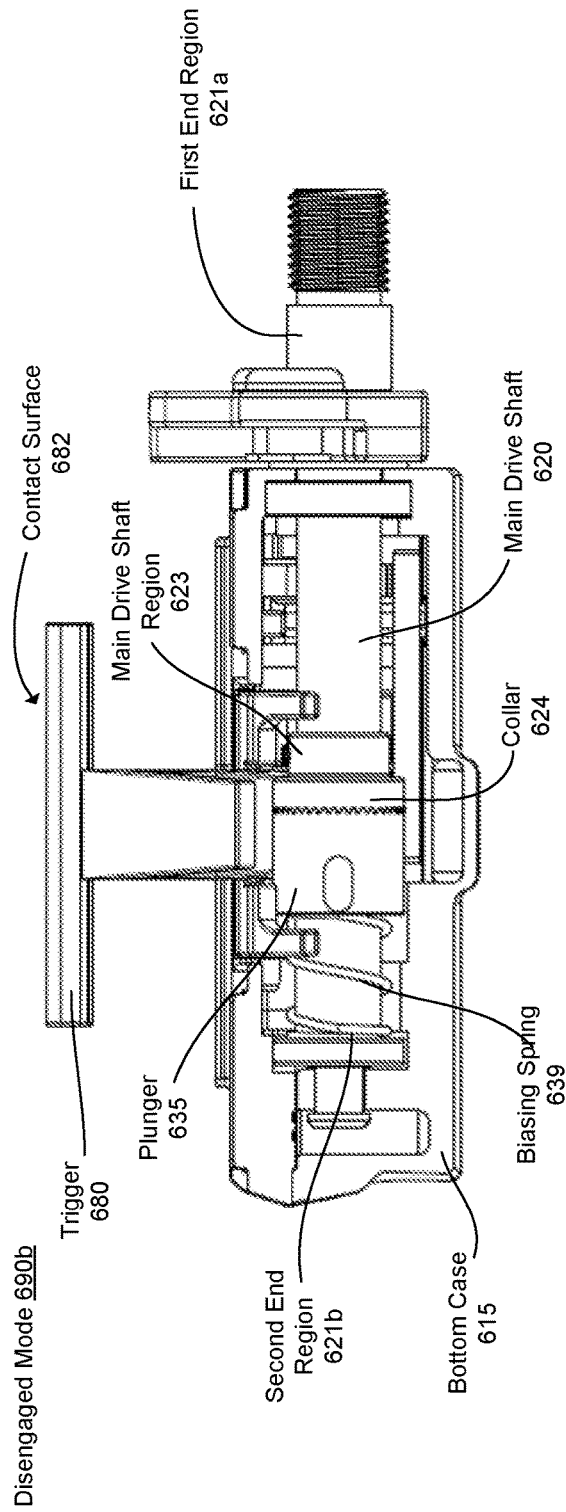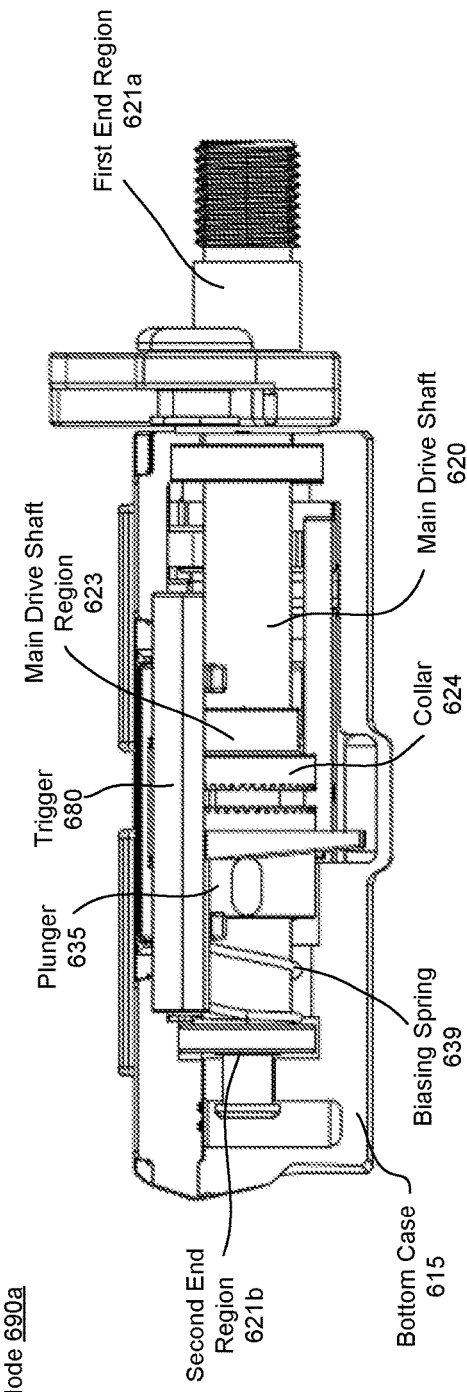

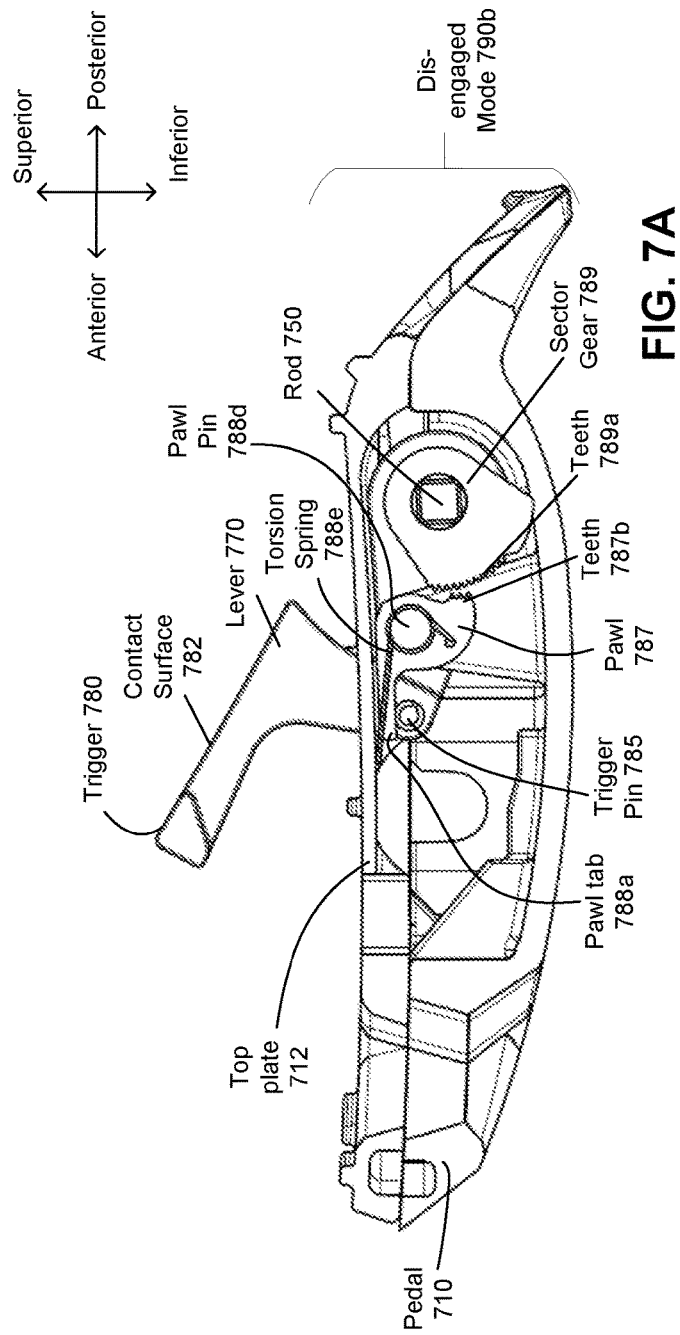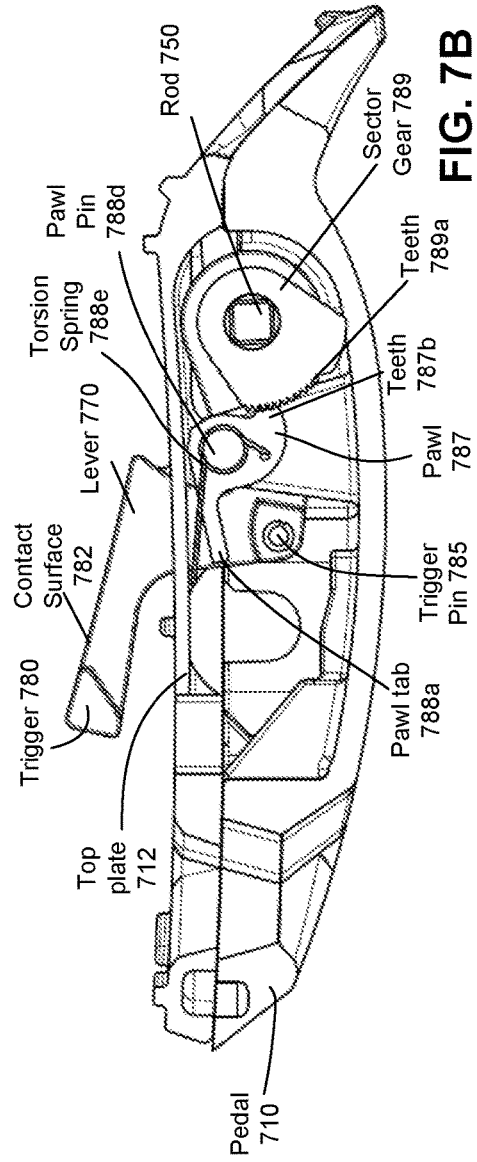
FIG. 7A
FIG. 7B

PEDAL WITH LOCKING AND UNLOCKING MECHANISM

CROSS REFERENCE TO RELATED APPLICATIONS

This application is a continuation-in-part application of co-pending U.S. application Ser. No. 16/011,368 entitled "PEDAL WITH CUFF LOCKING AND UNLOCKING MECHANISM," filed on Jun. 18, 2018, which is incorporated by reference herein in its entirety. This application is also a continuation-in-part application of co-pending U.S. application Ser. No. 16/011,130 entitled "PEDAL WITH LOCKING AND UNLOCKING MECHANISM," filed on Jun. 18, 2018, which is incorporated herein by reference in its entirety.

BACKGROUND

The present disclosure generally relates to foot pedals, and more particularly, to a foot pedal with cuff for engaging and retaining a user's foot or footwear while the user performs an activity.

Pedals, such as pedals on bicycles, exercise equipment, or transportation vehicles, function to support a user's feet while the user performs an activity. Some pedals can also, in combination with specialized footwear, function to retain a user's feet during performance of an activity, especially when the activity involves fine control of forces applied by the user's feet. Current pedals systems, however, are limited in many ways, such as requiring customized footwear, preventing a user from disengaging at critical moments, and/or lack mechanisms that facilitate engagement of the pedals by a user. Especially, failure to disengage at critical moments may lead to the user's injury.

SUMMARY

Embodiments relate to a pedal secured to a main drive and switchable between a locked mode where the pedal does not rotate relative to the main drive shaft and a released mode where the pedal rotates relative to the main drive shaft. The main drive shaft adjoins to a platform (e.g., a crank arm of a bicycle) or another system. When the user's foot or footwear is engaging the pedal, the pedal is placed in a released mode whereas when the user's foot or footwear is disengaged from the pedal, the pedal is placed in a locked mode.

In one or more embodiments, when placed in the locked mode, rotation of the pedal relative to the main drive shaft is prevented by a plunger that engages the main drive shaft. When placed in the released mode, rotation of the pedal relative to the main drive shaft is enabled by having the plunger disengage from the main drive shaft.

Embodiments also relate to a rod secured to the pedal in a rotatable manner and a cuff coupled to the rod to support retention of the user's foot or footwear in a manner that supports feet of different sizes and form factors. A lever may be coupled to the rod and exposed through the top surface of the pedal. The lever and the cuff may retain the user's foot or footwear at the top surface of the pedal in an engaged mode and release the user's foot or footwear from the top surface in a disengaged mode. The system can also include a trigger coupled to the rod where the trigger causes locking of a position of the cuff in the engaged mode and causes unlocking of the position of the cuff in the disengaged mode, thereby allowing the user to release his or her feet from the system in an efficient and intuitive manner. As such, one or more embodiments of a method implemented by the system can include transitioning a cuff to a foot retention mode upon engaging a rod coupled to the cuff, locking the cuff in the foot retention mode, and transitioning the cuff to a foot releasing mode upon unlocking the cuff and allowing the cuff to be released from the foot retention mode.

BRIEF DESCRIPTION OF THE DRAWINGS

FIG. 3A depicts a cross sectional view of the pedal system of FIGS. 2A and 2B in a locked mode, in accordance with one embodiment.

FIG. 3B depicts a cross sectional view of the pedal system of FIGS. 2A and 2B in a transitional state, in accordance with one embodiment.

FIG. 5C depicts a cross sectional view of the pedal system of FIGS. 5A-5B in a locked mode, in accordance with one embodiment.

FIG. 5D depicts a cross sectional view of the pedal system of FIGS. 5A-5B in a transitional state, in accordance with one embodiment.

FIG. 6D illustrates a perspective view of the embodiment of the pedal system shown in FIG. 6A with a main drive shaft in a locked mode, in accordance with one embodiment.

FIG. 6E illustrates a perspective view of the pedal system of FIG. 6D with the main drive shaft in a released mode, in accordance with one embodiment.

FIG. 6N illustrates a cross sectional view of the embodiment of the pedal system shown in FIG. 6A with a trigger disengaged, in accordance with one embodiment.

FIG. 6O illustrates a cross sectional view of the alternative embodiment of the pedal system shown in FIG. 6A with a trigger engaged, in accordance with one embodiment.

FIG. 7A depicts a cross sectional view of the pedal system of FIGS. 2A and 2B in a disengaged mode, in accordance with one embodiment.

FIG. 7B depicts a cross sectional view of the pedal system of FIGS. 2A and 2B in a transitional state, in accordance with one embodiment.

DETAILED DESCRIPTION

Figure 1A:
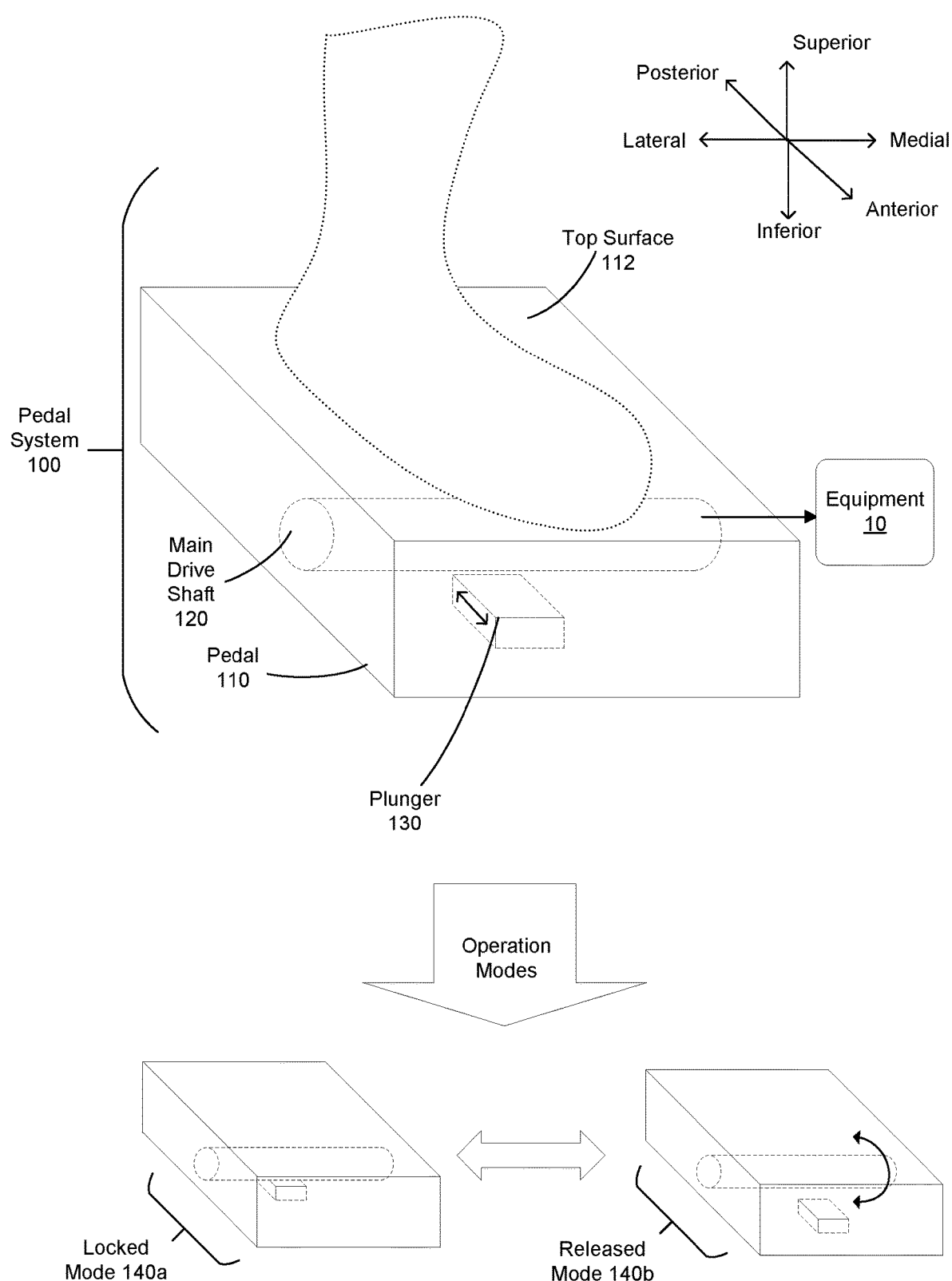
FIG. 1A is a schematic diagram illustrating operating components of a pedal system, in accordance with one embodiment.

Embodiments relate to a pedal system having a pedal coupled to a main drive shaft having a locked mode where the pedal does not rotate relative to the main drive shaft and a released mode where the pedal can rotate relative to the main drive shaft. When placed in the locked mode, rotation of the pedal relative to the main drive shaft can be prevented by a plunger that engages the main drive shaft. When placed in the released mode, rotation of the pedal relative to the main drive shaft can be enabled by having the plunger disengage from the main drive shaft. The pedal system is switchable between the locked and released modes in response to engagement by a user's foot or footwear. When a user's foot or footwear is engaging the pedal, the pedal is placed in the released mode, and when the user's foot or footwear is disengaged from the pedal, the pedal is placed in the locked mode. The pedal system thus allows the user to easily engage the pedal to perform an activity.

Embodiments relate to a pedal system having a cuff for retaining a foot or footwear at the pedal in a manner that supports different sizes and form factors of feet or footwear. The pedal system has a rod secured to a pedal in a rotatable manner and the cuff is coupled to the rod. A lever may be coupled to the rod in a manner where engagement of the lever by the user's foot or footwear affects the rod and thus, a position of the cuff relative to the user's foot or footwear. The lever and the cuff may retain the user's foot or footwear at the pedal in an engaged mode and release the user's foot or footwear from the top surface in a disengaged mode. The pedal system is switchable between the engaged mode and the disengaged mode.

The pedal system may also include a trigger that causes locking of a position of the cuff in the engaged mode and causes unlocking of the position of the cuff in the disengaged mode, thereby allowing the user to release his or her feet from the system in an efficient and intuitive manner. As such, one or more embodiments of a method implemented by the system can include transitioning a cuff to a foot retention mode upon engaging a rod coupled to the cuff, locking the cuff in the foot retention mode, and transitioning the cuff to a foot releasing mode upon unlocking the cuff and allowing the cuff to be released from the foot retention mode.

Embodiments of the pedal system(s) described herein can function to support a user's feet while the user performs an activity associated with applications involving rotational movement such as with bicycles, or non-rotational (static) activity such as with certain types of exercise equipment (like rowing machines), or transportation vehicles. Embodiments of systems and methods described herein can additionally or alternatively function to, without customized footwear, retain a user's feet during performance of an activity, especially when the activity involves fine control of forces applied by the user's feet. Embodiments of systems and methods described herein can additionally or alternatively allow a user to disengage such systems during critical moments, thereby preventing injury, and/or provide mechanisms that facilitate engagement of the pedals by a user.

FIG. 1A is a schematic diagram illustrating operating components of a pedal system 100, in accordance with one embodiment. The pedal system 100 may include, among other components, a pedal 110 having a top surface 112 that comes in contact with footwear (e.g., a sole region of footwear of a user), a main drive shaft 120 secured to the pedal in a rotatable manner, a plunger 130. The pedal 110 functions to support a user's foot and/or footwear as the user performs an activity associated with equipment or systems coupled to the pedal.

The pedal 110 can have top, bottom, and/or side surfaces, as described in relation to variations and examples in further detail below with reference to FIGS. 2A-2E. In particular, the pedal 110 can have a top surface 112 that receives and facilitates positioning of a foot or footwear of the user during operation. For example, the top surface 112 can have a surface morphology including recessed and/or protruding regions that complement a user's footwear morphology and/or a user's foot anatomy. The top surface 112 can additionally or alternatively include one or more openings associated with elements that promote engagement of the pedal system by a user and/or that enable operation modes associated with elements described in more detail below with reference to FIGS. 2A, 2D, 2E, 3A-3C, and 6A-6C.

In relation to supporting a user's footwear or foot, the top surface 112 can be a substantially planar surface, or can alternatively be defined by one or more splines (e.g., functions defined piecewise by polynomials and used for interpolating between points). As such, recessed and/or protruding aspects of the top surface 112 can be customized to a specific user's needs. The top surface 112 can additionally or alternatively include other suitable non-planar features. The top surface 112 can additionally or alternatively include non-curved features (e.g., edges, corners, etc.) associated with mounting or coupling to other system components.

The pedal 110 can additionally or alternatively have an internal cavity that contains and/or retains positions of other elements of the pedal system 100 with suitable degrees of freedom of rotation and/or translation. However, the pedal 110 can alternatively omit an internal cavity and provide a bulk substrate that supports other elements of the system 100 in any other suitable manner. As such, internal and/or external features of the pedal 110 can provide support to the user's footwear, foot, and/or other elements of the system 100.

In material composition, the pedal 110 can be composed of material having mechanical properties suitable for structurally supporting other elements and/or forces applied by the user's foot during performance of an activity. As such, the pedal 110 can have a tensile strength, a compressive strength, a shear strength, an elastic modulus, a hardness, a derivative of the above mechanical properties and/or other properties that enable structural support of other elements and resistance to deformation, in association with feature dimensions and operation modes described below. In variations, the pedal 110 can be composed of a metal (e.g., aluminum-based material, steel-based material, titanium-based material, etc.), polymer (e.g., high molecular weight polymer, etc.), or any other suitable material. Surface features of the pedal 110 can additionally or alternatively be treated, coupled to, or otherwise coated with materials that provide surface functionality. For instance, portions of the pedal 110 can be coated with a material (e.g., Teflon) that reduces friction in association with user engagement with or disengagement from the system, or portions of the pedal 110 can be coupled to a material that increases friction in association with retention of a position of footwear or a foot of a user at the pedal during use.

The main drive shaft 120, as shown in FIG. 1A, couples the pedal 110 to sports equipment (e.g., the crank arm of a bicycle or exercise bike) or components of a transportation system (e.g., motorcycle, moped, etc.). The main drive shaft 120 can also define a pitch axis of rotation about which the pedal 110 can rotate while the user performs an activity. As such, the main drive shaft 120 can be retained in position relative to the pedal 110 with a rotational degree of freedom about the pitch axis (e.g., by way of bearings, etc.). In one or more embodiments, the main drive shaft 120 can be retained within an internal cavity of the pedal 110, or can be coupled to any other suitable surface of the pedal 110.

In material composition, the main drive shaft 120 is can be composed of a material that is robust against bending stresses, torsional stresses, shear stresses, and fatigue (e.g., from cyclic loading) in relation to an activity performed by a user when interfacing with the system 100. However, the main drive shaft 120 can additionally be composed of a material robust against compressive and/or tensile stresses, or wear induced by engaging other elements of the system in the locked mode 140a and/or the released mode 140b, described in FIG. 1A and below with reference to FIGS. 3A-3C. The main drive shaft 120 can also be coated with, treated with, or include a material that reduces friction or wear (e.g., graphite, Teflon, polyethylene, lubricant, etc.) associated with motion of other elements in communication with the main drive shaft 120 during operation. In alternative embodiments, the main drive shaft 120 is composed of a metallic material (e.g., steel material) or other suitable material.

In coordination with operation of the plunger 130 described below with reference to FIG. 1A, the main drive shaft 110 can have one or more active regions that engage the plunger 130 in the locked mode 140a and disengage the plunger 130 in the released mode 140b. The active regions can be regions having morphological features and/or physically active features (e.g., magnetic features) that can be engaged to transition between physical modes.

The plunger 130 functions to move between an engaging position and a disengaging position relative to one or more regions of the main drive shaft 120 in order to transitioning between the locked mode 140a and the released mode 140b of the system 100. That is, the plunger 130 can thus transition between the engaging position, in which the plunger 130 interfaces with the main drive shaft 120 (e.g., at an active region of the main drive shaft 120), and the disengaging position, in which the plunger 130 is displaced away from the main drive shaft 120 (e.g., away from an active region of the main drive shaft 120). In relation to transitioning between positions, motion(s) of the plunger (e.g., in translation and/or rotation) can thus be constrained by one or more guides coupled to the pedal 110 and/or to the plunger 130, where an embodiment of a plunger guide is described in relation to FIGS. 2D and 2E. Furthermore, in relation to positions of the plunger 130 relative to the main drive shaft 120, the plunger 130 can include or otherwise be coupled to biasing elements (e.g., cam surfaces, springs under tension or compression, elastomeric elements under tension or compression, magnetic elements, etc.) that drive motion of the plunger 130 toward a desired state, or restore a position of the plunger 130 to a desired state. Additionally or alternatively, the plunger 130 is coupled to an actuator (e.g., linear actuator with or without an encoder) that enables positioning of the plunger 130 relative to the main drive shaft 120.

The plunger 130 may be located proximal to the main drive shaft 120 so that the plunger 130 can thus be retained within an internal cavity of the pedal 110. The plunger 130 may also be positioned at any other suitable surface of the pedal 100 that allows the plunger 130 to engage the main drive shaft 120 during operation.

In material composition, the plunger 130 may be composed of a material that is robust against shear stresses and compressive stresses in relation to an activity performed by a user when interfacing with the system 100. However, the plunger 130 can additionally be composed of a material robust against compressive and/or tensile stresses, or wear induced by engaging other elements of the system in the locked mode 140a and/or the released mode 140b, described below with reference to FIG. 1A The plunger 130 can also be coated with, treated with, or include a material that reduces friction or wear (e.g., graphite, Teflon, polyethylene, lubricant, etc.) associated with motion of other elements in communication with the plunger 130 during operation. In some embodiments, the plunger 130 is composed of a metallic material (e.g., steel material) or other suitable material.

In the locked mode 140a, a position of the pedal 110 is retained relative to the main drive shaft 120. The pedal 110 is placed in the locked mode 140 when a user initially engages the pedal 110 for performing an activity. In more detail, by placing the pedal 110 in the locked mode 140a, a stable surface (e.g., non-rotating surface) is provided by the pedal 110 so that the user can engage (e.g., step into) the pedal 110 prior to performing an activity. The pedal 110 is prevented from entering the locked mode 140a while the main drive shaft 120 is spinning (e.g., while the user is riding), such that the main drive shaft 120 cannot spin itself out of a connection with any associated equipment 10.

In the locked mode 140a, as shown in FIG. 1A, the plunger 130 engages the main drive shaft 120 to prevent rotation of the pedal relative to the main drive shaft. As such, in the locked mode 140a, transitioning of a region of the plunger 130 toward an active region of the main drive shaft 120 causes the plunger 130 to physically obstruct the main drive shaft 120 by providing a physical obstacle to rotational motion of the pedal 110 relative to the main drive shaft 120. Alternatively, in the locked mode 140a, a component of the plunger 130 can otherwise provide a force (e.g., magnetic force) that interacts with an active region of the main drive shaft 120 to prevent rotational motion of the pedal 110 relative to the main drive shaft 120.

In the released mode 140b, rotational motion of the pedal 110 relative to the main drive shaft 120 is allowed in a manner that a user is accustomed to while performing an activity. In the released mode 140b, as shown in FIG. 1A, the plunger 130 disengages the main drive shaft 120 to enable the pedal to rotate relative to the main drive shaft 120. As such, in the released mode 140b, transitioning of a region of the plunger 130 away from an active region of the main drive shaft 120 can appropriately remove a physical obstacle to rotational motion of the pedal 110 relative to the main drive shaft 120. Alternatively, in the released mode 140b, a component of the plunger 130 can otherwise remove or provide a force (e.g., interference or magnetic force) that interacts with an active region of the main drive shaft 120 to enable rotational motion of the pedal 110 relative to the main drive shaft 120.

Figure 1B:
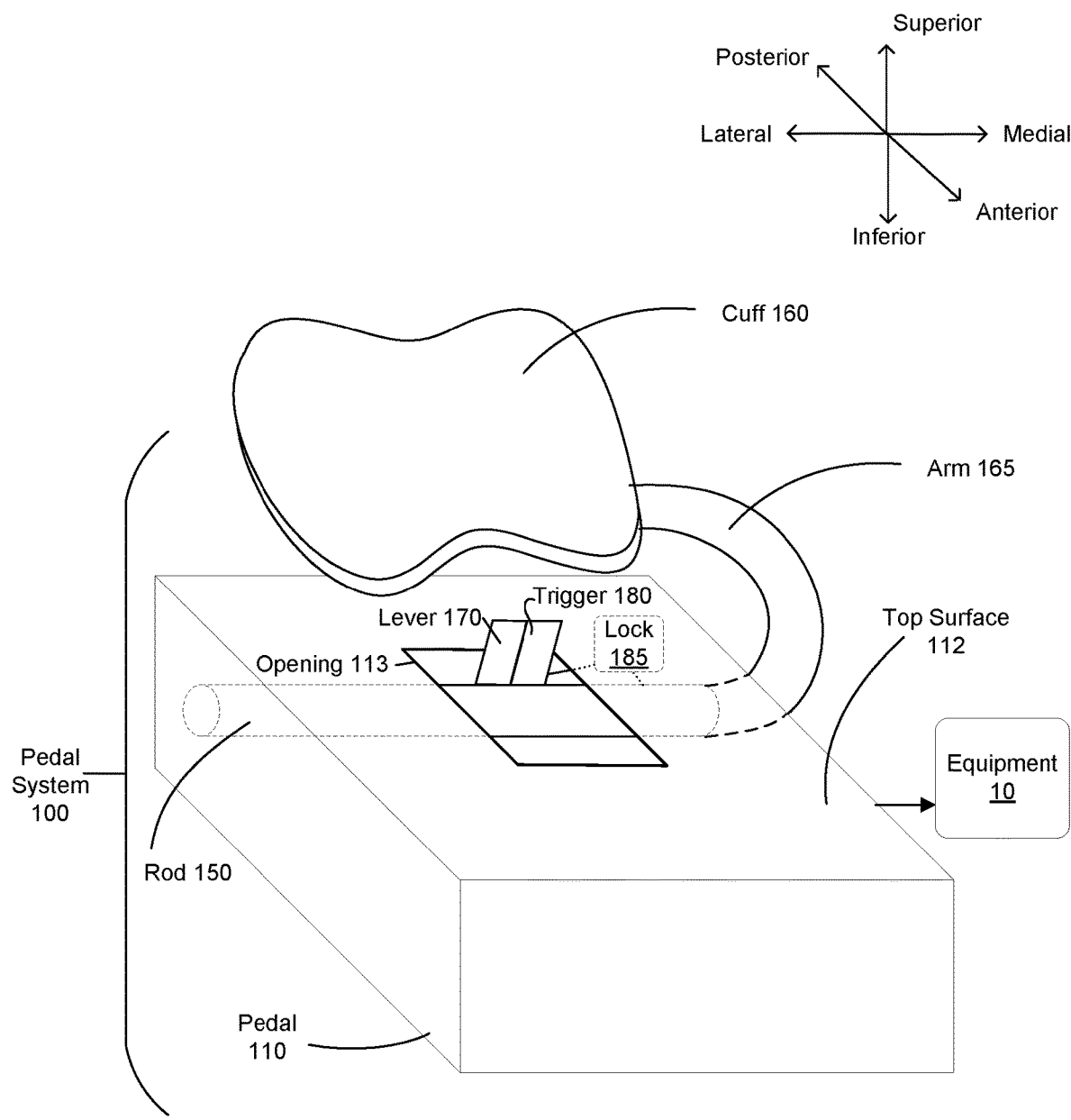
FIG. 1B is a schematic diagram illustrating a pedal system with a cuff, in accordance with one embodiment.

FIG. 1B is a schematic diagram illustrating a pedal system 100 with a cuff 160, in accordance with one embodiment. The pedal system 100 can additionally or alternatively include a rod 150 secured to the pedal 110 in a rotatable manner and the cuff 160 coupled to the rod 150. The cuff 160 supports retention of the foot or footwear of the user at the pedal 110 in a manner that is appropriate for different sizes and form factors of feet/footwear. The system 100 can also include a lever 170 coupled to the rod 150 and also exposed through the top surface 112 of the pedal 110. The lever 170, with the cuff 160, retains footwear at the top surface 112 of the pedal 110 in an engaged mode 190a and releases footwear from the top surface 112 in a disengaged mode 190b. The pedal system 100 can also include a trigger 180 interfacing with the rod 150 by a locking subsystem 185 having or corresponding to a lock and that causes locking of a position of the cuff 160 in the engaged mode 190a and to cause unlocking of the position of the cuff 160 in the disengaged mode 190b, thereby allowing the user to release his or her feet from the system in an efficient and intuitive manner.

The rod 150 functions to support other elements associated with the engaged mode 190a and the disengaged mode 190b, including the cuff 160, the lever 170, the trigger 180, and at least a portion of the locking subsystem 185. The rod 150 can also define an axis of rotation (e.g., an axis different from the pitch axis defined by the main drive shaft 120, an axis parallel to the pitch axis defined by the main drive shaft 120, etc.) about which one or more elements associated with the rod 150 can rotate in relation to transitioning between the engaged mode 190a and the disengaged mode 190b. As such, the rod 150 can be retained in position relative to the pedal 110 with a rotational degree of freedom about the axis (e.g., by way of bearings, etc.). In embodiments described below herein, the rod 150 can be retained within an internal cavity of the pedal 110 and displaced longitudinally from the main drive shaft 120 in order to prevent interference with rotation of the main drive shaft 120 during at least some modes of the system 100, or can alternatively be coupled to any other suitable surface of the pedal 110.

In material composition, the rod 150 can be composed of a material that is robust against bending stresses, torsional stresses, and shear stresses in relation to forces incurred within the rod 150 while a user interfaces with the system 100. However, the rod 150 can additionally be composed of a material robust against compressive and/or tensile stresses, or wear induced by engaging other elements of the system in the engaged mode 190a and/or the disengaged mode 190b, described below with reference to FIG. 1C. The rod can also be coated with, treated with, or include a material that reduces friction or wear (e.g., graphite, Teflon, polyethylene, lubricant, etc.) associated with motion of other elements in communication with the rod 150 during operation. In variations, the rod 190 can be composed of a metallic material (e.g., steel material) or other suitable material.

The cuff 160 functions to retain a user's foot or footwear at the pedal 110 in the engaged mode 190a and to enable release of the user's foot or footwear from the pedal 110 in the disengaged mode 190b. The cuff 160 can also function to robustly support the user's foot or footwear at the pedal 110 (e.g., with a compressive force provided by the cuff 160 and the pedal 110). As such, the cuff 160 can be composed of a material that has sufficient mechanical properties to reliably and repeatedly retain the user's foot or footwear at the pedal 110 over multiple uses of the pedal 110 and during cyclic loads applied to the cuff 160 and the pedal 110 during use. In material composition, the cuff 160 can be composed of a material that is robust against bending stresses, shear stresses, compressive stresses, tensile stresses, and fatigue, in relation to forces incurred at the cuff 160 while a user interfaces with the system 100. The cuff 160 can be composed of a polymeric material (e.g., plastic), metallic material, and/or another suitable material.

The cuff 160 can also function to provide comfort to the user as the user performs an activity, by inclusion of soft, resilient, and/or otherwise compliant materials that interface with the user's foot or footwear during operation of the system 100 in the engaged mode 190a. As such, portions of the cuff (e.g., portions of the cuff 160 facing the foot or footwear of the user) can be composed of a foam material, fabric material, polymer material, or any other suitable material. In one such variation, the cuff 160 can include a mechanically robust polymer base material, and be coupled to a compliant foam material at regions interfacing with the foot or footwear of the user.

In morphology, the cuff 160 can have a concave surface facing the user's foot or footwear, such that the concave surface is complementary to the shape of the foot or footwear of the user. The cuff 160 can, however, have any other suitable surface feature(s) that facilitate retention of the user's foot or footwear at the pedal 110 in a comfortable manner. For instance, the cuff 160 can have a closed medial side and an open lateral side that allows the user to rapidly and easily disengage the system 100 during critical moments. The cuff 160 can also have open anterior and posterior sides. The morphology of the cuff 160 may be appropriate to accommodate variations in user foot morphology (e.g., in terms of shoe size, in terms of width, etc.). In the engaged mode 190a described below with reference to FIG. 1C, the cuff 160 can span a cuneiform region of the user's foot; however, in other variations, the cuff 160 can additionally or alternatively include portions that span a metatarsal region or phalange region of the user's foot to provide adequate support to the user during performance of an activity.

The cuff 160 may be coupled to the rod 150, such that a force applied to the lever 170 described below with reference to FIG. 1B rotates the rod 150 and allows the cuff 160 to comfortably compress (e.g., with a desired amount of force) the user's foot or footwear between the top surface 112 of the pedal 110 and the cuff 160. Coupling between the cuff 160 and the rod 150 can be at a region of the rod outside of the body of the pedal 110 (e.g., at a portion of the rod 150 extending through a medial side wall of the pedal 110 and exterior to the pedal 110). Coupling between the cuff 160 and the rod 150 can alternatively be at a region of the rod 150 within the body of the pedal 110. As shown in FIG. 1B, the cuff 160 can be coupled to the rod 150 by an arm 165 coupled to a portion of the rod 150 extending through a medial side wall of the pedal 110 and exterior to the pedal 110, where the arm 165 transforms rotation of the rod 150 induced by the lever 170 into motion of the cuff along an inferior-superior direction, thereby retaining and releasing the foot of the user during different modes of operation.

The lever 170 functions to repeatedly and reversibly transition the cuff 160 between a configuration that retains the foot of the user and a configuration that releases the foot of the user, in association with the engaged mode 190a and the disengaged mode 190b. As shown in FIG. 1B, the lever 170 is coupled to the rod 150 and also exposed through the top surface 112 of the pedal 110 through an opening 113. The lever 170 thus may include a first lever region that is coupled to the rod (e.g., a portion of the rod within an internal cavity of the pedal 110), such that motion of the lever is coupled with rotation of the rod; however, the first lever region can alternatively be coupled to any other suitable portion of the rod. The lever 170 can also include a second lever region exposed through the opening 113, whereby the user can engage the second lever region, thereby inducing motion of the rod 150 in association with transitioning the system 110 between the engaged mode 190a and the disengaged mode 190b.

In morphology, the lever 170 can have a surface that contacts the foot or footwear of the user during the transition between the engaged mode 190a and the disengaged mode 190b, where the surface protrudes from the opening 113 in transitioning between the engaged mode 190a to the disengaged mode 190b, but is substantially flush with the opening in the engaged mode 190. As such, the user's foot can slide over and/or apply a torsional force to the rod 150 by way of the lever 170, in order to promote transitioning from the disengaged mode 190b to the engaged mode 190a of the system 100. The lever 170 can, however, have other morphologies, as shown and described below.

In material composition, the lever 170 can be composed of a material that is robust against torsional stresses, compressive stresses, and fatigue in relation to forces applied by the user's foot to the lever. The lever can additionally be composed of a material robust against other types of stresses. One or more surfaces of the lever 170 can also be coated with, treated with, or include a material that reduces friction or wear (e.g., graphite, Teflon, polyethylene, lubricant, etc.) associated with interfaces with the user's foot during operation. In variations, the lever 170 can be composed of a metallic material (e.g., steel material) or other suitable material.

The trigger 180 functions to cause locking of a position of the cuff 160 in the engaged mode 190a and to cause unlocking of the position of the cuff 160 in the disengaged mode 190b, thereby allowing the user to release his or her feet from the system in an efficient and intuitive manner and prevent trapping of the user's foot at the pedal when the user wishes to disengage the system 100. As shown in FIG. 1B, the trigger 180 is coupled to the rod 150 and also exposed through the top surface 112 of the pedal 110 through an opening 113. The trigger may thus include a first trigger region that is coupled to the rod (e.g., a portion of the rod within an internal cavity of the pedal 110); however, the first trigger region can alternatively be coupled to any other suitable portion of the rod 150. The trigger 180 can also include a second trigger region exposed through the opening 113, whereby the user can engage the second trigger region, in order to cause locking of the cuff 160 in position in the engaged mode 190a and/or to cause unlocking of the cuff 160 in the released mode 190b.

The first trigger region can be coupled to the rod 150, but capable of rotating independently about the rod 150, where additional examples of configurations between the first trigger region and the rod 150 are described in more detail below with reference to FIGS. 2D-2E and 3A-3C. The first trigger region can also include or be associated with another portion of the trigger 180 that interfaces with a locking subsystem 185, where the locking subsystem 185 promotes locking of a position of the rod 150, arm 165, or cuff 160 in the engaged mode 190a and rapidly releases locking of a position of the rod 150, arm 165, or cuff 160 in the disengaged mode 190b. An example of the locking subsystem 185 is described in more detail below with reference to FIGS. 7A-6C and 7A7B.

In morphology, the trigger 180 can have a surface that contacts the foot or footwear of the user during the transition between the engaged mode 190a and the disengaged mode 190b, where the surface protrudes from the opening 113 in transitioning between the engaged mode 190a to the disengaged mode 190b, but is substantially flush with the opening in the engaged mode 190. As such, the user's foot can slide over and/or apply a torsional force to the trigger 180 in order to promote locking of the cuff 160 in the engaged mode 190a and/or slide away from the trigger 180 to quickly release locking of the cuff 160 in the disengaged mode 190b of the system. The trigger 180 can, however, have other morphologies, as shown and described below.

Motion of the trigger 180 can be coupled with motion of the lever 170 in transitioning from the disengaged mode 190b to the engaged mode 190a, such that the cuff 160 is simultaneously moved into position by the lever 170 and caused to lock in position by the trigger 180 as the user initiates performance of the activity involving the pedal 110. Motion of the trigger 180 can also be uncoupled with motion of the lever 170 in transitioning from the engaged mode 190a to the disengaged mode 190b, such that the position of the cuff 160 can be rapidly unlocked by the trigger 180 prior to release of the lever 170 and cuff 160 as the user attempts release from the system 100.

In material composition, the trigger 180 can be composed of a material that is robust against torsional stresses, compressive stresses, and fatigue in relation to forces applied by the user's foot to the trigger. However, the trigger 180 can additionally be composed of a material robust against other types of stresses. One or more surfaces of the trigger 180 can also be coated with, treated with, or include a material that reduces friction or wear (e.g., graphite, Teflon, polyethylene, lubricant, etc.) associated with interfaces with the user's foot during operation. In some embodiments, the trigger 180 can be composed of a metallic material (e.g., steel material) or other suitable material.

Figure 1C:
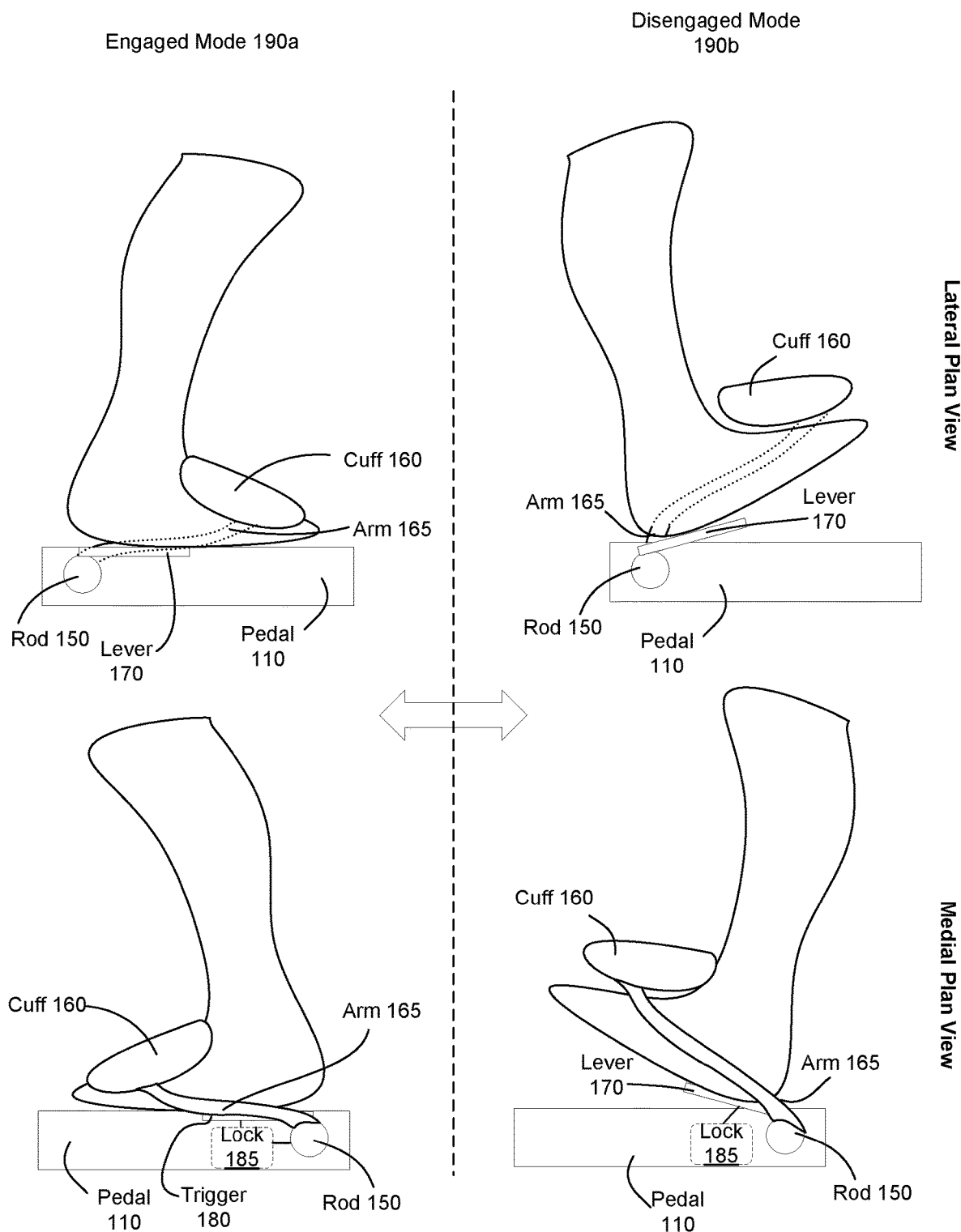
FIG. 1C depicts operation modes of the pedal system shown in FIGS. 1A and 1B, in accordance with one embodiment.

FIG. 1C depicts operation modes of the pedal system shown in FIGS. 1A and 1B, in accordance with one embodiment, and in particular, depicts an embodiment of the pedal system 100 in an engaged mode 190a and a disengaged mode 190b.

In the engaged mode 190a, the user's foot is retained in position at the pedal 110 with a desired level of force, such that the user can adequately perform the activity associated with the pedal 110. In the engaged mode 190a, as shown in FIG. 1C (top left, lateral plan view), the user's foot applies a torsional force to the rod 150 through the lever 170, thereby rotating the cuff 160 (due to coupling of the lever 170 to the rod 150 and the cuff 160 to the rod 150 by arm 165) and positioning the foot between the pedal 110 and the cuff 160. In the engaged mode 190a, as shown in FIG. 1C (bottom left, medial plan view), the locking subsystem 185 is also engaged, such that the cuff 160 is substantially locked in position by engagement of trigger 180 by the foot of the user.

In the disengaged mode 190b, the user's foot is released from the pedal 110, such that the user can rapidly disengage the pedal 110 when desired. In the disengaged mode 190b, as shown in FIG. 1C (top right, lateral plan view), the user's foot releases (or otherwise eliminates) a torsional force applied to the rod 150 through the lever 170, thereby rotating the cuff 160 (due to coupling of the lever 170 to the rod 150 and the cuff 160 to the rod 150 by arm 165) and allowing the foot to be released from the pedal 110. In the disengaged mode 190b, as shown in FIG. 1C (bottom right, medial plan view), the locking subsystem 185 is also disengaged by rotation of the trigger 180, such that the cuff 160 is substantially unlocked from a position that would retain the foot of the user.

In relation positions of elements of the system involved in transitioning between the engaged mode 190a and the disengaged mode 190b, elements can include or otherwise be coupled to biasing elements (e.g., torsional springs under tension or compression, cam surfaces, linear springs under tension or compression, elastomeric elements under tension or compression, magnetic elements, etc.) that drive motion of the cuff 160 or locking subsystem 185 toward a desired state, or restore a position of the cuff 160 or locking subsystem 185 to a desired state. Variations of systems including springs for restoring the system 100 to a disengaged mode 190b are described below with reference to FIGS. 2A-2E and 3A-3C. Additionally or alternatively, one or more elements can be coupled to an actuator (e.g., linear actuator with or without an encoder) that enables positioning of elements relative to the rod 150 in any other suitable manner.

Figure 2A:
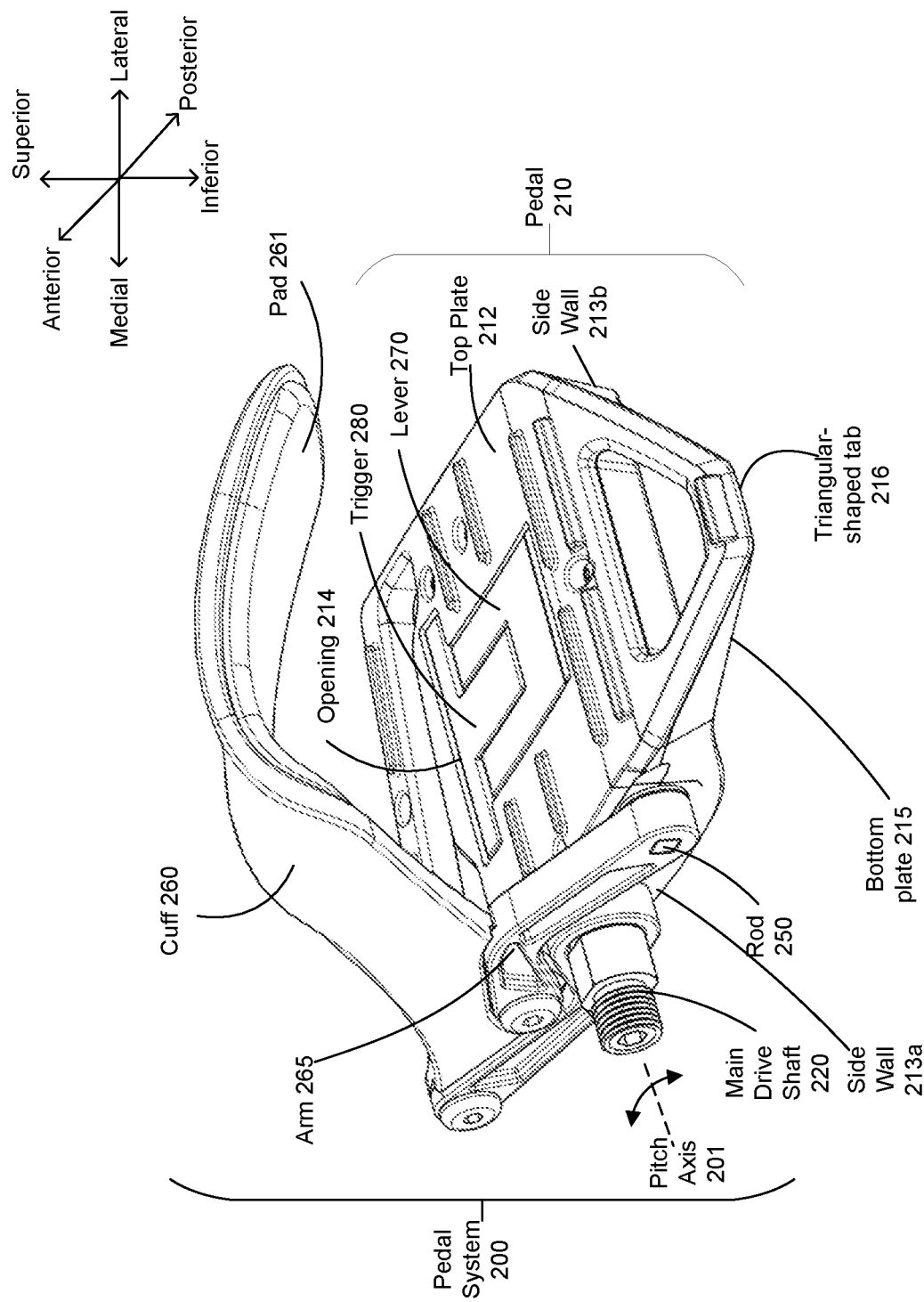
FIG. 2A depicts a perspective view of a pedal system, in accordance with one embodiment.
Figure 2B:
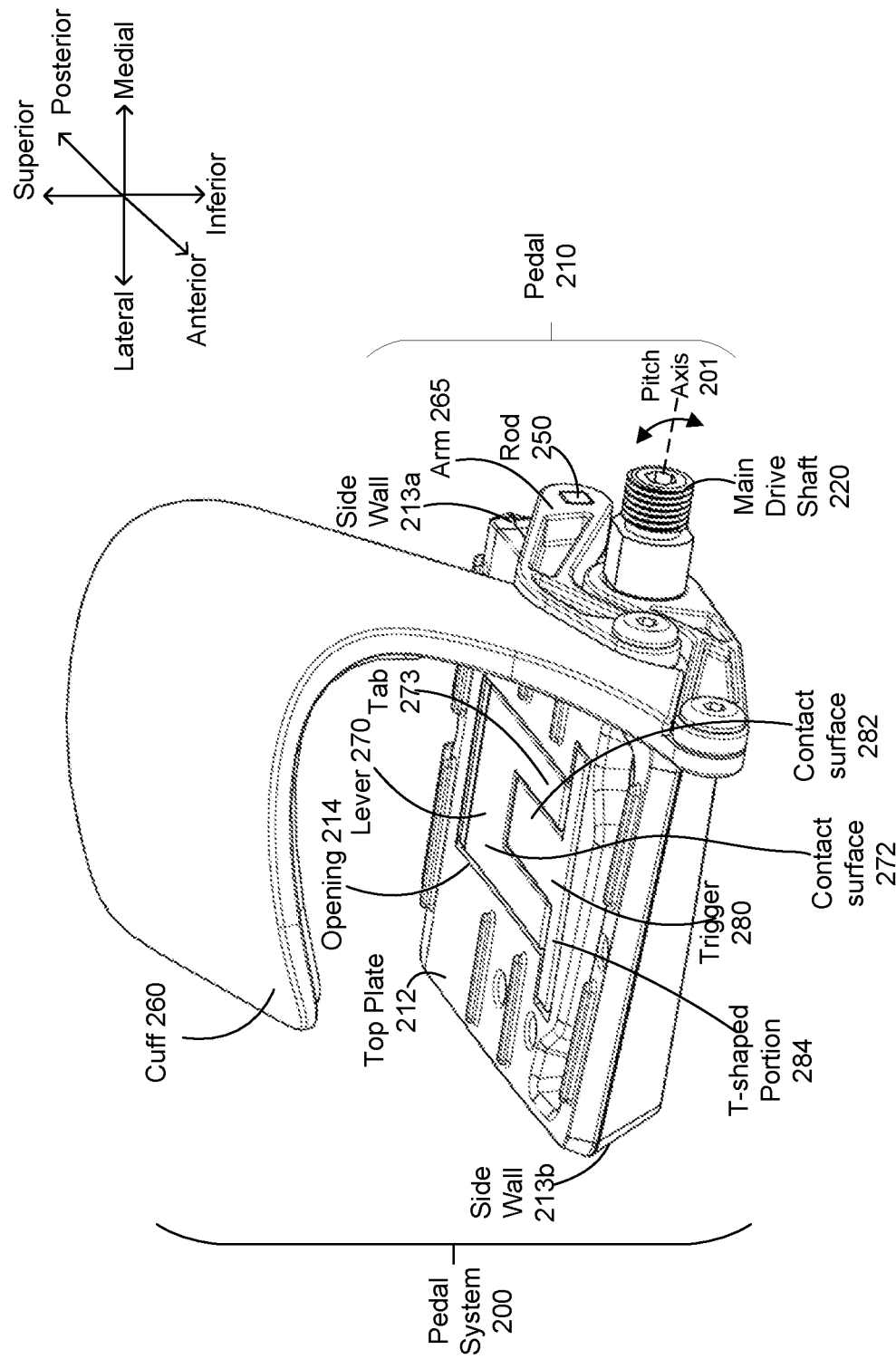
FIG. 2B depicts another perspective view of the pedal system shown in FIG. 2A, in accordance with one embodiment.
Figure 2C:
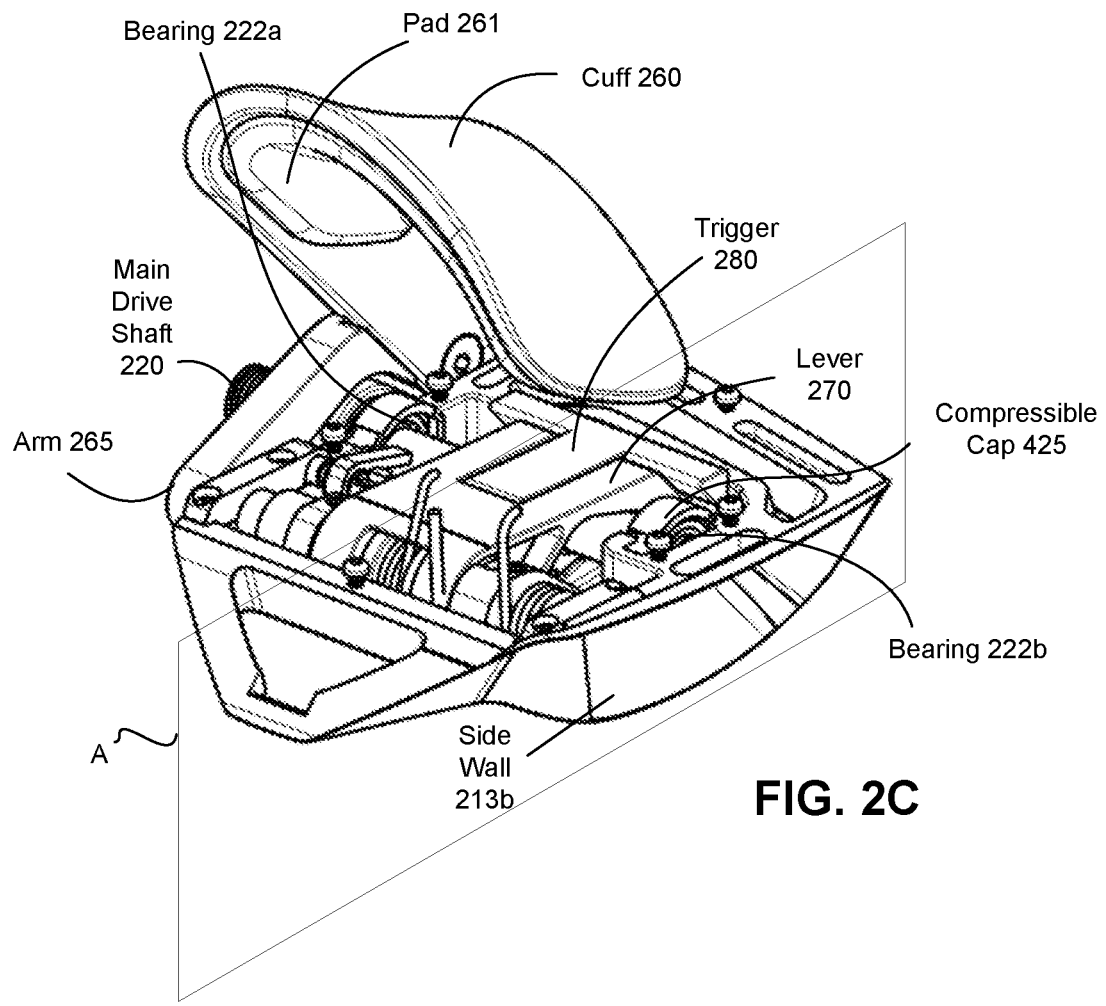
FIG. 2C depicts a perspective view of the pedal system of FIG. 2A with a top plate removed, in accordance with one embodiment.
Figure 2D:
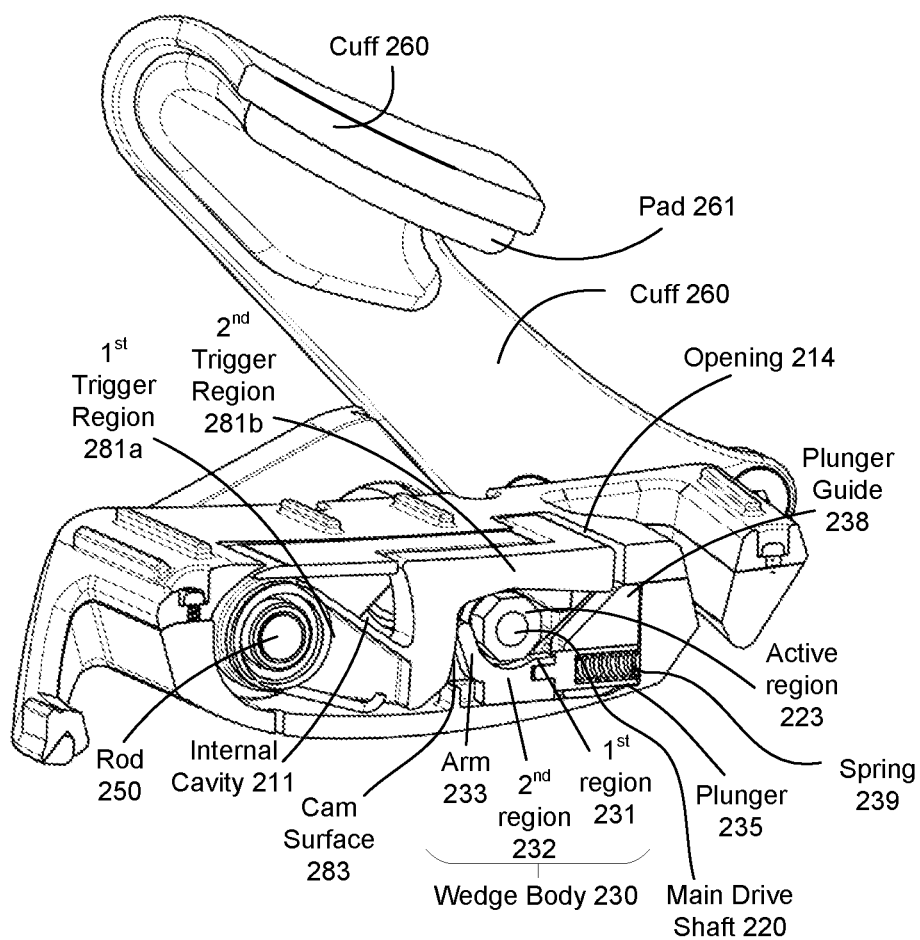
FIG. 2D is a perspective view of the pedal system of FIG. 2A cut along plane A, in accordance with one embodiment.
Figure 2E:
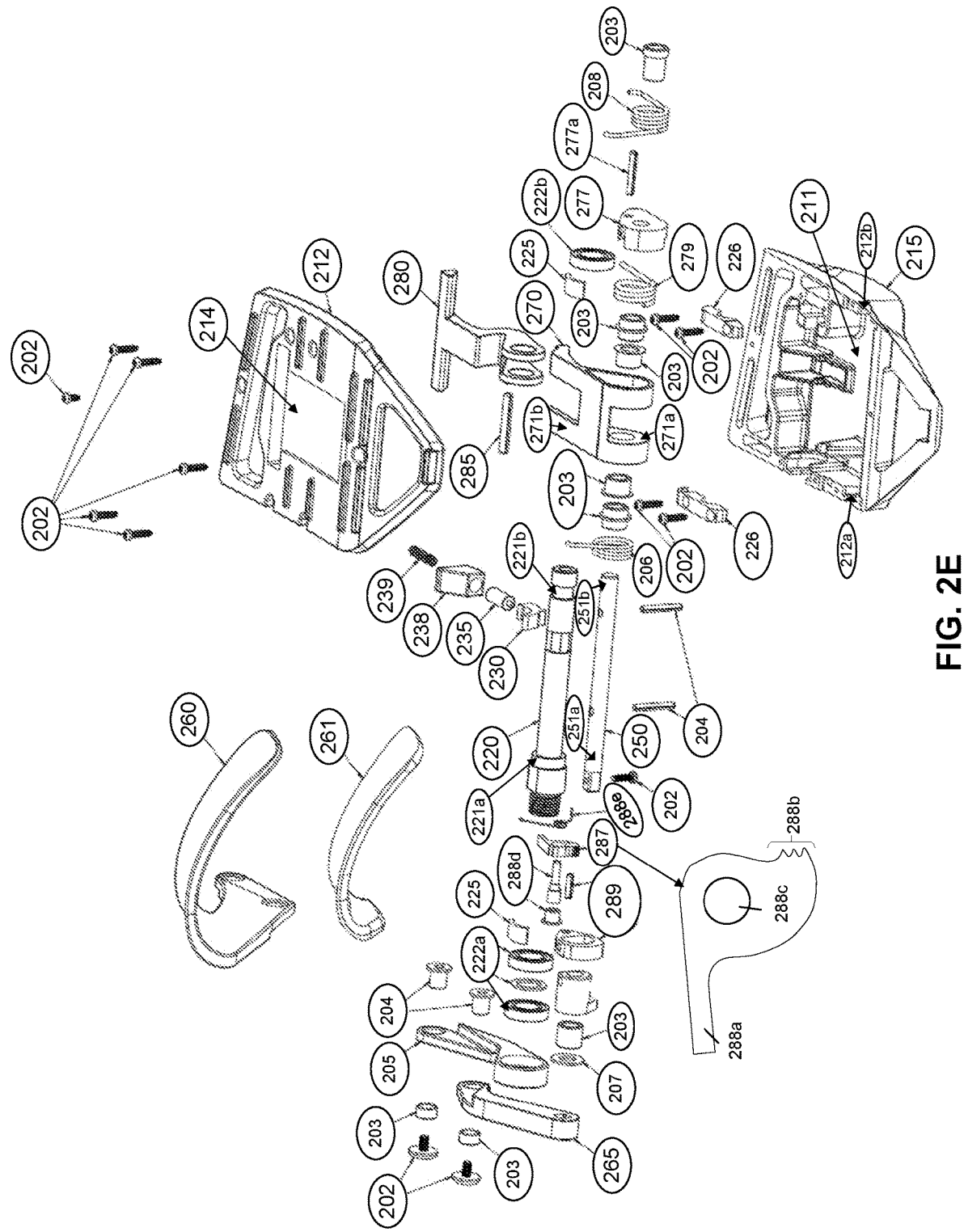
FIG. 2E is an exploded view of the pedal system of FIG. 2A, in accordance with one embodiment.

FIG. 2A depicts a perspective view of a pedal system, in accordance with one embodiment. FIG. 2B depicts another perspective view of the pedal system shown in FIG. 2A, in accordance with one embodiment. FIG. 2C depicts a perspective view of the pedal system of FIG. 2A with a top plate removed, in accordance with one embodiment. FIG. 2D is a perspective view of the pedal system of FIG. 2A cut along plane A, in accordance with one embodiment. FIG. 2E is an exploded view of the pedal system of FIG. 2A, in accordance with one embodiment.

The pedal system 200 shown in FIGS. 2A-2E includes a pedal 210 having an internal cavity 211 bounded by a top plate 212 and a pair of side walls (including side walls 213a and 213b extending from the top plate 212). The top plate 212 shown in FIGS. 2A-2E also includes an opening 214. Elements of the pedal system 200 interacting with the user and transitioning between modes of the pedal system 200 as a result of such interactions pass through the opening 214. In the embodiment shown in FIGS. 2A-2E, the top plate 212 of the pedal 210 is composed of an aluminum material (e.g., Aluminum-6061-T6) in relation to providing sufficient mechanical properties and overall weight of the system; however, other embodiments of the top plate 212 can alternatively be composed of any other suitable material.

The pedal 210 can also have a bottom case 215 that supports internal elements contained within the internal cavity 211. The bottom case 215 includes a triangular-shaped tab 216 extending from a posterior region of the bottom case 215 that facilitates transitioning of the pedal 210 to an "upright" configuration and/or positioning of the pedal 210 for receiving a user's foot. The triangular-shaped tab 216 and/or any other portion of the bottom case 215 can include material regions that grip the foot or footwear of the user to further support retention of the foot of the user at the pedal 210 in the engaged mode of the system; however, other embodiments of the bottom case 215 can alternatively omit the triangular-shaped tab and/or material regions for gripping. The main material of the bottom case 215 shown in FIGS. 2A-2E is composed of a nylon-based material (e.g., Nylon 66, Nylatron, etc.) having desired wear properties, self-lubricating properties, and/or other properties; however, alternative variations of the bottom case 215 can alternatively be composed of any other suitable material.

The top plate 212 can be coupled to the bottom case 215 at peripheral regions of the plates 212 and 215 (e.g., using fasteners, using a thermal bonding process, using an adhesive bonding process). The inferior portions of the top plate 212 and superior portions of the bottom case 215 define the pair of side walls 213a, 213b. Variations of the assembled pedal 210, with the top plate 212, pair of side walls 213a, 213b, and bottom case 215, can have a width from 1.5-6 inches, a length from 2-8 inches, and a height from 0.5 to 3 inches; however alternative variations can have any other suitable width, length, and/or height.

The pedal system 200 shown in FIGS. 2A-2E also includes a main drive shaft 220 defining a pitch axis 201 about which the pedal 210 can rotate, where the main drive shaft 220 is cylindrical along at least some portions of its length. The main drive shaft 220 has a first shaft region 221a coupled to a first bearing 222a retained at the first side wall 213a, extends through the internal cavity 211 and through a second bearing 222b retained at the second side wall 213b, and terminates at a second shaft region 221b. As such, the main drive shaft 220 has a rotational degree of freedom about the pitch axis 201 of the pedal 210, but is constrained along other axes of rotation and translation. Furthermore, either of the first shaft region 221a and the second shaft region 221b can extend through its corresponding side wall 213a, 213b in order to adjoin to sporting equipment (e.g., a crank arm of a bicycle), an apparatus (e.g., rowing machines, recumbent exercise equipment), or a transportation vehicle (e.g., motorcycle, moped).

In material composition, the main drive shaft 220 is composed of a steel material (e.g., stainless steel 303); however, other embodiments of the main drive shaft 220 can be composed of another material having suitable properties. Variations of the main drive shaft 220 can have lengths from 2-8 inches and diameters from 0.2 to 2 inches. However, alternative variations of the main drive shaft 220 can have any other suitable dimensions.

As shown in FIGS. 2A-2E, the main drive shaft 220 also includes an active region 223 along its length and positioned within the internal cavity 211 of the pedal 210, where the active region 223 interacts with elements associated with transitioning the pedal system 200 between a locked mode and a released mode, where the locked mode prevents rotation of the pedal 210 relative to the main drive shaft 220 and the released mode allows rotation of the pedal 210 relative to the main drive shaft. In the system 200 shown in FIGS. 2A-2E, the active region includes a polygonal prismatic segment having substantially planar walls that physically interact with other elements in the locked mode, by way of direct physical contact. The polygonal prismatic has a regular polygonal cross-section when taking a transverse cut through the polygonal prismatic segment along its length, where the regular polygon is an octagon. However, the cross section can alternatively be defined by a non-regular polygon having any other suitable number of sides.

Alternative embodiments of the active region 223 can have a non-polygonal cross section in relation to physical interactions with other elements in the engaged mode and/or the disengaged mode. Still other embodiments of the active region 223 can operate without direct physical contact (e.g., by including magnetic regions that provide or otherwise interact with magnetic fields). Yet other alternative embodiments of the active region can operate in coordination with a sensor (e.g., force sensor, optical sensor, proximity sensor, etc.) that detects when the system 200 has engaged the user, and transitions the system 200 between a locked mode and a released mode accordingly.

As shown in FIG. 2A-2E, the system 200 also includes a wedge body 230 including a first region 231 for engaging the active region 223 of the main drive shaft 220, a second region 232 providing separation from the active region 223 of the main drive shaft 220, and a wedge arm 233. In relation to interacting with the active region 223, the first region 231 of the wedge body 230 has a substantially planar surface that physically obstructs rotational motion of the pedal 210 relative to the main drive shaft 220 by way of the polygonal prismatic segment of the main drive shaft 220. The second region 232 extends from the first region 231 and includes a recess (e.g., concave surface) that provides clearance between the wedge body 230 and the active region 223 of the main drive shaft 220 as the main drive shaft 220 rotates. The wedge arm 233 extends from the second region 232 and engages a cam surface of the trigger, as described in more detail below with reference to FIGS. 2D and 3A-3C, in relation to adjusting a position of the wedge body 230 relative to the main drive shaft 220 in order to transition the system 200 between a locked mode and a released mode, described with reference to FIGS. 3A-3C. Thus, the wedge body 230 translates along a direction transverse to the pitch axis 201 defined by the main drive shaft 220, in order to position the first region 231 and the second region 232 of the wedge body at the active region 223 of the main drive shaft 220, as appropriate. However, variations of the wedge body 230 can move relative to the main drive shaft 220, in any other suitable manner.

In material composition, the wedge body 230 is composed of a metal material (e.g., stainless steel 303, zinc-plated metal) having suitable mechanical properties in compression, shear, and wear, in relation to translation within the pedal 110 in association with locked and released modes. In particular, surfaces of the first region 231 contacting the active region 223 of the main drive shaft 220 and/or surfaces of the wedge arm 233 contacting the trigger can be coated with a material (e.g., Teflon, high molecular weight polyethylene, etc.) that reduces surface friction and/or provide good wear resistance. However variations of the wedge body 230 can be composed of another material having suitable properties. Variations of the wedge body 230 can have lengths from 0.2-2 inches, widths from 0.1-0.5 inches, and heights from 0.2-2 inches. However, alternative variations of the wedge body 230 can have any other suitable dimensions.

In relation to motion of the wedge body 230 relative to the main drive shaft 220, the pedal system 200 includes a plunger 235 retained with a translational degree of freedom along a plunger guide 238 coupled to the bottom case of the pedal 210, where the plunger guide 238 is oriented transverse to the pitch axis defined by the main drive shaft 220. The plunger 235 has a first plunger region in communication with a biasing spring 239 and a second plunger region coupled to the wedge body, where the first plunger region is a region within an internal cavity of the plunger 235, such that the biasing spring 239 resides within the internal cavity of the plunger 235. The second plunger region can couple to the first region 231 of the wedge body with a pin and hole coupling, or any other suitable coupling to transmit force from the plunger 235 to the wedge body 230 and to maintain proper alignment between the plunger 235 and the wedge body 230. The plunger 235 shown is configured as a cylindrical body, but can alternatively have any other suitable form that facilitates translation of the wedge body 230.

In material composition, the plunger 235 is composed of a metal material (e.g., stainless steel 303) having suitable mechanical properties in compression, shear, and wear, in relation to translation relative to the wedge body 230 in association with locked and released modes. The biasing spring 239 is composed of zinc-plated music wire having a suitable spring constant. However variations of the plunger 235 and/or biasing spring 239 can be composed of another material having suitable properties. Variations of the plunger 235 can have lengths from 0.1-2 inches and diameters from 0.1-1 inches. However, alternative variations of the plunger 235 can have any other suitable dimensions.

The plunger guide 238 functions to constrain motion of the plunger 235 along a path of motion relative to the wedge body 230. The plunger guide 238 is coupled to the pedal 210 within its internal cavity 211, and can be coupled to one or more of the top plate 212, pair of side walls 213a, 213b, and/or bottom case 215 in order to properly constrain motion of the plunger 235 and the wedge body 230 coupled to the plunger 235.

As shown in FIGS. 2A-2E, the plunger guide 238 includes a cylindrical channel through which the plunger 235 translates (e.g., in a direction transverse to the pitch axis 201 defined by the main drive shaft 220), in response to forces applied by the wedge body 230 and/or the biasing spring 239. Variations of the plunger guide 238 can include any other suitable feature for guiding motion of the plunger 230 along a desired path.

In material composition, the plunger guide 238 is composed of a material (e.g., nylon 66, other nylon material, other polymer) having suitable mechanical properties in shear and wear, in relation to translation of the plunger 235 relative to the plunger guide 238 in association with locked and released modes. However variations of the plunger guide 238 can be composed of another material having suitable properties. Variations of the plunger guide 238 can have lengths from 0.1-2 inches, widths from 0.1-0.5 inches, and heights from 0.1-2 inches. However, alternative variations of the plunger guide 238 can have any other suitable dimensions.

As shown in FIGS. 2A-2E, the system 200 also includes a trigger 280 having a cam surface 281 in communication with the wedge arm 233 of the wedge body 230, where interaction with the trigger by the user's foot or footwear causes the cam surface 283 to apply pressure to the wedge arm 233 of the wedge body 230 in moving the first region 231 and the second region 232 of the wedge body 230 relative to the main drive shaft 220. The trigger 280 thus functions to transition the pedal system 200 between the locked mode and released mode described further in relation to FIGS. 3A, 3B, and 3C below. The trigger 280 is rotatable about an axis parallel to the pitch axis, where the axis is defined by a rod 250 coupled to the pair of side walls 213a, 213b within the internal cavity 211 of the pedal 210. The rod 250 is described in further detail below, in relation engaged and disengaged modes of the system 200. Thus, interaction with the trigger can simultaneously induce transitions between locked and released modes of the pedal 210, and transitions between engaged modes of the pedal 210, as described in more detail below.

As shown in FIGS. 2A-2E, the trigger 280 is coupled to the rod 250 and also exposed through the top surface 212 of the pedal 110 through the opening 214 of the top plate 212 of the pedal 210. The trigger 280 thus includes a first trigger region 281a that is coupled to the rod (e.g., by inclusion of a bore through which the rod 250 passes), where the trigger 280 is able to rotate independently of rotation of the rod 250, by way of its coupling. The trigger 280 also includes a second trigger region 281b exposed through the opening 214, whereby the user can engage the second trigger region 281b, in order to transition the pedal system 100 between the locked mode and the released mode, as described further in relation to FIGS. 3A-3C.

In morphology, the trigger 280 has a contact surface 282 that contacts the foot or footwear of the user during use of the system 200. The contact surface 282 is biased into an inclined configuration by a torsion spring 206 coupled to the rod and in communication with one or more internal surfaces of the pedal 210, such that the contact surface 282 protrudes from the opening 214 of the top plate 212 when the user is not contacting the pedal system 210. The torsion spring thus restores the trigger 280 to a state where the contact surface 282 is inclined relative to the top plate 212 of the pedal. The inclined configuration promotes engagement of the trigger 280 along a posterior-to-anterior direction by the foot of the user, such that a torsional force applied to the trigger 280 rotates the trigger 280 about the rod until the contact surface 282 is substantially flush with the opening 214. However, variations of the trigger 280 can have any other suitable surface morphology (e.g., pyramid or spherical shape, etc.) that promotes engagement with the trigger 280 along any path and/or in any other suitable manner.

The trigger 280 also has a cam surface 283 opposing the contact surface 282 and facing the internal cavity 211 of the pedal 210. The cam surface 283 interact with the wedge arm 233 of the wedge body 230, as described in relation to the locked and released modes of FIGS. 3A-3C. The cam surface 283 is a curved surface defined by one or more splines (e.g., functions defined piecewise by polynomials and used for interpolating between points). The motion of the wedge arm 233 of the wedge body 230 along the cam surface 283 produces motion of the first and second regions 231, 232 of the wedge body 230 relative to the active region 223 of the main drive shaft 220. A position of the wedge arm 233 along the cam surface 283 (e.g., a baseline position when the user is not interact with the system 200), in addition to the curvature of the cam surface 283, can be used to adjust rapidity of transitioning from the locked mode to the released mode, such that the system does not transition to the locked mod while the pedal is still rotating. The surface of the cam surface 283 can alternatively be defined in any other suitable manner.

In material composition, the trigger 280 is composed of an aluminum material (e.g., Aluminum 6061-T6) that is robust against torsional stresses, compressive stresses, and fatigue in relation to forces applied by the user's foot to the trigger 280. However, variations of the trigger 280 can be composed of another material having suitable properties. The contact surface 282 of the trigger 280 can also be coated with, treated with, or include a material that reduces friction or wear (e.g., graphite, Teflon, polyethylene, lubricant, etc.) associated with interfaces with the user's foot during operation. The cam surface 283 of the trigger 280 can also be coated with, treated with, or include a material that reduces friction or wear (e.g., graphite, Teflon, polyethylene, lubricant, etc.) associated with interactions with the wedge arm 233 of the wedge body 230 during operation.

As shown in FIG. 2E, the system can include fasteners 202 that fasten elements together, bushings 203 that allow a rotational degree of freedom for associated elements, pins 204 that fasten elements together, one or more arms including arm 205 that controls motion of the cuff 260, washers 207, torsion springs 208 that provide a biasing or return force, and/or any other suitable elements.

Figure 3C:
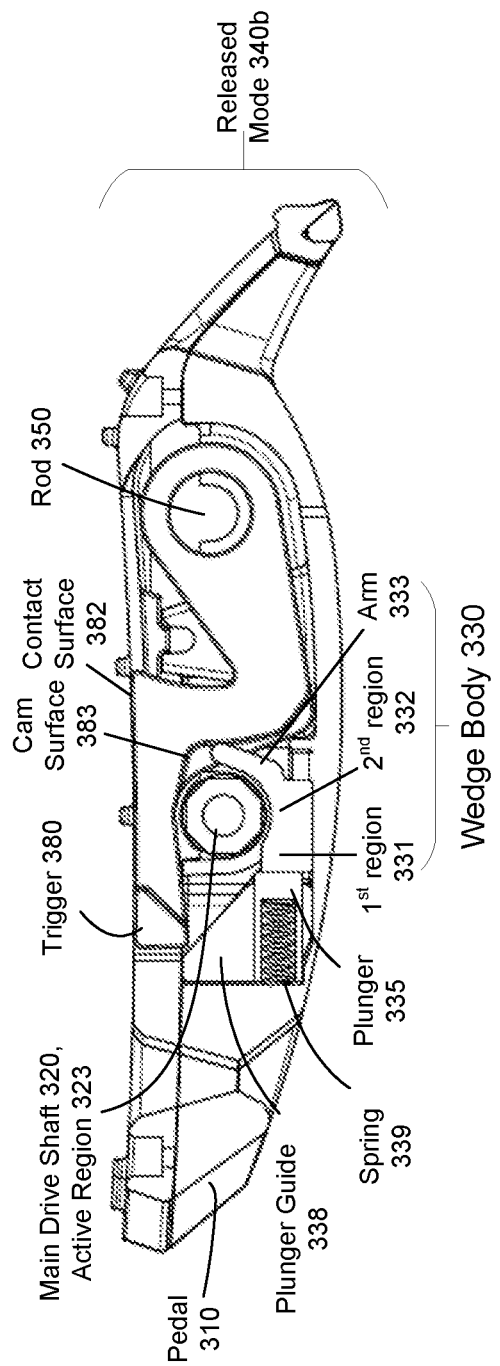
FIG. 3C depicts a cross sectional view of the pedal system of FIGS. 2A and 2B in a released mode, in accordance with one embodiment.

FIG. 3A depicts a cross sectional view of the pedal system of FIGS. 2A and 2B in a locked mode, in accordance with one embodiment. FIG. 3B depicts a cross sectional view of the pedal system of FIGS. 2A and 2B in a transitional state, in accordance with one embodiment. FIG. 3C depicts a cross sectional view of the pedal system of FIGS. 2A and 2B in a released mode, in accordance with one embodiment.

In the locked mode 340a of FIG. 3A, rotation of the pedal 310 about the main drive shaft 320 is prevented, thereby allowing the user to easily place his or her foot into the pedal 310. Without the locked mode 340a, the pedal 310 could otherwise be in a rotated-forward or rotated-reversed configuration that would make it difficult for the user to engage the pedal 310. In more detail, in the locked mode 340a the trigger 380 is unloaded, the wedge arm 333 is at a first position along the cam surface 383, and the biasing spring 339 is in an extended state, thereby positioning the plunger 335 such that the first region 331 of the wedge body 330 is positioned at the polygonal prismatic segment of the active region 323. As such, the flat surface of the first region 331 physically contacts a flat face of the polygonal prismatic segment of the active region 323, thereby preventing rotation of the pedal 310 about the pitch axis of the main drive shaft 320.

In the transitional state of FIG. 3B, the pedal 310 is in between the locked mode 340a and the released mode 340b. The transitional state is a state in which the user interacts with the trigger 380 while placing his or her foot at the pedal 310. In more detail, in the transitional state the trigger 380 is loaded as the user applies a torsional force to the trigger against the torsion spring, the wedge arm 333 is at a second position along the cam surface 383, and the biasing spring 339 is in a slightly compressed state, thereby positioning the plunger 335 such that the first region 331 of the wedge body 330 is moved away from the polygonal prismatic segment of the active region 323, and the second region 332 is moved into position under the polygonal prismatic segment of the active region 323. As such, the flat surface of the first region 331 is moved away from a flat face of the polygonal prismatic segment of the active region 323, in the transitional state.

In the released mode 340b of FIG. 3C, the pedal 310 can rotate relative to the main drive shaft 320. The released mode 340b is associated with the user placing his or her foot at the pedal 310. In more detail, in the released mode 340b the trigger 380 is loaded due to the torsional force applied to the trigger against the torsion spring, the wedge arm 333 is at a third position along the cam surface 383, and the biasing spring 339 is in a compressed state, thereby positioning the plunger 335 such that the second region 332 of the wedge body 330 positioned under the polygonal prismatic segment of the active region 323. As such, the curved surface of the second region 331 is moved under the polygonal prismatic segment of the active region 323, which allows the pedal 310 to rotate relative to the main drive shaft 320 due to the clearance provided by the second region 332 of the wedge body 330.

Figure 4:
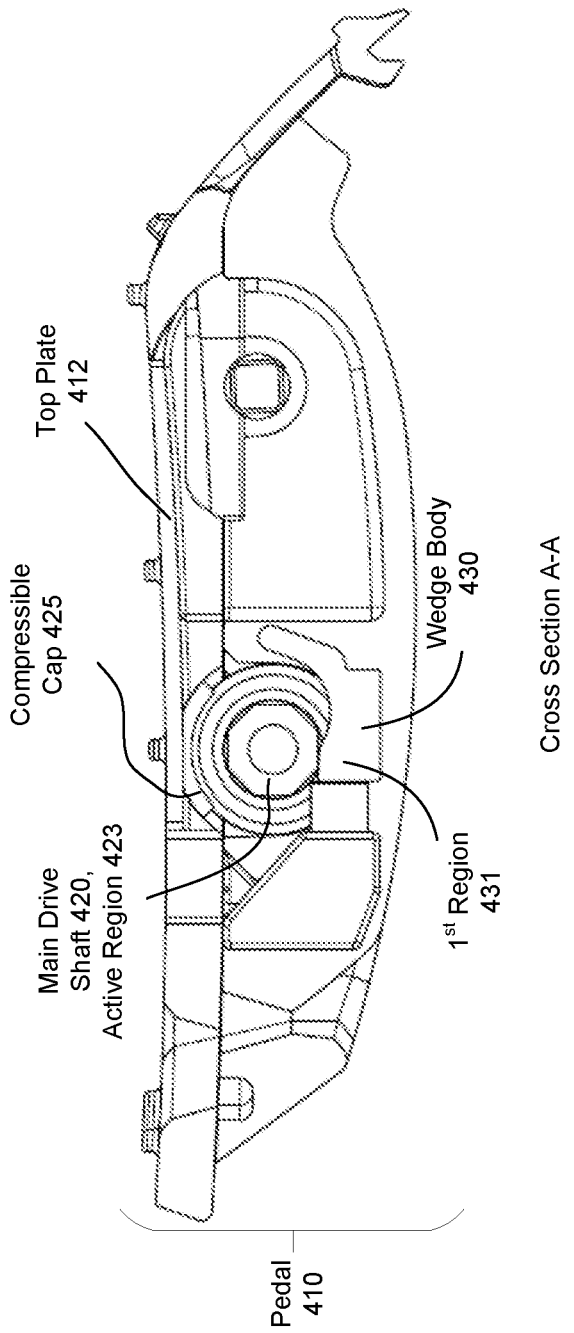
FIG. 4 depicts a breakaway operation associated with the locked mode of FIG. 3A, in accordance with one embodiment.

FIG. 4 depicts elements associated with a breakaway operation associated with the locked mode of FIG. 3A, in accordance with one or more embodiments. In FIG. 4, a compressible cap 425, which is also shown in FIG. 2E as compressible cap 225, is positioned between the top of the main drive shaft 420 and the top plate 412 of the pedal 410 with a strap (shown in FIG. 2D as strap 226). The compressible cap 425 functions to allow the active region 423 of the main drive shaft 420 to be deflected away from the first region 431 of the wedge body 430 in a locked mode, such that, if the locked mode is not appropriate for a specific scenario, the locked mode can be overcome. An example of a specific scenario includes a portion of the pedal 410 (e.g., a front edge) being caught in terrain, where, if a sufficient force is applied to the pedal 410 by the terrain in the locked mode, the compressible cap 425 compresses and allows the main drive shaft 420 to be displaced from the wedge body 430, thereby allowing the locked mode to be overcome without compromising (e.g., breaking) other elements of the system. As such, in one direction of rotation of the main drive shaft in the locked mode, the compressible caps are compressed allowing deflection of the main drive shaft 420, and in another direction of rotation of the main drive shaft 420, the wedge associated with the active region is back driven.

The compressible cap 425 is composed of an elastomeric material (e.g., urethane) having a desired elastic modulus in compression; however, variations of the compressible cap 425 can alternatively be composed of any other suitable material. Furthermore, the main drive shaft 420 can be coupled to more than one compressible cap 425 along its length.

Material properties of the compressible cap 425 can be tuned in order to control a threshold level of force beyond which the locked mode is overcome. As such, the compressible cap 425 can be composed of urethane or other polymer having a designed porosity, level of crosslinking, and any other suitable material or physical feature that results in desired behavior under compression or relaxation.

Figure 5A:
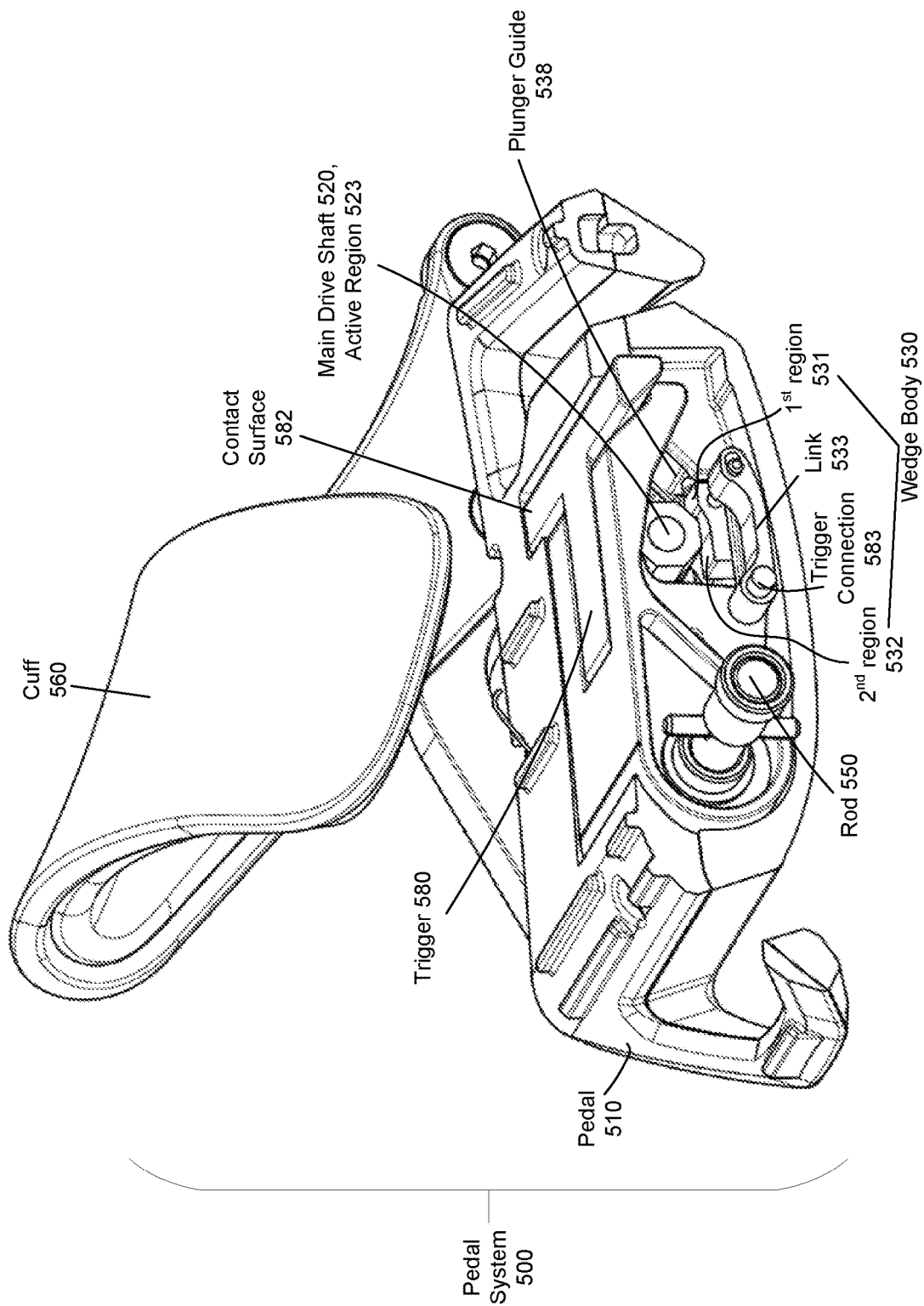
FIG. 5A is a perspective view of an alternative embodiment of the pedal system of FIG. 2A cut along a plane, in accordance with one embodiment.
Figure 5B:
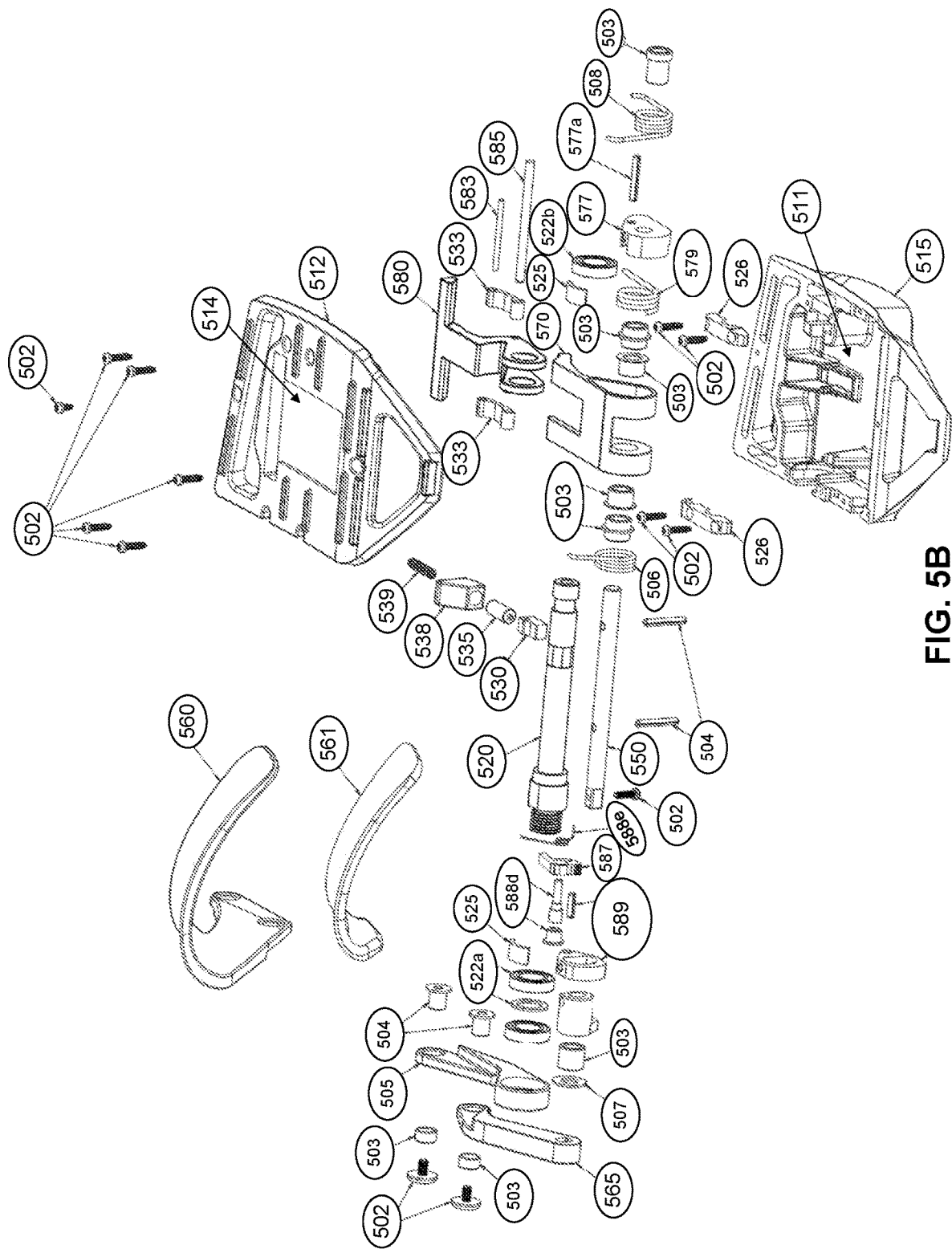
FIG. 5B depicts an exploded view of the alternative embodiment of the pedal system shown in FIG. 5A.

FIG. 5A is a perspective view of the pedal system of FIG. 2A cut along a plane (analogous to the plane of FIG. 2B), in accordance with one embodiment. FIG. 5B is an exploded view of the pedal system of FIG. 5A, in accordance with one embodiment. The fasteners 502, bushings 503, pins 504, arms 505 and 565, washers 507, torsion springs 506 and 508, bottom case 515, internal cavity 511, top plate 512, opening 514, main drive shaft 520, first bearing 522a, second bearing 522b, compressible cap 525, strap 526, wedge body 530, plunger 535, plunger guide 538, spring 539, rod 550, cuff 560, pad 561, lever 570, arbor 577, pin 577a, torsion spring 579, trigger 580, pawl pin 588d, pawl spring 588e, and sector gear 589 of FIGS. 5A-5B correspond with elements of FIGS. 2A-2E. In particular, the wedge body 530 includes a first region 531 analogous to the first region 231 and a second region 532 analogous to the second region 232 of the wedge body 230 shown in FIGS. 2A-2E.

The embodiment of the pedal system 500 shown in FIGS. 5A-5E also has a trigger connection 583 protruding from a portion of the trigger 580 within in the internal cavity 511, where the trigger connection 583 couples to a link 533 that couples to the wedge body 530. The trigger connection 583 transforms rotational motion of the trigger 580 about the rod 550 into rotational motion of the link 533, in order to affect motion of the wedge body 530 relative to the active region 523 of the main drive shaft 520, described in relation to FIGS. 5C-5E below. The trigger connection 583 passes from one side of the trigger 580, through the link, through the trigger 580, and protrudes through the other side of the trigger 580 to function in an analogous manner to the trigger pin 285 of FIGS. 2A-2E. As such, a portion of the trigger connection 583 protrudes from the trigger to interact with the pawl 587, thereby forming a locking mechanism with the sector gear 589.

The link 533 is coupled at one end to the trigger connection 583 and coupled at another end to the wedge body 530, and functions to transform rotational motion of the trigger 580 into translation of the wedge body 530 relative to the active region 523 of the main drive shaft 520. The end of the link 533 coupled to the wedge body 530 can thus include a slotted opening region or any other suitable mechanism for converting rotational motion to translational motion.

Figure 5E:
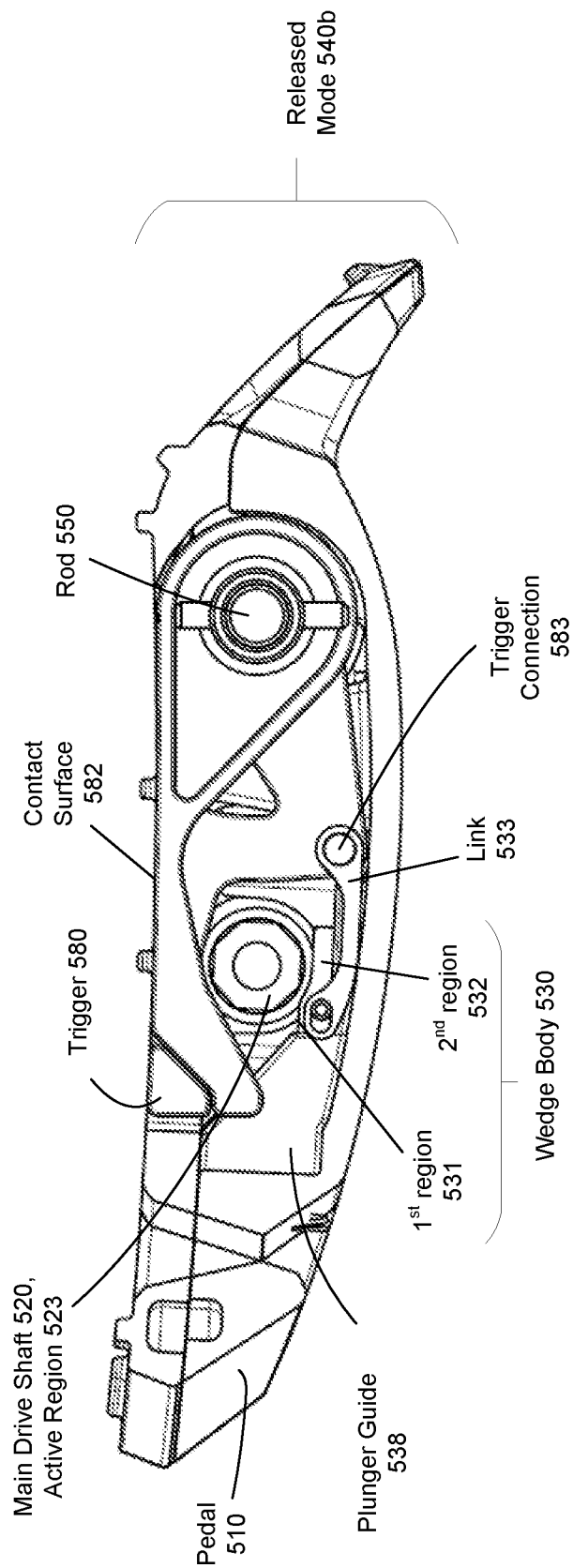
FIG. 5E depicts a cross sectional view of the pedal system of FIGS. 5A-5B in a released mode, in accordance with one embodiment.

FIG. 5C depicts a cross sectional view of the pedal system of FIGS. 5A and 5B in a locked mode, in accordance with one embodiment. FIG. 5D depicts a cross sectional view of the pedal system of FIGS. 5A and 5B in a transitional state, in accordance with one embodiment. FIG. 5E depicts a cross sectional view of the pedal system of FIGS. 5A and 5B in a released mode, in accordance with one embodiment.

In the locked mode 540a of FIG. 5C, rotation of the pedal 510 about the main drive shaft 520 is prevented, thereby allowing the user to easily place his or her foot into the pedal 510. Without the locked mode 540a, the pedal 510 could otherwise be in a rotated-forward or rotated-reversed configuration that would make it difficult for the user to engage the pedal 510. In more detail, in the locked mode 540a the trigger 580 is unloaded, the link 533 is in a rotational configuration that, with the biasing spring 539 and the plunger 535, positions the first region 531 of the wedge body 530 at the polygonal prismatic segment of the active region 523. As such, the flat surface of the first region 531 physically contacts a flat face of the polygonal prismatic segment of the active region 523, thereby preventing rotation of the pedal 510 about the pitch axis of the main drive shaft 520.

In the transitional state of FIG. 5D, the pedal 510 is in between the locked mode 540a and the released mode 540b. The transitional state is a state in which the user interacts with the trigger 380 while placing his or her foot at the pedal 310. In more detail, in the transitional state the trigger 580 is loaded as the user applies a torsional force to the trigger against the torsion spring, the link 533 is in a second rotational configuration that, with the biasing spring 539 in a slightly compressed state, positions the plunger 535 such that the first region 531 of the wedge body 530 is moved away from the polygonal prismatic segment of the active region 523, and the second region 532 of the wedge body 530 is moved into position under the polygonal prismatic segment of the active region 523. As such, the flat surface of the first region 531 is moved away from a flat face of the polygonal prismatic segment of the active region 523, in the transitional state.

In the released mode 540b of FIG. 5C, the pedal 510 can rotate relative to the main drive shaft 520. The released mode 540b is associated with the user placing his or her foot at the pedal 510. In more detail, in the released mode 540b the trigger 580 is loaded due to the torsional force applied to the trigger against the torsion spring, the link 533 is in a third rotational configuration that, with the biasing spring 339 in a compressed state, positions the plunger 535 such that the second region 532 of the wedge body 530 positioned under the polygonal prismatic segment of the active region 523. As such, the surface of the second region 531 is moved under the polygonal prismatic segment of the active region 523, which allows the pedal 510 to rotate relative to the main drive shaft 520 due to the clearance provided by the second region 532 of the wedge body 530.

FIG. 2A depicts a perspective view of a pedal system, in accordance with one embodiment. FIG. 2B depicts another perspective view of the pedal system shown in FIG. 2A, in accordance with one embodiment. FIG. 2C depicts a perspective view of the pedal system of FIG. 2A with a top plate removed, in accordance with one embodiment. FIG. 2D is a perspective view of the pedal system of FIG. 2A cut along plane A, in accordance with one embodiment. FIG. 2E is an exploded view of the pedal system of FIG. 2A, in accordance with one embodiment.

The top plate 212 shown in FIGS. 2A-2E includes an opening 214, where elements of the pedal system 200 that interact with the user and to cause transitions between modes of the pedal system 200 as a result of such interactions pass through the opening 214. In the variation shown in FIGS. 2A-2E, the top plate 212 of the pedal 210 is composed of an aluminum material (e.g., Aluminum-6061-T6) in relation to providing sufficient mechanical properties and overall weight of the system; however, alternative embodiments of the top plate 212 can alternatively be composed of any other suitable material.

The pedal 210 can also have a bottom case 215 that supports internal elements contained within the internal cavity 211. The main material of the bottom case 215 shown in FIGS. 2A-2E is composed of a nylon-based material (e.g., Nylon 66, Nylatron, etc.) having desired wear properties, self-lubricating properties, and/or other properties; however, alternative variations of the bottom case 215 can alternatively be composed of any other suitable material.

The top plate 212 can be coupled to the bottom case 215 at peripheral regions of the plates 212 and 215 (e.g., using fasteners, using a thermal bonding process, using an adhesive bonding process), where inferior portions of the top plate 212 and superior portions of the bottom case 215 define the pair of side walls 213a, 213b. Various embodiments of the assembled pedal 210, with the top plate 212, pair of side walls 213a, 213b, and bottom case 215, can have a width from 1.5-6 inches, a length from 2-8 inches, and a height from 0.5 to 3 inches; however alternative variations can have any other suitable width, length, and/or height.

The pedal system 200 shown in FIGS. 2A-2E also includes a rod 250 defining an axis about which other elements can rotate in relation to causing motion of the cuff, retaining a position of the cuff, and/or releasing the cuff. The rod 250 is cylindrical along at least some portions of its length, and the axis defined by the rod 250 can be parallel to and offset from the pitch axis of the main drive shaft 220 described above. The rod 250 has a first rod region 251a coupled to a first bearing retained at the first side wall 212a, extends through the internal cavity 211 and through a second bearing retained at the second side wall 212b, and terminates at a second rod region 251b. As such, the rod 250 has a rotational degree of freedom about the axis, but is constrained along other axes of rotation and translation. Furthermore, either of the first rod region 251a and the second shaft region 251b can extend through its corresponding side wall 213a, 213b in order to adjoin to a cuff 260 or other components coupling the rod 250 to the cuff 260.

In material composition, the rod 250 is composed of an aluminum material (e.g., Aluminum 6061-T6); however variations of the rod 250 can be composed of another material having suitable properties. Some embodiments of the rod 250 can have lengths from 2-8 inches and diameters from 0.2 to 2 inches. However, alternative embodiments of the rod 250 can have any other suitable dimensions.

The cuff 260, as shown in FIGS. 2A-2E, functions to retain a user's foot or footwear at the pedal 210 in an engaged mode and to enable release of the user's foot or footwear from the pedal 210 in a disengaged mode, where the engaged mode and the disengaged mode are variations of modes 190a and 190b described above with reference to FIG. 1C. The cuff 260 also functions to robustly support the user's foot or footwear at the pedal 210 (e.g., with a compressive force provided by the cuff 160 and the pedal 210). In material composition, the cuff 260 is composed of a material that is robust against bending stresses, shear stresses, compressive stresses, tensile stresses, and fatigue, in relation to forces incurred at the cuff 260 while a user interacts with the system 200. The cuff 260 is composed of a polymeric material (e.g., Nylon 66, other polymer material). However, variations of the cuff 260 can be composed of another material having suitable properties.

The cuff 260 also functions to provide comfort to the user as the user performs an activity, by inclusion of soft, resilient, and/or otherwise compliant materials that interface with the user's foot or footwear during operation of the system 200 in the engaged mode 290a. As such, portions of the cuff 260 (e.g., portions of the cuff 160 facing the foot or footwear of the user) are coupled to a pad 261 composed of a urethane foam material (urethane foam 4701-40-15375) having a thickness of 9.35 mm.

In morphology, the cuff 260 can has a concave surface facing the user's foot or footwear, such that the concave surface is complementary to the shape of the foot or footwear of the user. The cuff 260 shown in FIGS. 2A-2E has a closed medial side and an open lateral side that allows the user to rapidly and easily disengage the system 100 during critical moments. The cuff 260 also has open anterior and posterior sides. The morphology of the cuff 260 is designed be appropriate for variations in user foot morphology (e.g., in terms of shoe size, in terms of width, etc.). In the engaged mode described, the cuff 260 spans a cuneiform region of the user's foot, and to be released from the cuneiform region as the user disengages the system.

The cuff 260 may be coupled to the rod 250, such that a force applied to the lever 270 described below rotates the rod 250 and allows the cuff 260 to comfortably compress (e.g., with a desired amount of force) the user's foot or footwear between the top surface 112 of the pedal 110 and the pad 261 of the cuff 160. Coupling between the cuff 260 and the rod 250 is at a region of the rod 250 outside of the body of the pedal 110 (e.g., at a portion of the rod 250 extending through a medial side wall of the pedal 210 and exterior to the pedal 210).

As shown in FIGS. 2A-2E, the cuff 260 is coupled to the rod 250 by an arm 265 coupled to a portion of the rod 150 extending through a medial side wall of the pedal 110 and exterior to the pedal 110, where the arm 165 transforms rotation of the rod 150 induced by the lever 270 (described below) into motion of the cuff 260 along an inferior-superior direction, thereby retaining and releasing the foot of the user during different modes of operation.

The arm 265 has a linkage form factor and includes bores at its ends for fastening to the rod 250 and to the cuff 260. In morphology, the arm 265 includes recessed portions that enable the arm 265 to be structurally robust against bending and compression, with less overall material volume. The arm 265 is composed of aluminum (e.g., aluminum 6061-T6). However, variations of the arm 265 can be composed of another material having suitable properties. Variations of the arm 265 can have a length from 2-8 inches, a width from 0.2-0.75 inches, and a height from 1-5 inches. However, alternative variations of the arm 265 can have any other suitable dimensions. Furthermore, the cuff 260 can couple to other components of the system (e.g., the main drive shaft 220 described) with any other suitable number of arms, in order to define a path and range of motion of the cuff 260 in associated with transitions between different modes of the system.

The lever 270, as shown in FIGS. 2A-2E, functions to repeatedly and reversibly transition the cuff 260 between a configuration that retains the foot of the user and a configuration that releases the foot of the user, in association with the engaged mode and the disengaged mode described below. The lever 270 is coupled to the rod 250 and also exposed through the top plate 212 of the pedal 210 through the opening 214. The lever 270 includes a first lever region 271a that is coupled to the rod (e.g., a portion of the rod 250 within the internal cavity 211 of the pedal 210), such that motion of the lever 270 is coupled with rotation of the rod 250. The first lever region 271a includes a pair of bores through which the rod 250 passes, where the pair of bores is spaced about the first trigger region 281a of the trigger 280, within the internal cavity 211. The lever 270 also includes a second lever region 2721b exposed through the opening 214, whereby the user can engage the second lever region 271b, thereby inducing motion of the rod 250 in association with transitioning the system 110 between the engaged mode and the disengaged mode described below in relation to FIGS. 7A-6C.

In morphology, the lever 270 has a contact surface 272 that contacts the foot or footwear of the user during use of the system 200. The contact surface 282 is biased into an inclined configuration and coupled to the trigger 280 (described below) in its baseline unloaded state, such that the contact surface 272 protrudes from the opening 214 of the top plate 212 when the user is not contacting the pedal system 210. The inclined configuration promotes engagement of the lever 270 along a posterior-to-anterior direction by the foot of the user, such that a torsional force applied to the lever 270 rotates the lever 270 about the rod 250 until the contact surface 272 is substantially flush with the opening 214. However, variations of the lever 270 can have any other suitable surface morphology (e.g., pyramid or spherical shape, etc.) that promotes engagement with the trigger 270 along any path and/or in any other suitable manner.

Figure 6A:
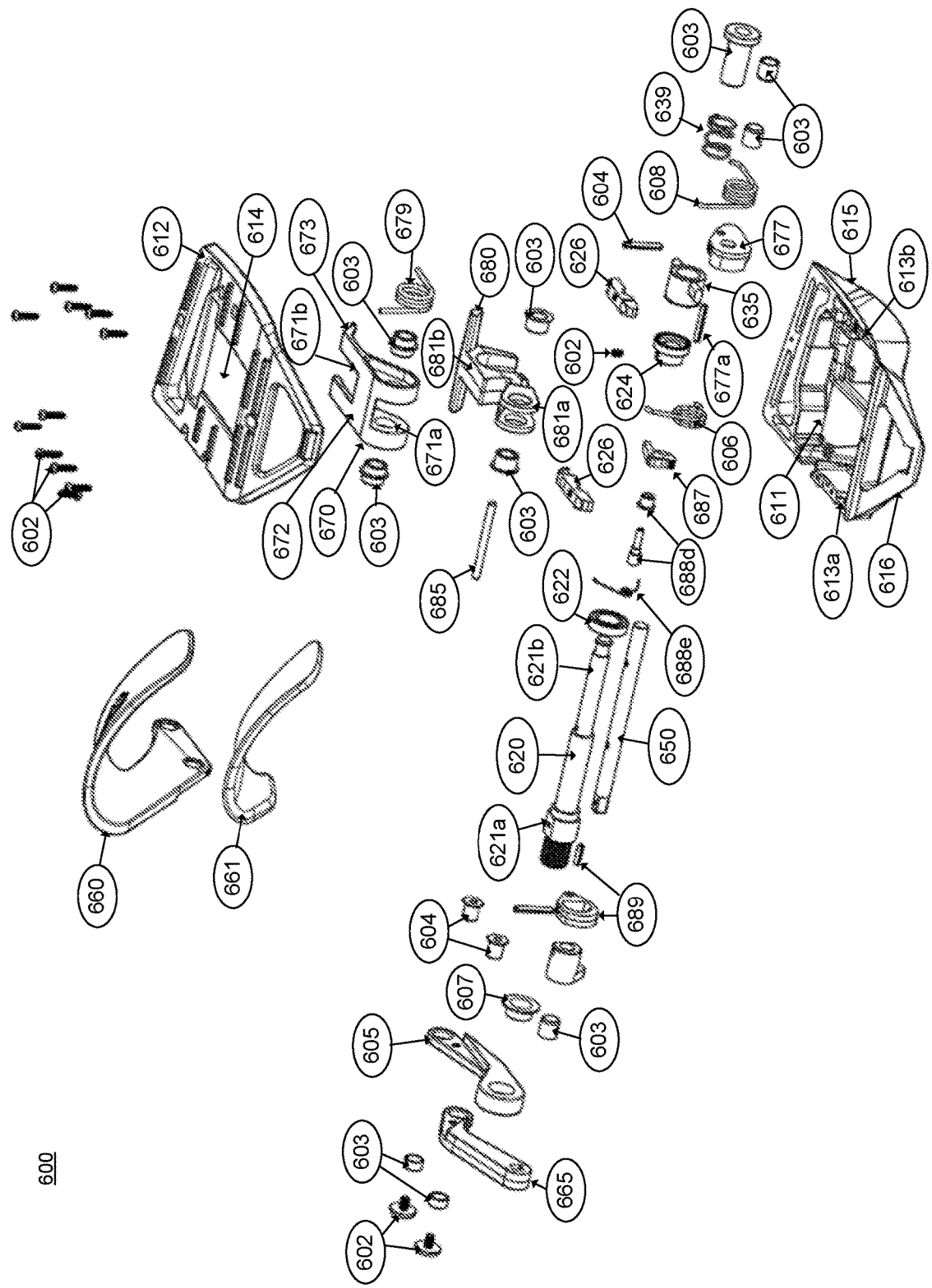
FIG. 6A depicts an exploded view of the alternative embodiment of the pedal system of FIG. 2A, in accordance with one embodiment, in accordance with one embodiment.
Figure 6B:
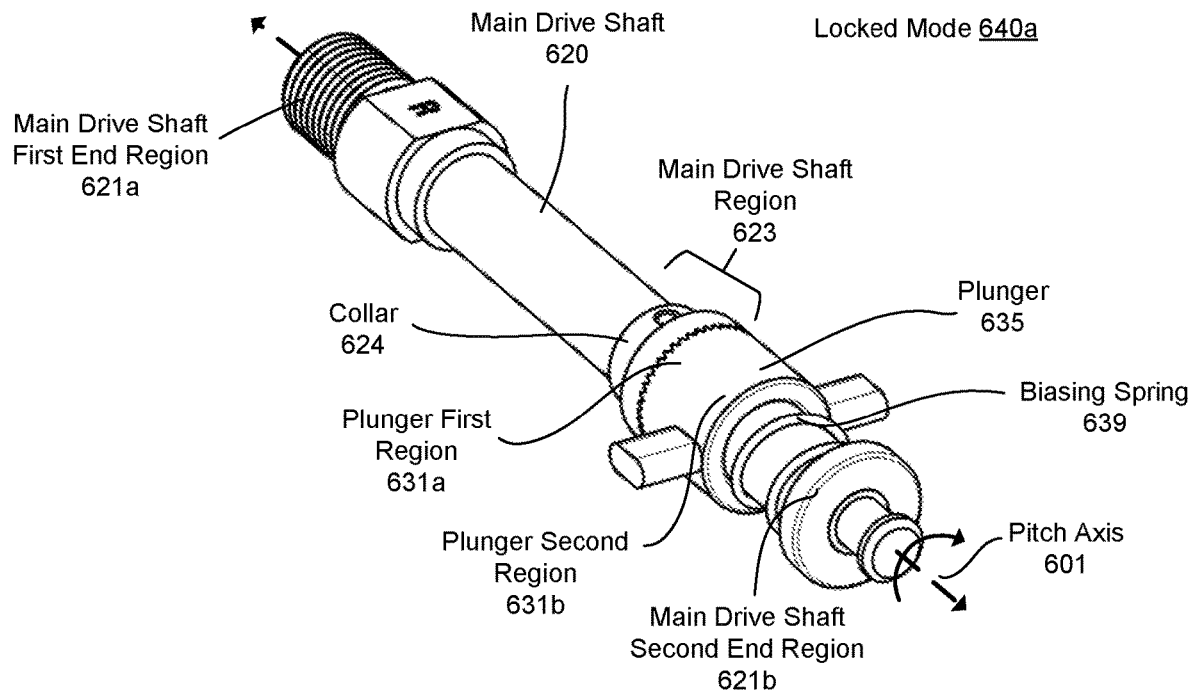
FIG. 6B illustrates a perspective view of a main drive shaft included in the embodiment of the pedal system shown in FIG. 6A in a locked mode, in accordance with one embodiment.
Figure 6C:
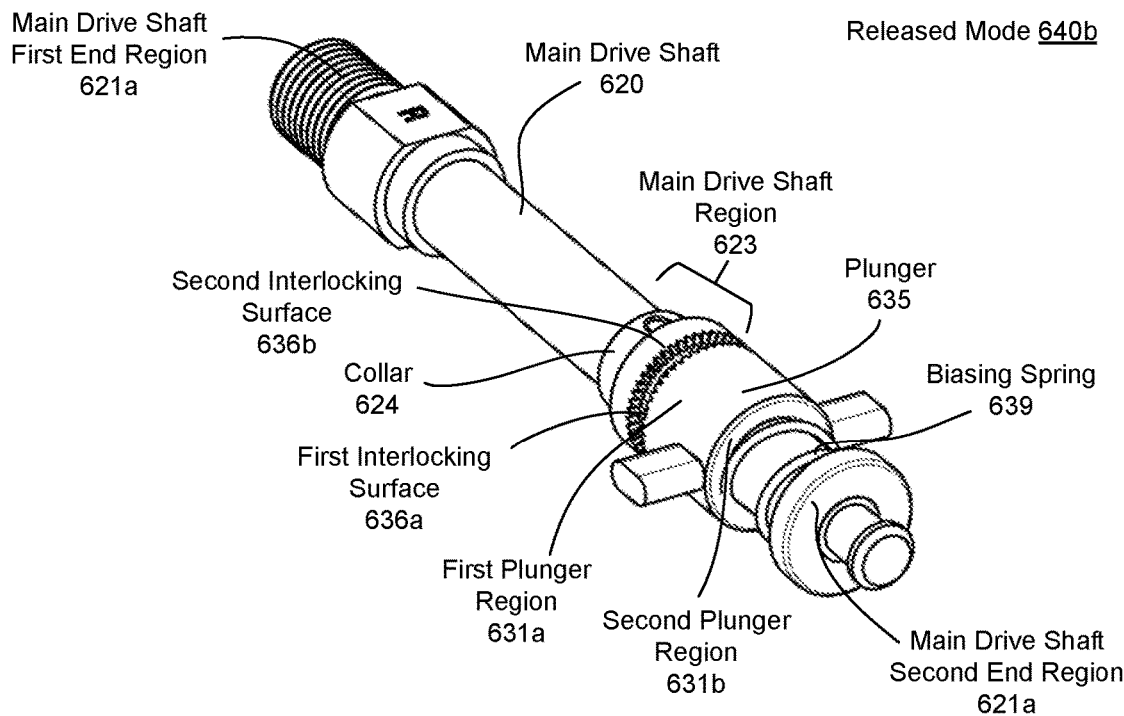
FIG. 6C illustrates a perspective view of the main drive shaft of FIG. 6B in a released mode, in accordance with one embodiment.

The lever 270 also has at least one tab 273 extending from the contact surface 272, where the tab 273 interacts with the lever 270, as described in relation to the engaged and disengaged modes of FIGS. 7A-6C. The tab 273 engages a portion of the trigger 280, where the tab 273 promotes coupling between the lever 270 and the trigger 280 during a first direction of motion (e.g., when transitioning from the disengaged mode to the engaged mode). The tab 273 can also allow motion of the lever 270 to be uncoupled from motion of the trigger 280 during a second direction of motion (e.g., when transitioning from the engaged mode to the disengaged mode). The tab 273 is one of a pair of tabs protruding posteriorly from the contact surface 272 of the lever 270, where the pair of tabs contacts a T-shaped portion of the contact surface 282 of the trigger 280 described below; however, the tab(s) 273 can alternatively have any other suitable morphology.

In material composition, the lever 270 is composed of an aluminum material (e.g., Aluminum 6061-T6) that is robust against torsional stresses, compressive stresses, and fatigue in relation to forces applied by the user's foot to the lever 270. However, variations of the lever 270 can be composed of another material having suitable properties. The contact surface 272 of the lever 270 can also be coated with, treated with, or include a material that reduces friction or wear (e.g., graphite, Teflon, polyethylene, lubricant, etc.) associated with interfaces with the user's foot during operation.

As shown in FIGS. 2A-2E, the trigger 280 is coupled to the rod 250 and also exposed through the top surface 212 of the pedal 110 through the opening 214 of the top plate 212 of the pedal 210, in proximity to the lever 270. The trigger 280 functions to cause locking of a position of the cuff 260 in the engaged mode and to cause unlocking of the position of the cuff 260 in the disengaged mode, thereby allowing the user to release his or her feet from the system in an efficient and intuitive manner and prevent trapping of the user's foot at the pedal when the user wishes to disengage the system. The trigger 280 includes a first trigger region 281a that is coupled to the rod (e.g., by inclusion of a bore through which the rod 250 passes), where the trigger 280 is able to rotate independently of rotation of the rod 250, by way of its coupling. The bore of the trigger 280 is thus configured between the pair of bores of the lever 270 within the internal cavity 211. The trigger 280 also includes a second trigger region 281b exposed through the opening 214, whereby the user can engage the second trigger region 281b, in order to transition the pedal system 100 between the engaged mode and the disengaged mode, as described further in relation to FIGS. 7A-6C.

In morphology, the trigger 280 has a contact surface 282 that contacts the foot or footwear of the user during use of the system 200. The contact surface 282 is biased into an inclined configuration by a torsion spring coupled to the rod and in communication with one or more internal surfaces of the pedal 210, such that the contact surface 282 protrudes from the opening 214 of the top plate 212 when the user is not contacting the pedal system 210. The torsion spring thus restores the trigger 280 to a state where the contact surface 282 is inclined relative to the top plate 212 of the pedal. The inclined configuration promotes engagement of the trigger 280 along a posterior-to-anterior direction by the foot of the user, such that a torsional force applied to the trigger 280 rotates the trigger 280 about the rod until the contact surface 282 is substantially flush with the opening 214. However, variations of the trigger 280 can have any other suitable surface morphology (e.g., pyramid or spherical shape, etc.) that promotes engagement with the trigger 280 along any path and/or in any other suitable manner.

As described briefly above, the trigger 280 has a T-shaped portion 284 extending posteriorly from the contact surface 282, where the T-shaped portion 284 engages the tab(s) 273 of the lever 270 in relation to linked motion of the lever 270 with the trigger 280. The T-shaped portion 284 can, however, be alternatively configured with any other suitable morphology.

The trigger 280 also has a trigger pin 285 protruding laterally from a portion of the trigger 280 within the internal cavity 211 of the pedal 210, where the trigger pin 285 interacts with a locking subsystem including a pawl 287 and a sector gear 289, described in more detail below. The trigger pin 285 of the trigger 280 thus promotes locking of a position of the rod 250, arm 265, or cuff 260 in the engaged mode and rapidly releases locking of a position of the rod 250, arm 265, or cuff 260 in the disengaged mode described in more detail below in relation to the engaged and disengaged modes of FIGS. 7A-6C.

In material composition, the trigger 280 is composed of an aluminum material (e.g., Aluminum 6061-T6) that is robust against torsional stresses, compressive stresses, and fatigue in relation to forces applied by the user's foot to the trigger 280. The contact surface 282 of the trigger 280 can also be coated with, treated with, or include a material that reduces friction or wear (e.g., graphite, Teflon, polyethylene, lubricant, etc.) associated with interfaces with the user's foot during operation.

FIGS. 2A-2E also depicts a pawl 287, which functions, with a sector gear 289 and trigger pin 285 to provide a mechanism that causes locking of the cuff 260 in position during use of the system by a user. The pawl 287 includes a pawl tab 288a that lies within a path of motion of the trigger pin 285 within the internal cavity as the trigger 280 is rotated from a baseline disengaged position to a fully engaged position (e.g., where the user's foot is seated at a top plate 212 of the pedal 210). Opposite the pawl tab 288a, the pawl 287 includes a set of teeth 288b that engage a sector gear 289 coupled to the rod 250, where engagement between the set of teeth 288b of the pawl 287 with the sector gear 289 causes locking of a position of the cuff 260 to retain the foot of the user at the pedal 210, and disengagement between the set of teeth 288b of the pawl 287 from the sector gear 289 causes the position of the cuff 260 to be unlocked to release the foot of the user from the pedal 210. The set of teeth 288b of the pawl 287 in FIGS. 2A-2E includes three teeth, described in more detail below; however, variations of the pawl 287 can include any other suitable number of teeth 287b.

The pawl 287 also includes a bore 288c between the pawl tab 288a and the set of teeth 288b, where a pawl pin 288d passes through the bore 288c and provides an axis of rotation of the pawl 287 relative to the sector gear 289. The axis of rotation is parallel to and offset from the axis of rotation defined by the rod 250. Additionally, the pawl pin 288d can be coupled to a torsion spring 288e that biases the set of teeth 288b of the pawl 287 into engagement with the sector gear 289 whenever the trigger pin 285 does not contact the pawl tab 288a. However, in variations of the system, the axis of the pawl 287 and the axis of the rod 250 can be oriented relative to each other in any other suitable manner, and the pawl 287 can be biased into any other suitable baseline configuration in any other suitable manner.

In material composition, the pawl 287 is composed of a steel material (e.g., steel plated material, 303 stainless steel, etc.) that is robust against torsional stresses, compressive stresses, and bending stresses, and crack propagation in relation to forces applied to the pawl 287 by the trigger pin 285 and the sector gear 289. However, variations of the pawl 287 can be composed of another material having suitable properties.

The sector gear 289 is coupled to the rod 250 and constrained to rotate with rotation of the rod 250. The sector gear 289 has a set of teeth 289a facing the set of teeth 288b of the pawl 287, in order to provide the locking subsystem described above. In material composition, the sector gear 289 is composed of a steel material (e.g., steel plated material, 303 stainless steel, etc.) that is robust against torsional stresses, compressive stresses, and bending stresses, and crack propagation in relation to forces applied to sector gear 289 by the pawl 287 and other elements. In variations, the sector gear 289 can be substituted with any suitable component having teeth that interact with the pawl 287 as appropriate.

Figure 6F:
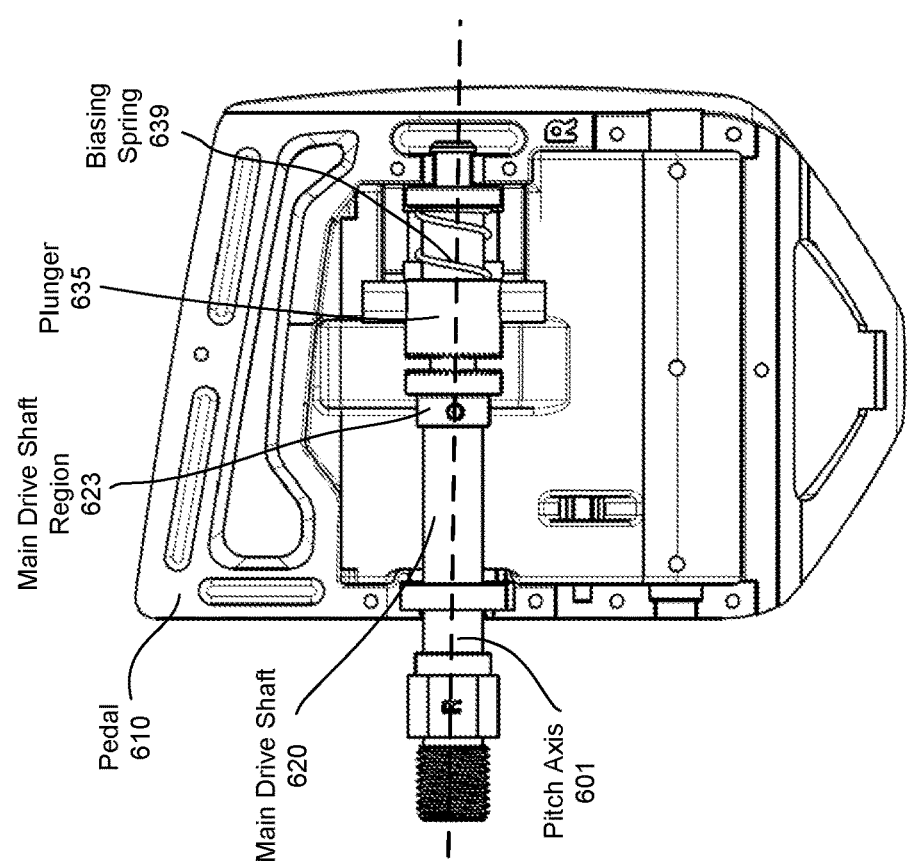
FIG. 6F illustrates a top view of the embodiment of the pedal system shown in FIG. 6A with a main drive shaft in a locked mode, in accordance with one embodiment.
Figure 6G:
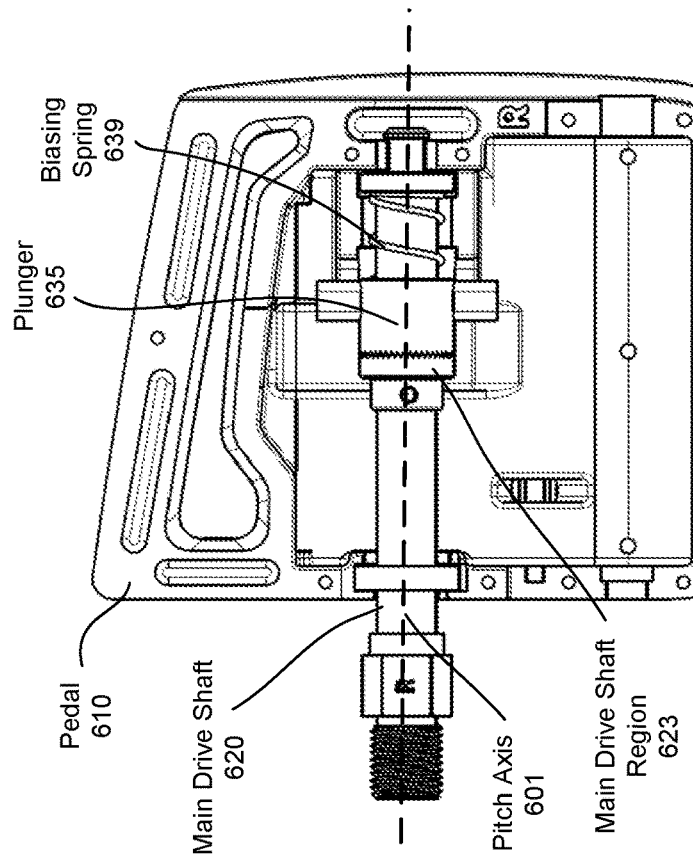
FIG. 6G illustrates a top view of the pedal system of FIG. 6F with the main drive shaft in a released mode, in accordance with one embodiment.
Figure 6H:
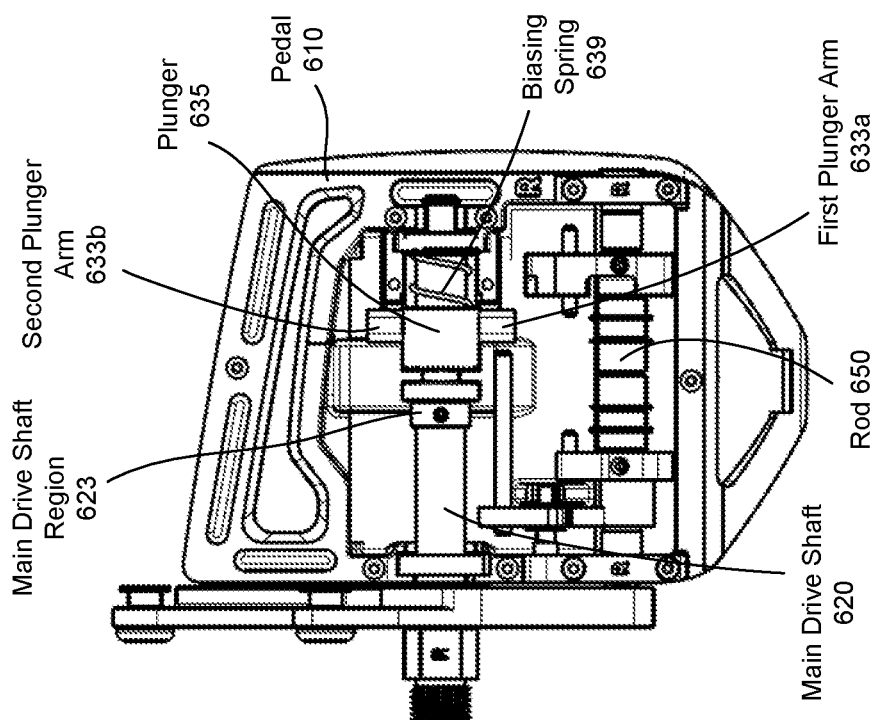
FIG. 6H illustrates a top view of the embodiment of the pedal system shown in FIG. 6A with a main drive shaft in a locked mode, in accordance with one embodiment.
Figure 6I:
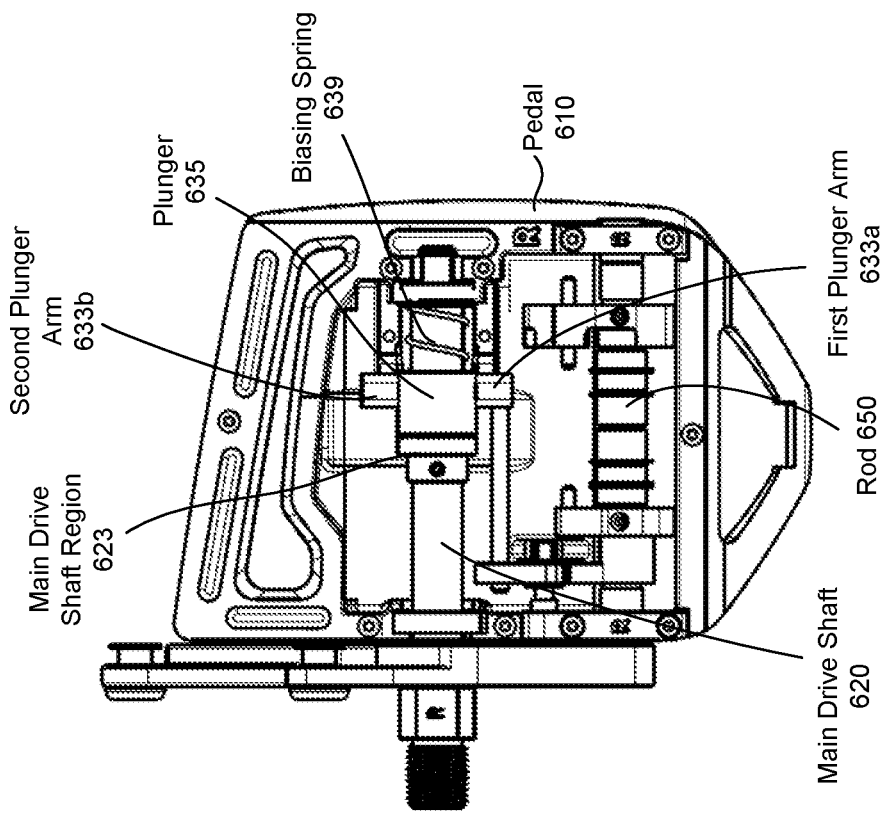
FIG. 6I illustrates a top view of the pedal system of FIG. 6H with a main drive shaft in a released mode, in accordance with one embodiment.
Figures 6J, 6K:
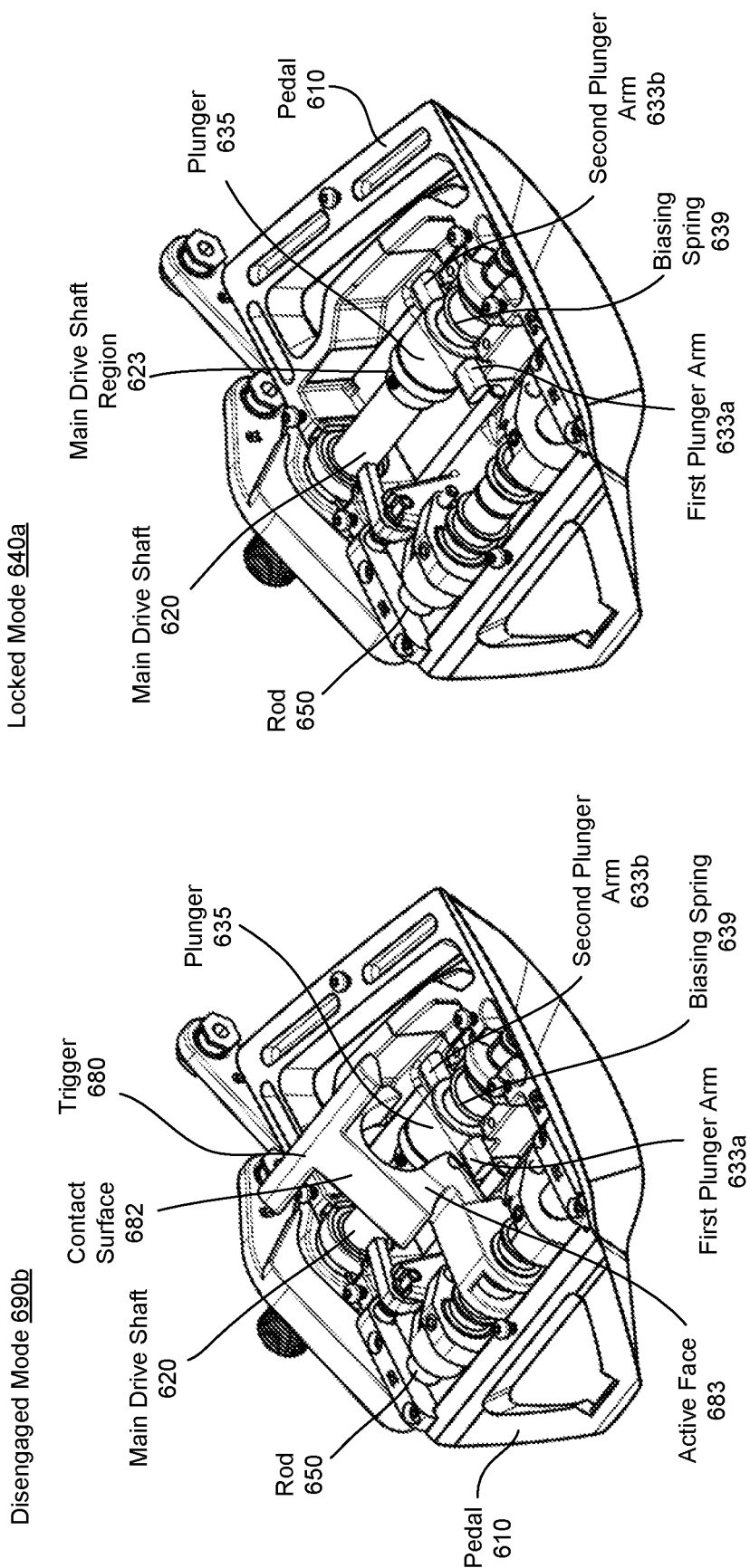
FIG. 6J illustrates a perspective view of the embodiment of the pedal system shown in FIG. 6A with a trigger in a disengaged mode, in accordance with one embodiment.
FIG. 6K illustrates a perspective view of the pedal system of FIG. 6J with a main drive shaft in a locked mode, in accordance with one embodiment.
Figure 6M:
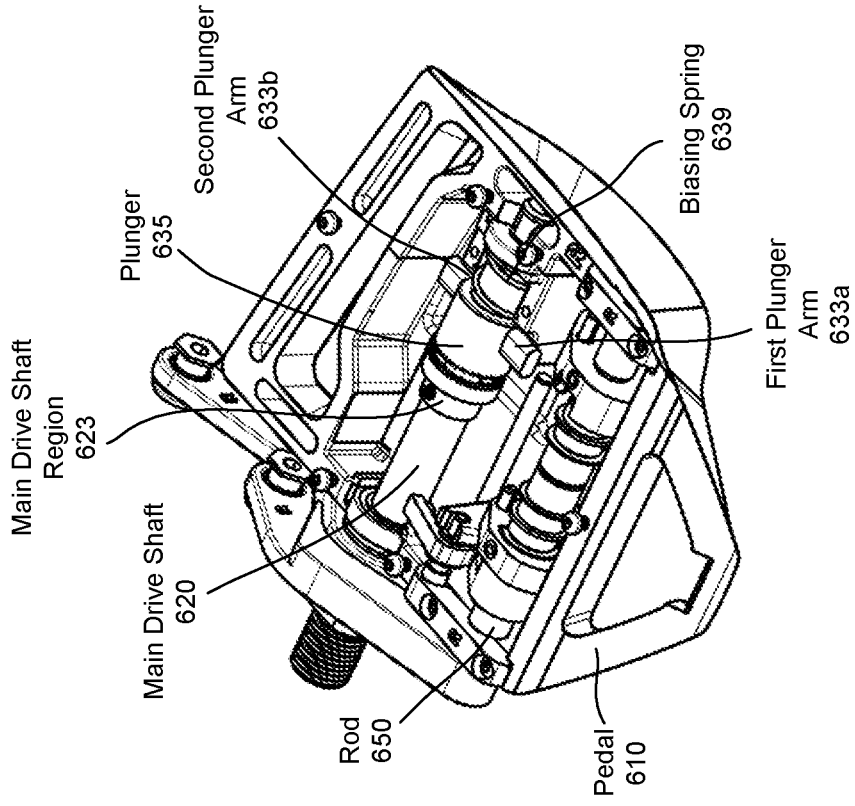
FIG. 6M illustrates a perspective view of the pedal system of FIG. 6L with the main drive shaft in a released mode (trigger not shown for clarity), in accordance with one embodiment.
Figure 6L:
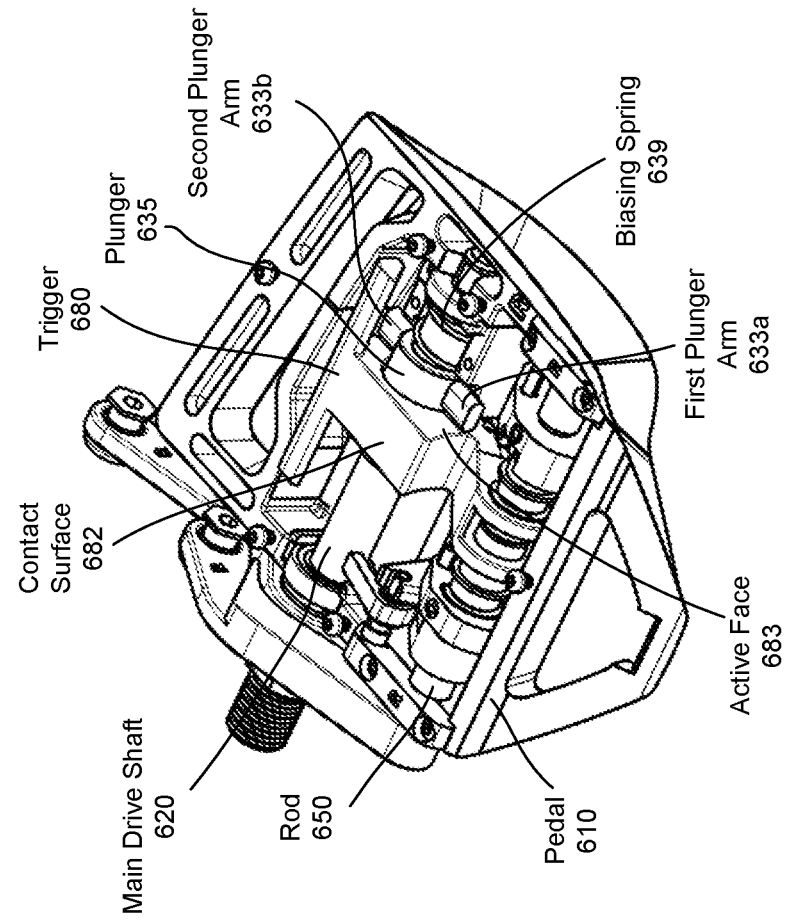
FIG. 6L illustrates a perspective view of the embodiment of the pedal system shown in FIG. 6A with a trigger engaged, in accordance with one embodiment.

FIGS. 6A-6O illustrate various configurations of an alternative embodiment of a pedal system (e.g., pedal system 100 described above). In the embodiment shown in FIGS. 6A-6O, the pedal system 600 has a main drive shaft 620 and a trigger 680 that facilitate transition between different modes of operation, described below in relation to FIGS. 6B-6O. For purposes of summary, FIG. 6A illustrates an exploded view of the pedal system 600. FIG. 6B illustrates a schematic of the main drive shaft included in the pedal system 600 in a locked mode. FIG. 6C illustrates a schematic of the main drive shaft included in the pedal system 600 in a released mode. FIG. 6D illustrates an isometric view of the pedal system 600 with the main drive shaft in a locked mode. FIG. 6E illustrates an isometric view of the pedal system 600 with the main drive shaft in a released mode. FIG. 6F illustrates a top view of the pedal system 600 with the main drive shaft in a locked mode. FIG. 6G illustrates a top view of the pedal system 600 with the main drive shaft in a released mode. FIG. 6H illustrates a top view of the pedal system 600 with the main drive shaft in a locked mode. FIG. 6I illustrates a top view of the pedal system 600 with the main drive shaft in a released mode. FIG. 6J illustrates an isometric view of the pedal system 600 with the trigger in a disengaged mode. FIG. 6K illustrates an isometric view of the pedal system 600 with the main drive shaft in a locked mode, corresponding to the mode shown in FIG. 6J. FIG. 6L illustrates an isometric view of the pedal system 600 with the trigger in an engaged mode. FIG. 6M illustrates an isometric view of the pedal system 600 with the main drive shaft in an unlocked mode, corresponding to the mode shown in FIG. 6L. FIG. 6O is a cross sectional view of the pedal system 600 with the main drive shaft in a locked mode and the trigger in a disengaged mode. FIG. 6N is a cross sectional view of the pedal system 600 with the main drive shaft in a released mode and the trigger in an engaged mode.

As shown in FIG. 6A, the pedal system 600 includes fasteners 602, bushings 603, pins 604, arms 605 and 665, washers 607, torsion springs 606, 608 and 679, a bottom case 615, an internal cavity 611, a top surface 612 with an opening 614, a main drive shaft 620, one or more bearings 622, a strap 626, a plunger 635, a biasing spring 639, a rod 650, a cuff 660, a pad 661, a lever 670, an arbor 677, a pin 677a, a trigger 680, a pawl 687, a pawl pin 688d, a pawl spring 688e, and a sector gear 689. The elements shown in FIG. 6A generally correspond with elements of FIGS. 2A-2E, where alternative embodiments and mechanisms are described in more detail as follows. The pedal system 600 can include fewer or additional elements than described herein. The elements can also have different functions and/or structures than described below.

A pedal 610 of the pedal system 600 includes an internal cavity 611 bound by the top surface 612 and the bottom case 615. The top surface 612 can be coupled to the bottom case 615 at peripheral regions of the plates (e.g., using fasteners, using a thermal bonding process, using an adhesive bonding process). The inferior portions of the top surface 612 and superior portions of the bottom case 615 define a pair of side walls 613a, 613b. The top surface 612 includes an opening 614. Elements of the pedal system 600 (e.g., trigger 680) pass through the opening 614 to interact with the user and allow the pedal system 600 to transition between modes of operation. Variations of the assembled pedal 610, with the top surface 612, pair of side walls 613a, 613b, and bottom case 615, can have a width from 1.5-6 inches, a length from 2-8 inches, and a height from 0.5 to 3 inches; however alternative variations can have any other suitable width, length, and/or height.

The bottom case 615 supports internal elements contained within the internal cavity 611. The bottom case 615 also includes a triangular-shaped tab 616 extending from a posterior region of the bottom case 615 that facilitates transitioning of the pedal 610 to an "upright" configuration and/or positioning of the pedal 610 for receiving a user's foot. The triangular-shaped tab 616 and/or any other portion of the bottom case 615 can include material regions that grip the foot or footwear of the user to further support retention of the foot of the user at the pedal 610 in the engaged mode of the system; however, other embodiments of the bottom case 615 can alternatively omit the triangular-shaped tab and/or material regions for gripping. The main material of the bottom case 615 shown in FIGS. 6A-6O is composed of a nylon-based material (e.g., Nylon 66, Nylatron, etc.) having desired wear properties, self-lubricating properties, and/or other properties; however, alternative variations of the bottom case 615 can alternatively be composed of any other suitable material.

The pedal 610 is configured to rotate about a pitch axis 601 defined by a main drive shaft 620. The main drive shaft 620 has a first end region 621a coupled to a bearing 622 retained at the first side wall 613a, extends through the internal cavity 611 and a bearing 622 retained at the second side wall 613b, and terminates at a second end region 621b. The main drive shaft 620 is cylindrical along at least some portions of its length. As such, the main drive shaft 620 has a rotational degree of freedom about the pitch axis 601. In other embodiments, the main drive shaft 620 can be retained in position using fewer or greater components. Furthermore, either of the first shaft region 621a and the second shaft region 621b can extend through its corresponding side wall 613a, 613b in order to adjoin to sporting equipment (e.g., a crank arm of a bicycle), an apparatus (e.g., rowing machines, recumbent exercise equipment), or a transportation vehicle (e.g., motorcycle, moped).

In material composition, the main drive shaft 620 is composed of a steel material (e.g., stainless steel 303); however, other embodiments of the main drive shaft 620 can be composed of another material having suitable properties. Variations of the main drive shaft 620 can have lengths from 2-8 inches and diameters from 0.2 to 2 inches. However, alternative variations of the main drive shaft 220 can have any other suitable dimensions.

As shown in FIGS. 6A-6O, the main drive shaft 620 includes a region 623 (referred to herein as "main drive shaft region" or "region of the main drive shaft") configured to interact with elements associated with transitioning the pedal system 600 between a locked mode and a released mode, where the locked mode prevents rotation of the pedal 610 relative to the main drive shaft 620 and the released mode allows rotation of the pedal 610 relative to the main drive shaft 620. The region 623 of the main drive shaft 620 is located along the length of the main drive shaft 620 and positioned within the internal cavity 611 of the pedal 610. In the embodiment of FIGS. 6A-6O, the region 623 of the main drive shaft 620 is configured to physically interact with a plunger 635 for transitioning the pedal system 600 between modes of operation. Other embodiments of the region 623 of the main drive shaft 620 can operate without direct physical contact (e.g., by including magnetic regions that provide or otherwise interact with magnetic fields). Yet other alternative embodiments of the region 623 of the main drive shaft 620 can operate in coordination with a sensor (e.g., force sensor, optical sensor, proximity sensor, etc.) that detects when the system 600 has engaged the user, and transitions the system 600 between a locked mode and a released mode accordingly.

In some embodiments, as shown in FIGS. 6A-6O, a collar 624 can be coupled to the region 623 of the main drive shaft 620 for facilitating transition between the locked and released modes. The collar 624 is a cylindrical tube coupled to the main drive shaft 620 such that the main drive shaft 620 passes through the collar 624. The collar 624 includes a second interlocking surface 636b configured to interact with other elements (e.g., plunger 635) in the locked mode, by way of direct physical contact. In other embodiments, the collar 624 can have any shape suitable for facilitating transition between modes of operation. Additionally, the second interlocking surface 636b can include a set of teeth configured to mate with a set of teeth of the plunger 635, described in greater detail below. The collar 624 has an inner diameter approximately equal to the diameter of the main drive shaft 620 (e.g., 0.2 to 2 inches) and an outer diameter slightly larger than its inner diameter or an outer diameter approximately equal to a diameter of the plunger 635. In material composition, the collar 624 is composed of a metal material (e.g., stainless steel 303) having suitable mechanical properties in compression, shear, and wear, in relation to translation along the pitch axis 601. In some embodiments, the collar 624 is composed of the same material as the main drive shaft 620 and/or the plunger 635. Alternatively, the collar 624 can be composed of any material suitable for interacting with other elements of the system 600.

The plunger 635 includes a first plunger region 631a configured to interact with the region 623 of the main drive shaft 620 and/or the collar 624. The first plunger region 631a includes a first interlocking surface 636a configured to mate with the second interlocking surface 636b of the collar 624 and/or the region 623 of the main drive shaft 620. Shown in FIG. 6C, the first interlocking surface 636a includes a first set of teeth configured to mate with a second set of teeth of the second interlocking surface 636b. In other embodiments, only one of the interlocking surfaces (e.g., 636a, 636b) includes a set of teeth. Alternatively, one or both of the interlocking surfaces (e.g., 636a, 636b) can include a grip for interfacing the interlocking surfaces 636 in a locked mode. The plunger 635 also includes a second plunger region 631b configured to interact with a biasing spring 639, where the biasing spring 639 biases the plunger 635 into contact with the collar 624 when the trigger 680 is released, as described in more detail below. The plunger 635 is retained with a translational degree of freedom along a plunger stop 638 coupled to the bottom case 615 of the pedal 610.

The plunger 635 is a cylindrical body with a first plunger arm 633a and a second plunger 633b extending from the body. In the embodiment, the cylindrical body of the plunger 635 is hollow (i.e., the plunger 635 has a bore through its body). As such, the plunger 635 is coupled to the main drive shaft 620 such that the main drive shaft 620 passes through the body of the plunger 635. The plunger 635 can be coupled to the main drive shaft 620 by fasteners 602, adhesive, etc. Alternatively, the plunger 635 can be physically separated from the main drive shaft 620 or manufactured as integral to the main drive shaft 620. In alternative embodiments, the plunger 635 can have any other suitable form that facilitates translation of the plunger 635 along the pitch axis 601.

In material composition, the plunger 635 is composed of a metal material (e.g., stainless steel 303) having suitable mechanical properties in compression, shear, and wear, in relation to translation along the pitch axis 601. The biasing spring 639 is composed of zinc-plated music wire having a suitable spring constant. However variations of the plunger 635 and/or biasing spring 639 can be composed of another material having suitable properties. Variations of the plunger 635 can have lengths from 0.1-2 inches. The plunger 635 can have an inner diameter (e.g., diameter of the bore) approximately equal to the diameter of the main drive shaft 620. The outer diameter of the plunger 635 is approximately 0.3-2 inches. However, alternative variations of the plunger 635 can have any other suitable dimensions.

The plunger stop 638, as shown in FIGS. 6D and 6E, functions to constrain motion of the plunger 635 along the pitch axis 601. The plunger stop 638 is coupled to the pedal 610 within the internal cavity 611, and can be coupled to one or more of the top surface 612, pair of side walls 613a, 613b, and/or bottom case 615 in order to properly constrain motion of the plunger 635. As shown in FIGS. 6D-6E (with corresponding top views in FIGS. 6F-6G), the plunger stop 638 includes two walls extending from the side wall 613b approximately orthogonal to the side wall 613b (i.e., the walls of the plunger stop 638 are parallel to the pitch axis 601). The plunger stop 638 includes one or more ridges 637 for retaining the first plunger arm 633a and the second plunger arm 633b. As such, the plunger arms (e.g., 633a, 633b) are configured to slide along the ridge as the main drive shaft 620 transitions between a locked mode and a released mode. One surface of the ridge 637 is approximately parallel to the top surface 612 and the other surface of the ridge 637 is approximately parallel to the side wall 613b. As shown in FIGS. 6A-6O, the walls of the plunger stop 638 form a channel through which the main drive shaft 620 translates (e.g., in a direction along the pitch axis 601 defined by the main drive shaft 620), in response to forces applied by a trigger 680. As such, the main drive shaft 620 passes through the biasing spring 639 between walls of the plunger stop 638. A side of the ridge 637 parallel to the side wall 613b contacts the plunger 635 at a terminal portion of the range of translation of the plunger 635 (i.e., the side of the ridge 637 parallel to the side walls opposes the force applied by the trigger). Variations of the plunger stop 638 can include any other suitable feature for guiding motion of the plunger 635 and/or the main drive shaft 620 along a desired path.

In material composition, the plunger stop 638 is composed of a material (e.g., nylon 66, other nylon material, other polymer) having suitable mechanical properties in shear and wear, in relation to translation of the plunger 635 relative to the plunger stop 638 in association with locked and released modes. However, variations of the plunger stop 638 can be composed of another material having suitable properties.

As shown in various configurations of FIGS. 6A-6O, the trigger 680 functions to transition the pedal system 600 between different modes of operation. In one embodiment, the trigger 680 has an active face 683 in communication with the first plunger arm 633a and/or the second plunger arm 633b, where interaction with the trigger 680 by the user's foot or footwear causes the active face 683 to apply pressure to the first plunger arm 633a and/or the second plunger arm 633b, separating the plunger 635 from the region 623 of the main drive shaft 620. Thus, interaction with the trigger 680 can simultaneously induce transitions between locked and released modes of the pedal 610, and transitions between engaged modes of the pedal 610, as described in more detail below.

The trigger 680 is rotatable about an axis parallel to the pitch axis 601, where the axis is defined by a rod 650 (shown in FIGS. 6H and 6I) coupled to the pair of side walls 613a, 613b within the internal cavity 611 of the pedal 610. The trigger 680, as shown in FIGS. 6A and 6J, includes a first trigger region 681a that is coupled to the rod 650 and a second trigger region 681b exposed through the top surface 612 of the pedal 610 through the opening 614 of the top surface 612 of the pedal 610. The first trigger region 681a is coupled to the rod 650 by inclusion of a bore through which the rod 650 passes, where the trigger 680 is able to rotate independently of rotation of the rod 650, by way of its coupling. The bore of the trigger 680 is thus configured between the pair of bores of the lever 670 within the internal cavity 611. The user can engage the second trigger region 681b, in order to transition the pedal system 600 between the locked mode and the released mode, described in greater detail below. The trigger 680 also functions to cause locking of a position of the cuff 660 in the engaged mode and to cause unlocking of the position of the cuff 660 in the disengaged mode, thereby allowing the user to release his or her feet from the system in an efficient and intuitive manner and prevent trapping of the user's foot at the pedal when the user wishes to disengage the system.

In morphology, the trigger 680 has a contact surface 682 that contacts the foot or footwear of the user during use of the pedal system 600. The contact surface 682 is biased into an inclined configuration by a torsion spring 606 coupled to the rod and in communication with one or more internal surfaces of the pedal 610, such that the contact surface 682 protrudes from the opening 614 of the top surface 612 when the user is not contacting the pedal 610. The torsion spring thus restores the trigger 680 to a state where the contact surface 682 is inclined relative to the top surface 612 of the pedal 610. The inclined configuration promotes engagement of the trigger 680 along a posterior-to-anterior direction by the foot of the user, such that a torsional force applied to the trigger 680 rotates the trigger 680 about the rod until the contact surface 682 is substantially flush with the opening 614. In one embodiment, the trigger 680 has a T-shaped portion extending posteriorly from the contact surface 682, where the T-shaped portion engages the tab(s) 673 of the lever 670 in relation to linked motion of the lever 670 with the trigger 680. The T-shaped portion can, however, be alternatively configured with any other suitable morphology. Additionally, variations of the trigger 680 can have any other suitable surface morphology (e.g., pyramid or spherical shape, etc.) that promotes engagement with the trigger 680 along any path and/or in any other suitable manner.

The trigger 680 also has a trigger pin 685 protruding laterally from a portion of the trigger 680 within the internal cavity 611 of the pedal 610, where the trigger pin 685 interacts with a locking subsystem including a pawl 687 and a sector gear 689, described in more detail below in relation to FIGS. 7A-7C. The trigger pin 685 of the trigger 680 thus promotes locking of a position of the rod 650, arm 665, or cuff 660 in the engaged mode and rapidly releases locking of a position of the rod 650, arm 665, or cuff 660 in the disengaged mode described in more detail below.

In material composition, the trigger 680 is composed of an aluminum material (e.g., Aluminum 6061-T6) that is robust against torsional stresses, compressive stresses, and fatigue in relation to forces applied by the user's foot to the trigger 680. However, variations of the trigger 680 can be composed of another material having suitable properties. The active face 683 of the trigger 680 can also be coated with, treated with, or include a material that reduces friction or wear (e.g., graphite, Teflon, polyethylene, lubricant, etc.) associated with interactions with a plunger arm 633 during operation.

The cuff 660, as shown in FIG. 6A, functions to retain a user's foot or footwear at the pedal 610 in an engaged mode and to enable release of the user's foot or footwear from the pedal 610 in a disengaged mode, where the engaged mode and the disengaged mode are variations of modes 690a and 690b described in greater detail below. The cuff 660 also functions to robustly support the user's foot or footwear at the pedal 610 (e.g., with a compressive force provided by the cuff 660 and the pedal 610). In material composition, the cuff 660 is composed of a material that is robust against bending stresses, shear stresses, compressive stresses, tensile stresses, and fatigue, in relation to forces incurred with the cuff 660 while a user interacts with the system 600. The cuff 660 is composed of a polymeric material (e.g., Nylon 66, other polymer material). However, variations of the cuff 660 can be composed of another material having suitable properties.

The cuff 660 also functions to provide comfort to the user as the user performs an activity, by inclusion of soft, resilient, and/or otherwise compliant materials that interface with the user's foot or footwear during operation of the system 600 in the engaged mode 690a. As such, portions of the cuff 660 (e.g., portions of the cuff 660 facing the foot or footwear of the user) are coupled to a pad 661 composed of a urethane foam material (urethane foam 4701-40-15375) having a thickness of 9.35 mm.

In morphology, the cuff 660 can has a concave surface facing the user's foot or footwear, such that the concave surface is complementary to the shape of the foot or footwear of the user. The cuff 660 shown in FIG. 6A has a closed medial side and an open lateral side that allows the user to rapidly and easily disengage the system 600 during critical moments. The cuff 660 also has open anterior and posterior sides. The morphology of the cuff 660 is designed be appropriate for variations in user foot morphology (e.g., in terms of shoe size, in terms of width, etc.). In the engaged mode described, the cuff 660 spans a cuneiform region of the user's foot, and to be released from the cuneiform region as the user disengages the system.

The cuff 660 may be coupled to the rod 650, such that a force applied to the lever 670 described below rotates the rod 650 and allows the cuff 660 to comfortably compress (e.g., with a desired amount of force) the user's foot or footwear between the top surface 612 of the pedal 610 and the pad 661 of the cuff 660. Coupling between the cuff 660 and the rod 650 is at a region of the rod 650 outside of the body of the pedal 610 (e.g., at a portion of the rod 650 extending through a medial side wall of the pedal 610 and exterior to the pedal 610). In one embodiment, the cuff 660 is coupled to the rod 650 by an arm 665 where the arm 665 transforms rotation of the rod 650 induced by the lever 670 (described below) into motion of the cuff 660 along an inferior-superior direction, thereby retaining and releasing the foot of the user during different modes of operation.

The arm 665 has a linkage form factor and includes bores at its ends for fastening to the rod 650 and to the cuff 660. In morphology, the arm 665 includes recessed portions that enable the arm 665 to be structurally robust against bending and compression, with less overall material volume. The arm 665 is composed of aluminum (e.g., aluminum 6061-T6). However, variations of the arm 665 can be composed of another material having suitable properties. Variations of the arm 665 can have a length from 2-8 inches, a width from 0.2-0.75 inches, and a height from 1-5 inches. However, alternative variations of the arm 665 can have any other suitable dimensions. Furthermore, the cuff 660 can couple to other components of the system (e.g., the main drive shaft 620 described) with any other suitable number of arms, in order to define a path and range of motion of the cuff 660 in associated with transitions between different modes of the system.

The lever 670, as shown in FIG. 6A, functions to repeatedly and reversibly transition the cuff 660 between a configuration that retains the foot of the user and a configuration that releases the foot of the user, in association with the engaged mode and the disengaged mode described below. The lever 670 is coupled to the rod 650 and also exposed through the top surface 612 of the pedal 610 through the opening 614. The lever 670 includes a first lever region 671a that is coupled to the rod (e.g., a portion of the rod 650 within the internal cavity 611 of the pedal 610), such that motion of the lever 670 is coupled with rotation of the rod 650. The first lever region 671a includes a pair of bores through which the rod 650 passes, where the pair of bores is spaced about the first trigger region 681a of the trigger 680, within the internal cavity 611. The lever 670 also includes a second lever region 671b exposed through the opening 614, whereby the user can engage the second lever region 671b, thereby inducing motion of the rod 650 in association with transitioning the system 110 between the engaged mode and the disengaged mode.

In morphology, the lever 670 has a contact surface 672 that contacts the foot or footwear of the user during use of the system 600. The contact surface 672 is biased into an inclined configuration and coupled to the trigger 680 (described below) in its baseline unloaded state, such that the contact surface 672 protrudes from the opening 614 of the top surface 612 when the user is not contacting the pedal 610. The inclined configuration promotes engagement of the lever 670 along a posterior-to-anterior direction by the foot of the user, such that a torsional force applied to the lever 670 rotates the lever 670 about the rod 650 until the contact surface 672 is substantially flush with the opening 614. However, variations of the lever 670 can have any other suitable surface morphology (e.g., pyramid or spherical shape, etc.) that promotes engagement with the trigger 680 along any path and/or in any other suitable manner.

The lever 670 also has at least one tab 673 extending from the contact surface 672, where the tab 673 interacts with the lever 670, as described in relation to the engaged and disengaged modes below. The tab 673 engages a portion of the trigger 680, where the tab 673 promotes coupling between the lever 670 and the trigger 680 during a first direction of motion (e.g., when transitioning from the disengaged mode to the engaged mode). The tab 673 can also allow motion of the lever 670 to be uncoupled from motion of the trigger 680 during a second direction of motion (e.g., when transitioning from the engaged mode to the disengaged mode). In FIG. 6A, a pair of tabs 673 protrudes posteriorly from the contact surface 672 of the lever 670, and the pair of tabs 673 contacts a T-shaped portion of the contact surface 682 of the trigger 680 described above; however, the tab(s) 673 can alternatively have any other suitable morphology.

In material composition, the lever 670 is composed of an aluminum material (e.g., Aluminum 6061-T6) that is robust against torsional stresses, compressive stresses, and fatigue in relation to forces applied by the user's foot to the lever 670. However, variations of the lever 670 can be composed of another material having suitable properties. The contact surface 672 of the lever 670 can also be coated with, treated with, or include a material that reduces friction or wear (e.g., graphite, Teflon, polyethylene, lubricant, etc.) associated with interfaces with the user's foot during operation.

Additional elements shown in FIG. 6A contribute to the structural integrity and/or function of the pedal system 600. For example, the fasteners 602 and the pins 604 are configured to fasten elements together, the bushings 603 allow a rotational degree of freedom for associated elements, one or more arms including arm 605 control motion of the cuff 660, and the washers 607 and torsion springs 608 provide a biasing or return force for associated elements.

The components of the pedal system 600 described above allow the pedal 610 to transition between different modes of operation. In the locked mode 640*a*, shown in FIG. 6D, FIG. 6F, and FIG. 6H, rotation of the pedal 610 about the main drive shaft 620 is prevented, thereby allowing the user to easily place his or her foot into the pedal 610. Without the locked mode 640*a*, the pedal 610 could otherwise be in a rotated-forward or rotated-reversed configuration that would make it difficult for the user to engage the pedal 610. In more detail, in the locked mode 640*a* the trigger 680 is unloaded and the biasing spring 639 is in an extended state, thereby positioning the plunger 635 such that the region 623 of the main drive shaft 620 is positioned at the first plunger region 631*a*. In one example, the plunger 635 interlocks with the collar 624 coupled to the region 623 of the main drive shaft 620 (e.g., by the interlocking surfaces 636).

The trigger 680 is shown in an unloaded state (e.g., disengaged mode 690*b*) in FIG. 6J. Although the top surface 612 of the pedal 610 is not shown, the trigger 680 extends through the opening 614 of the top surface 612 when it is disengaged. FIG. 6K illustrates a second view of the pedal 610 shown in FIG. 6J, where the region 623 of the main drive shaft 620 interfaces with plunger 635. Although the trigger 680 is not shown in FIG. 6K, the trigger 680 disengaged, and in FIGS. 6J-6K, the first interlocking surface 636*a* mates with the second interlocking surface 636*b* of the region 623 of the main drive shaft 620, thereby preventing rotation of the pedal 610 about the pitch axis 601 of the main drive shaft 620. Additionally, FIG. 6N illustrates a cross sectional view of the pedal 610 where the trigger 680 is in a disengaged mode 690*b*. The trigger 680 extends through the opening 614 such that the contact surface 682 of the trigger 680 is protruding from the top surface 612.

In a transitional state, the pedal 610 is in between the locked mode 640*a* and the released mode 640*b*. The transitional state is a state in which the user interacts with the trigger 680 while placing his or her foot at the pedal 610. In more detail, in the transitional state the trigger 680 is compressed towards the top surface 612 of the pedal 610. The trigger 680 is loaded as the user applies a torsional force to the trigger against the torsion spring, the first plunger arm 633*a* is in contact with the active face 683 of the trigger 680, and the biasing spring 639 is in a slightly compressed state, thereby positioning the plunger 635 such that the plunger 635 is moved away from the region 623 of the main drive shaft 620. As such, the first interlocking surface 636*a* is moved away from the second interlocking surface 636*b*, in the transitional state. The contact surface 682 of the trigger 680 may be partially protruding from the top surface 612 of the pedal 610 in the transitional state.

As a user places his or her foot at the pedal 610 and applies a torsional force to the trigger 680, the trigger 680 transitions from the position shown in FIG. 6N to the position shown in FIG. 6O. In FIG. 6O, the trigger 680 is depressed such that the trigger 680 is approximately flush with or recessed within the top surface 612. The trigger 680 position shown in FIG. 6O (e.g., engaged mode 690*a*) corresponds to the released mode 640*b*, shown in FIGS. 6L-6M. In the released mode 640*b*, the pedal 610 can rotate relative to the main drive shaft 620. The released mode 640*b* is associated with the user placing his or her foot at the pedal 610. In more detail, in the released mode 640*b* the trigger 680 is loaded due to the torsional force applied to the trigger 680 against the torsion spring and the biasing spring 639 is in a compressed state, thereby positioning the plunger 635 against the plunger stop 638. The trigger 680 is loaded in FIG. 6L such that the trigger is approximately flush with the top surface 612 (not shown in FIG. 6L). In the released mode 640*b*, the active face 683 of the trigger 680 applies a force against the first plunger arm 633*a* and/or the second plunger arm 633*b* such that the plunger arms 633 are wedged between the active face 683 of the trigger 680 and the plunger stop 638. FIG. 6M illustrates the pedal 610 of FIG. 6L where the trigger 680 is loaded such that the region 623 of the main drive shaft 620 is physically separated from the plunger 635. Shown in FIG. 6M, in the released mode 640*b*, the region 623 of the main drive shaft 620 is physically separated from the plunger 635.

Figure 7C:
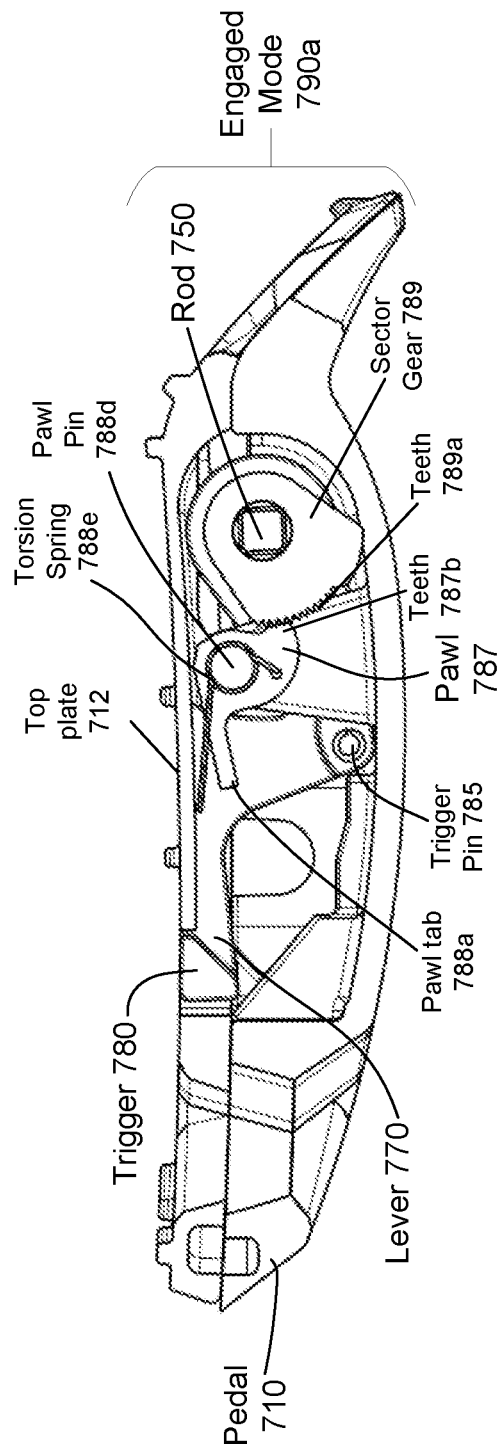
FIG. 7C depicts a cross sectional view of the pedal system of FIGS. 2A and 2B in an engaged mode, in accordance with one embodiment.

FIG. 7A depicts a cross sectional view of the pedal system of FIGS. 2A and 2B (which can be adapted to the pedal system of FIGS. 6A-6N) in a disengaged mode 790*b*, in accordance with one embodiment. FIG. 7B depicts a cross sectional view of the pedal system of FIGS. 2A and 2B in a transitional state, in accordance with one embodiment. FIG. 7C depicts a cross sectional view of the pedal system of FIGS. 2A and 2B in an engaged mode 790*a*, in accordance with one or more embodiments.

In the disengaged mode 790*b* of FIG. 7A, the trigger 780 and the lever 770 are in their baseline, unloaded states where the user has not applied a torsional force to the trigger 780 and lever 770 by stepping onto the top plate 712 of the pedal 710. The trigger 780 is coupled to the rod 750 and includes a trigger pin 785 protruding from a main body of the trigger 780 within the internal cavity of the pedal 710. The trigger pin 785 is contacting the pawl tab 788a of the pawl 787 in the disengaged mode 790b due to a biasing force provided by a torsion spring that maintains the trigger 780 in an inclined state relative to the top plate 712 when no force is applied to the trigger 780 by the user's foot. In this position, the set of teeth 788b of the pawl 787 do not contact the set of teeth 788a of the sector gear 788; thus, the position of the cuff is not locked.

In the transitional state of FIG. 7B, a torsional force has been applied to the trigger 780 (e.g., by a user stepping onto the top plate 712 of the pedal 710), and the lever 770 rotates with the trigger 780 due to contact between the tabs of the lever 770 and the T-shaped protrusion of the trigger 780. As the torsional force is applied to the trigger 780 by the user's foot, the trigger 780 rotates about the rod 750 into a configuration where the trigger pin 785 no longer contacts the pawl tab 788a, and a torsion spring 788e coupled to the pawl pin 788d passing through the pawl 787 biases the set of teeth 788b of the pawl 787 into contact with the set of teeth 789a of the sector gear 789. As more torsional force is applied to the trigger 780 and the lever 770 by the user's foot, the cuff 760 coupled to the rod 750 continues to ratchet down to comfortably compress the foot of the user between the top plate 712 of the pedal 710 and the cuff (not shown).

In the engaged mode 790a of FIG. 7C, the trigger 780 has been fully rotated such that its contact surface 782 is flush with the opening of the top plate 712 of the pedal 710, the trigger pin 785 is fully displaced away from the pawl tab 788a, and the position of the cuff coupled to the rod 750 is substantially locked due to engagement between the set of teeth 788b of the pawl 787 and the set of teeth 789a of the sector gear 789.

In association with transitioning from the engaged mode 790a of FIG. 7C to the disengaged mode 790b of FIG. 7A, when the user releases the trigger 780, the motion of the trigger pin 785 toward the pawl tab 788a rapidly disengages the set of teeth 788b of the pawl 787 from the sector gear 789. The rod 750 is then able to freely and rapidly rotate back to a baseline configuration where the cuff is displaced from the foot of the user, allowing the user to pull away from the pedal 710.

Figure 8A:
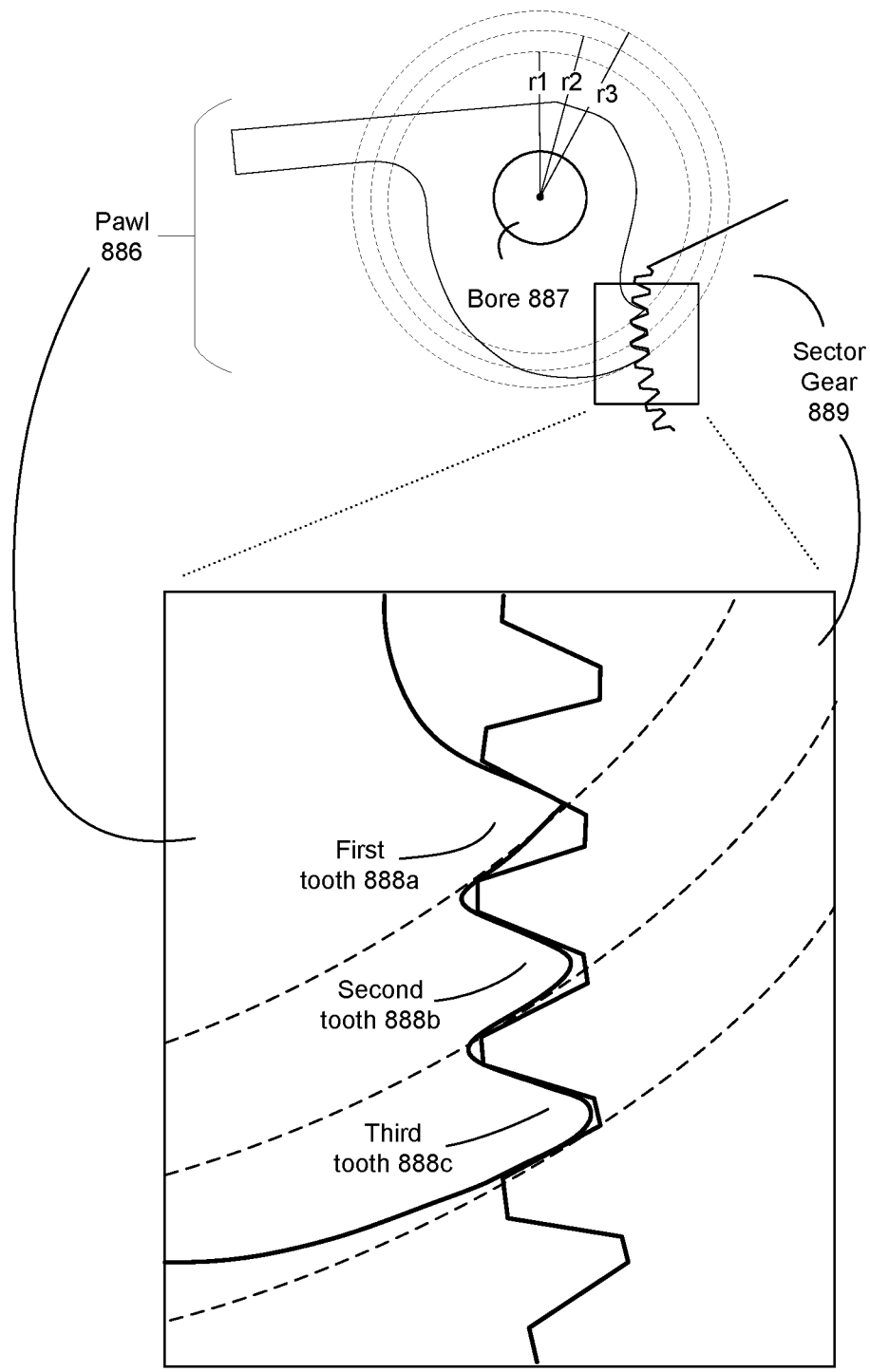
FIG. 8A shows a side view of a pawl and a sector gear, in accordance with one embodiment.

FIG. 8A shows a side view of a pawl 886 and a sector gear 889, in accordance with one or more embodiments. The pawl 886 and sector gear 889, in combination with operation of the trigger and trigger pin described above, can provide a variation of the locking subsystem 185 described with respect to FIGS. 1B and 1C. In particular, the configuration and morphology of components of the pawl 886 and sector gear 889 can allow components of the system, such as the cuff and arm coupled to the cuff, to reliably lock in position in the engaged mode, but to rapidly be unlocked in the disengaged mode so that the user can release his or her foot from the system.

As shown in FIG. 8A, the bore 887 of the pawl 886 through which the pawl pin passes defines circular reference geometry associated with a set of teeth, including teeth 888a, 888b, and 888c of the pawl 886 that interface with the sector gear 889. In relation to the circular reference geometry, biting edges of the set of teeth (i.e., edges that contact the sector gear in the engaged mode) have angles (e.g., profile angles or pressure angles) defined by arcs of concentric circles centered about the center point of the circular reference geometry. As shown in FIG. 8A, a first tooth 888a corresponds to (e.g., has a biting edge surface tangential to) a first concentric circle having a first radius, a second tooth 888b corresponds to (e.g., has a biting edge surface tangential to) a second concentric circle having a second radius, and a third tooth 888c corresponds to (e.g., has a biting edge surface tangential to) a third concentric circle having a third radius, where the second radius is longer than the first radius by an incremental length and the third radius is longer than the second radius by the incremental length. The first tooth 888a thus fills a first volume of its corresponding sector gear space, the second tooth 888b fills a second volume (larger than the first volume) of its corresponding sector gear space, and the third tooth 888c fills a third volume (larger than the second volume) of its corresponding sector gear space in the engaged mode of the system.

Figure 8B:
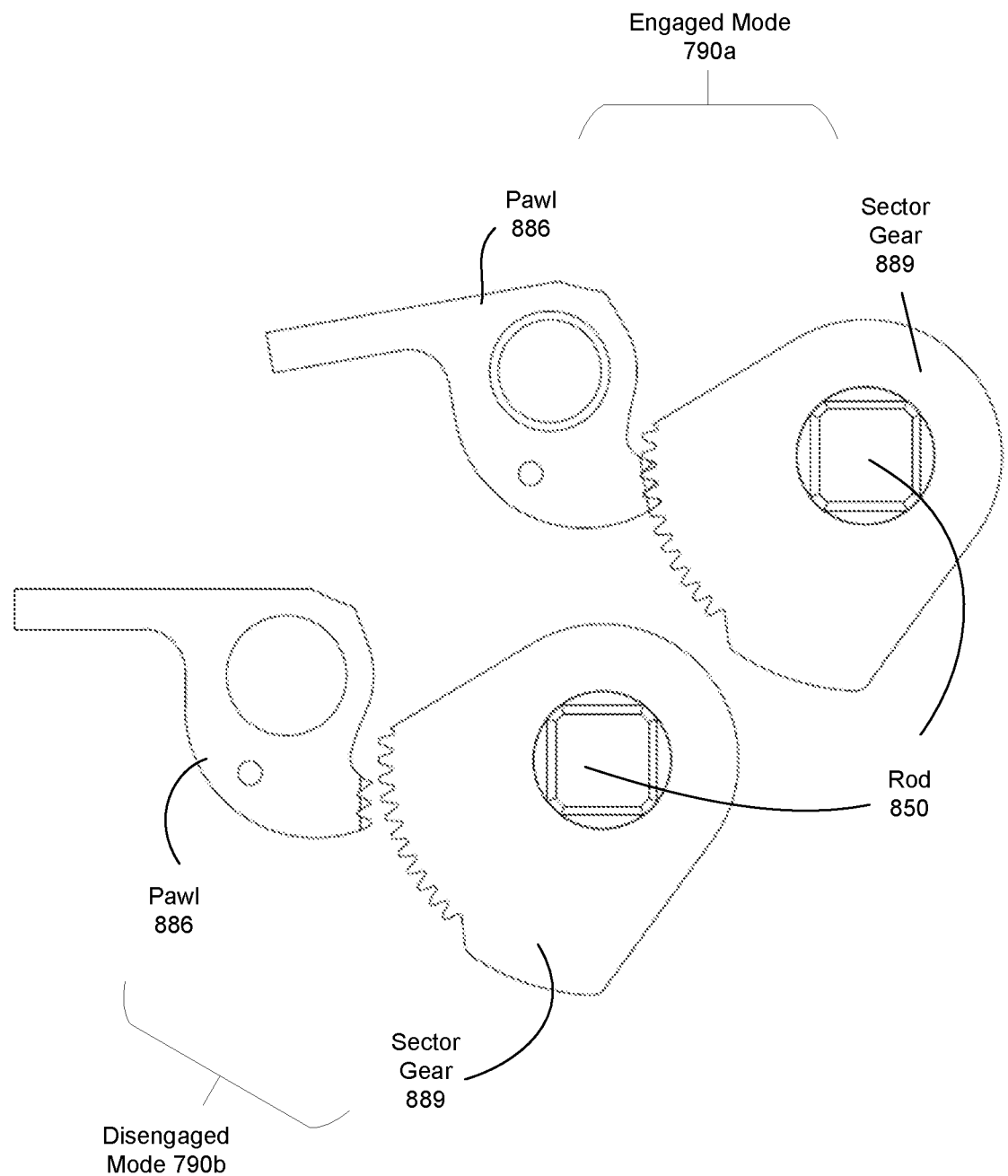
FIG. 8B is a diagram shows operation modes of the pawl and the sector gear of FIG. 8A, in accordance with one embodiment.

FIG. 8B depicts side views of interactions between the pawl 886 and sector gear 889 in an engaged mode 890a and a disengaged mode 890b, in association with the engaged modes and disengaged modes described above. In the engaged mode 890a, the set of teeth of the pawl 886 are in contact with teeth of the sector gear, thereby allowing the position of the rod 850 (and the cuff, not shown) to be locked in position to facilitate retention of the user's foot at the pedal. Then, in the disengaged mode 890b, the set of teeth of the pawl 886 do not contact teeth of the sector gear, thereby allowing the rod 850 (and the cuff, not shown) to rotate freely to facilitate release of the user's foot from the pedal.

Various embodiments of the pawl shown in FIGS. 8A and 8B can alternatively have any other suitable morphology (e.g., in terms of number of teeth, reference features, tooth thicknesses, tooth angles, depths, tooth clearances, etc.). Similarly, the sector gear can have any other suitable morphology (e.g., arc over which sector gear teeth span, number of teeth, tooth thicknesses, tooth angles, tooth depths, tooth clearances, etc.) in relation to proper operation of the locking subsystem associated with the pawl 886 and sector gear 889.

Figure 9A:
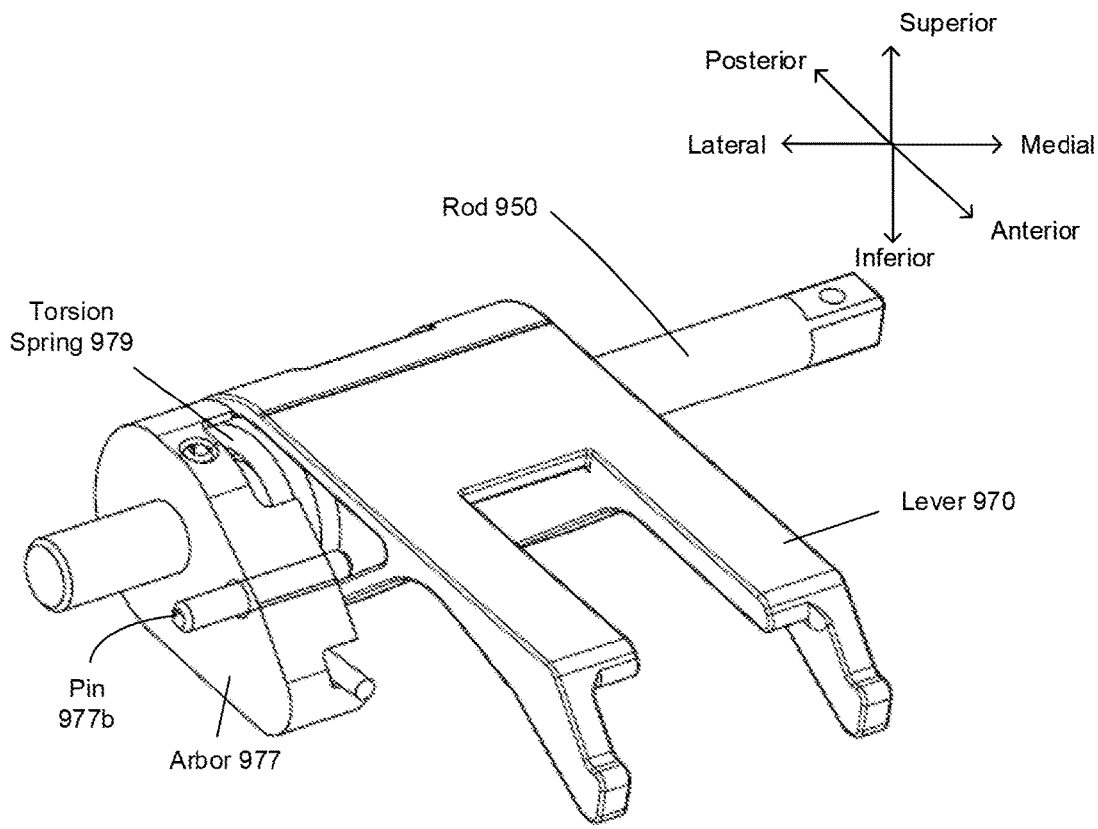
FIG. 9A is a perspective view of elements that facilitate reception of various foot or footwear by the pedal system, in accordance with one embodiment.
Figure 9B:
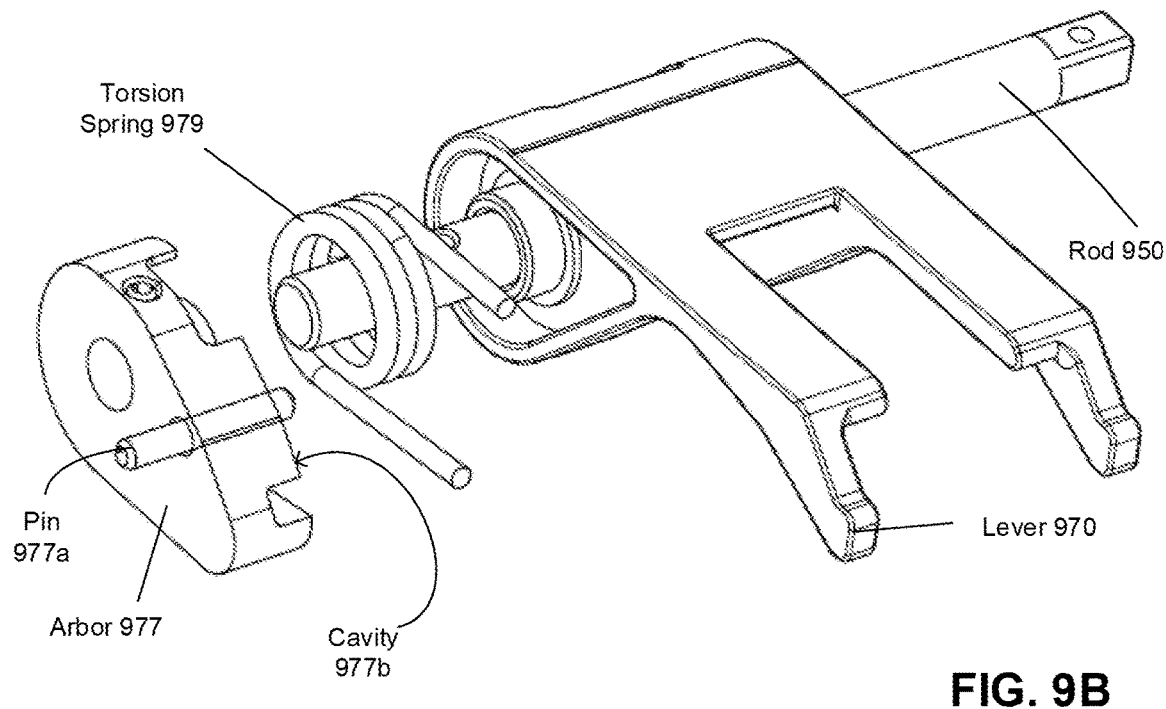
FIG. 9B is an exploded view of the elements of FIG. 9A, in accordance with one embodiment.

FIG. 9A is a perspective view of elements that facilitate reception of various foot or footwear by the pedal system, in accordance with one embodiment. FIG. 9B is an exploded view of the elements of FIG. 9A, in accordance with one embodiment. Elements of FIGS. 9A and 9B provide a mechanism for allowing the cuff to comfortably retain various foot sizes at the pedal, with a substantially similar levels of force regardless of foot size. As such, in the engaged mode 690a described above in relation to FIG. 7C, after a given level of compression is achieved between the cuff and the pedal, the cuff position locks in place without further compressing the foot of the user.

The rod 950 and lever 970 are variations of the rod and lever described in accordance with one or more embodiments and variations above.

The arbor 977 (shown in FIG. 2D as arbor 277) is coupled to the rod 950 and fixed to rotate with the rod 950 about the axis defined by the rod 750. The arbor 977 includes a pin 977a (shown in FIG. 2D as arbor 277a) that couples it to the lever 970 (i.e., to a lateral side of the lever 970) and maintains alignment between the arbor 977 and the lever 970. The arbor 977 also has a cavity 977b for receiving and positioning a torsion spring 979 (shown in FIG. 2D as torsion spring 279) between the arbor 977 and the lever 970. The torsion spring 979 has an end coupled to the arbor (e.g., seated within a channel of the cavity 977b of the arbor 977) and an end coupled to the lever, and allows the lever 970 to continue to rotate (e.g., in response to a force applied to the user's foot at the lever 970) while preventing the cuff (coupled to the rod 950 and not shown) from applying beyond a threshold level of force to the foot of the user at the pedal. As such, after a force applied to the user's foot by the cuff and the pedal reaches a certain level, additional forces generated by further rotation of the lever 970 as the user fully steps onto the pedal are absorbed by the torsion spring 979 within the arbor 977.

In material composition, the arbor 977 is composed of a steel material (e.g., steel plated material, 303 stainless steel, etc.) that is robust against torsional stresses and compressive stresses in relation to forces applied to the arbor 977 by the torsion spring 979, the rod 950, and the lever 970 as the lever 970 rotates. In material composition, the torsion spring is composed of zinc plated music wire providing an appropriate spring force to control the threshold level of force applied to the user's foot by the cuff. Various embodiments of the arbor 977 and the torsion spring 979 can, however, be composed of any other suitable material.

Figure 10A:
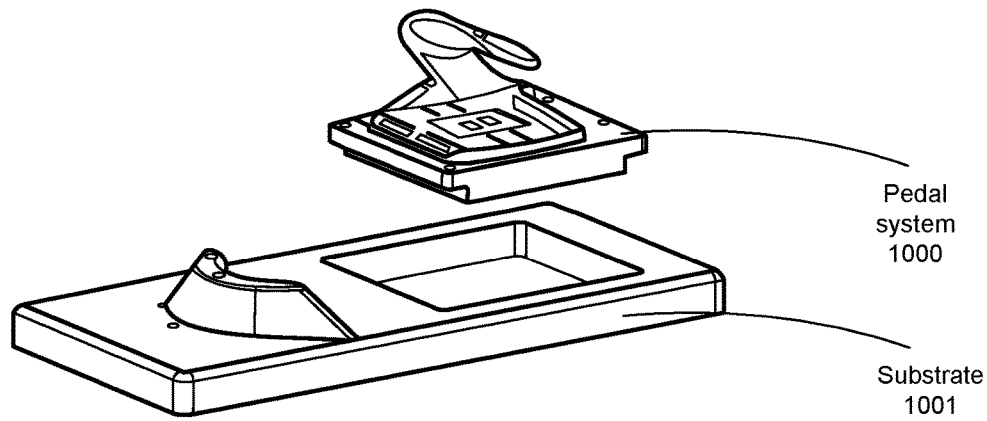
FIG. 10A depicts a partially exploded view of the pedal system, in accordance with one embodiment.

FIG. 10A depicts a partially exploded view of the pedal system, in accordance with one embodiment, where the variation of the pedal system 1000 can be coupled to another substrate 1001. The substrate 1001 can be associated with a foot receiving component of another apparatus, sporting equipment (e.g., rowing machine, recumbent bike, elliptical, etc.), or transportation system (e.g., motorcycle, moped), where some level of retention of the user's feet is desired.

Figure 10B:
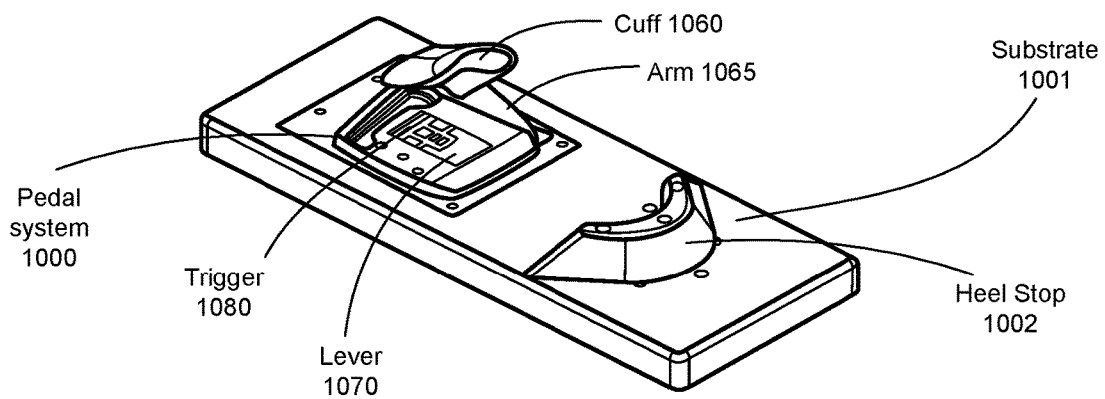
FIG. 10B depicts a perspective view of the pedal system of FIG. 9A in an assembled state, according to one embodiment.

FIG. 10B depicts a perspective view of the pedal system of FIG. 10A in an assembled state, according to one embodiment, where the pedal system 1000 includes a cuff 1060, arm 1065 coupled to the cuff 1060, lever 1070, and trigger 1080, which are variations of the cuff 160, arm 165 coupled to the cuff 160, lever 170, and trigger 180 shown in FIGS. 1B and 1C. Other components (not shown) of the pedal system 1000 can include variations of the rod 150, locking subsystem 185, main drive shaft 120, and plunger 130 of the pedal system 100 shown in FIGS. 1A-1C, in relation to different operation modes. In the variation shown in FIG. 10B, the substrate 1001 also includes a heel stop 1002 that positions and/or retains a posterior region of a user's foot between the substrate 1001 and the system 1000.

Figure 10C:
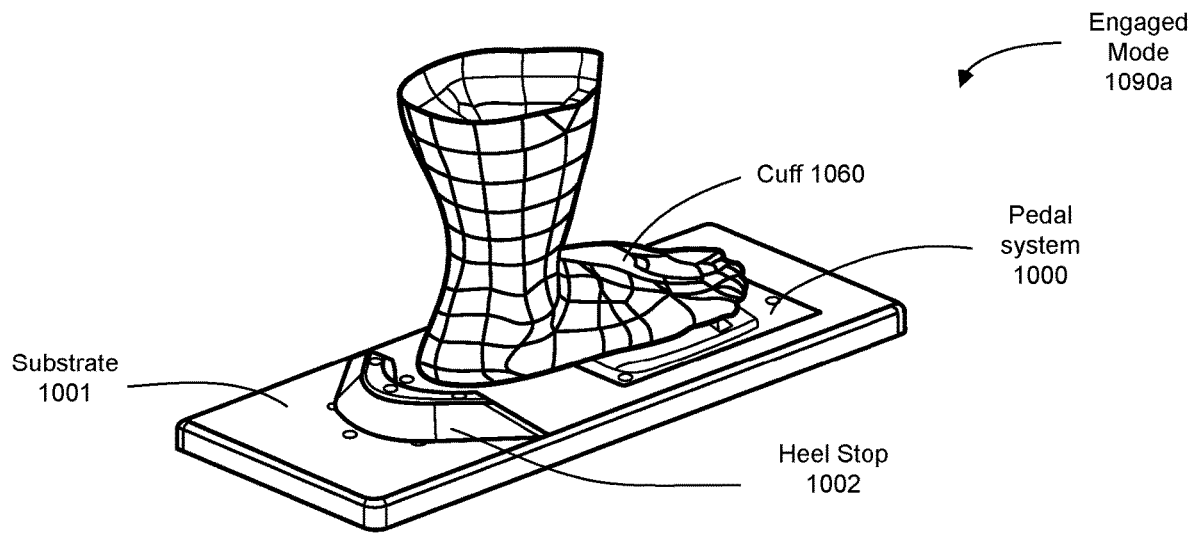
FIG. 10C is a diagram illustrating a user's foot or footwear placed on the pedal system of FIGS. 10A and 10B, according to one embodiment.

FIG. 10C is a diagram illustrating a user's foot or footwear placed on the pedal system of FIGS. 10A and 10B, according to one embodiment, where a user's foot is retained between the substrate 1001 and the cuff 1060, with the heel stop 1002 providing a position marker for the user's foot in relation to proper positioning of the user's foot at the pedal system 1000.

While embodiments, variations, and examples of pedal systems are described above, the pedal system(s) can additionally or alternatively include any other suitable elements that promote retention and/or release of a foot of a user. Furthermore, sub elements (e.g., sub elements of a trigger, sub elements of a lever, sub elements of a main drive shaft, etc.) described in relation to a main elements above can, in alternative variations, be swapped across other main elements to achieve alternative variations of described mechanisms.

Figure 11:
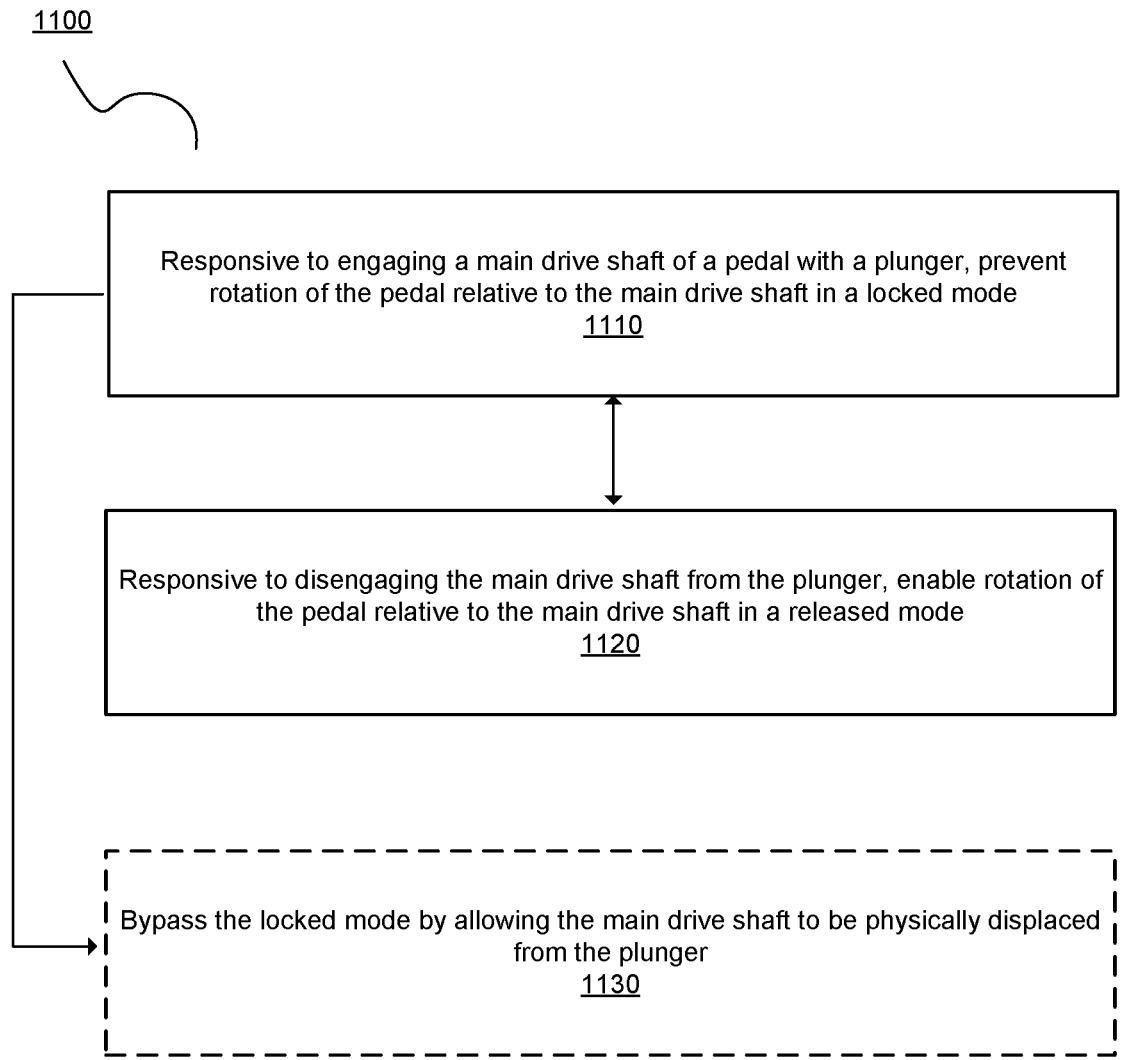
FIG. 11 is a flowchart illustrating a method changing pedal configuration, in accordance with one embodiment.

FIG. 11 is a flowchart illustrating a method changing pedal configuration, in accordance with one embodiment. The method 1000 of FIG. 11 may be performed by an embodiment or variation of the pedal system described above with reference to FIGS. 1A, 3A-3C, and 4.

The pedal system includes a pedal, a main drive shaft rotatably coupled to the pedal, and a plunger that engages 1110 the main drive shaft to prevent rotation of the pedal relative to the main drive in a locked mode. Engagement of the main drive shaft by the plunger can be controlled by a trigger of the pedal system and a spring coupled to the plunger that provides a counter force to a force applied by the trigger, where the trigger and spring can move in response to an applied force or a removed force (e.g., a torsional force), and subsequently transfer force to the plunger. The pedal, main drive shaft, plunger, and trigger can be embodiments or variations of the pedal, main drive shaft, plunger, and trigger described above. Furthermore, as described above, the pedal, main drive shaft, plunger, and trigger can include, be coupled to, or otherwise be associated with bearings, bushings, pins, guides, linear springs, torsional springs, and/or any other suitable elements that constrain motion, guide motion, provide a biasing force, provide a restoring force, and/or affect movement of the elements in any other suitable manner.

In engaging 1110 the main drive shaft, the plunger can engage an active region of the main drive shaft, where the active region can be a region having morphological features and/or physically active features (e.g., magnetic features) that can be interacted with by the plunger. As such, responsive to engaging a main drive shaft of a pedal with a plunger, the method 1100 can include placing the pedal in a locked mode to prevent rotation of the pedal relative to the main drive shaft. In a first variation, the active region includes a polygonal prismatic segment of the main drive shaft having sides that can be physically obstructed by a region of the plunger. In another variation, the active region includes a magnetic element coupled to the main drive shaft that can be interacted with by a corresponding magnetic element of the plunger to obstruct motion of the main drive shaft. As such, engaging the main drive shaft can include translating a first region of the plunger into physical or non-physical contact with an active region of the main drive shaft, and in more detail can include establishing physical contact between a flat surface of the plunger and a face of a polygonal prismatic segment of the main drive shaft. Other variations of the active region can operate in any other suitable manner.

The plunger of the pedal system can also disengage 1120 the main drive shaft to enable rotation of the pedal relative to the main drive shaft in a released mode. As such, the method 1100 can include: responsive to disengaging the main drive shaft from the plunger, placing the pedal in the released mode to enable rotation of the pedal relative to the main drive shaft. Disengagement of the main drive shaft by the plunger can be controlled by the trigger of the pedal system and a spring coupled to the plunger that provides a counter force to a force applied by the trigger, where the trigger and spring can move in response to an applied force or a removed force (e.g., a torsional force), and subsequently transfer force to the plunger. As such, disengaging the main drive shaft can include translating a second region of the plunger into physical separation from an active region of the main drive shaft. In relation to the released mode, disengaging the main drive shaft by the plunger can include disengaging the active region of the main drive shaft to allow the pedal to rotate relative to the main drive shaft.

The method 1100 can be performed cyclically, such that the pedal can be repeatedly transitioned between the locked mode and the released mode any suitable number of times. In relation to transitioning between modes, the method 1000 can thus include: responsive to displacing the plunger relative to the main drive shaft, transitioning between the locked mode and the released mode.

As shown in FIG. 11, the pedal system 1100 can optionally bypass 1130 the locked mode by allowing the main drive shaft to be physically displaced from the plunger. The pedal system can include one or more compressible caps positioned between the main drive shaft and another surface of the pedal, as described above. Thus, even when the plunger engages the main drive shaft, the compressible cap(s) can compress and allow the main drive shaft to be displaced relative to the plunger if a sufficient force is applied to the main drive shaft.

In relation to bypassing the locked mode, the plunger can also be back driven in order to disengage the plunger from the main drive shaft.

Figure 12:
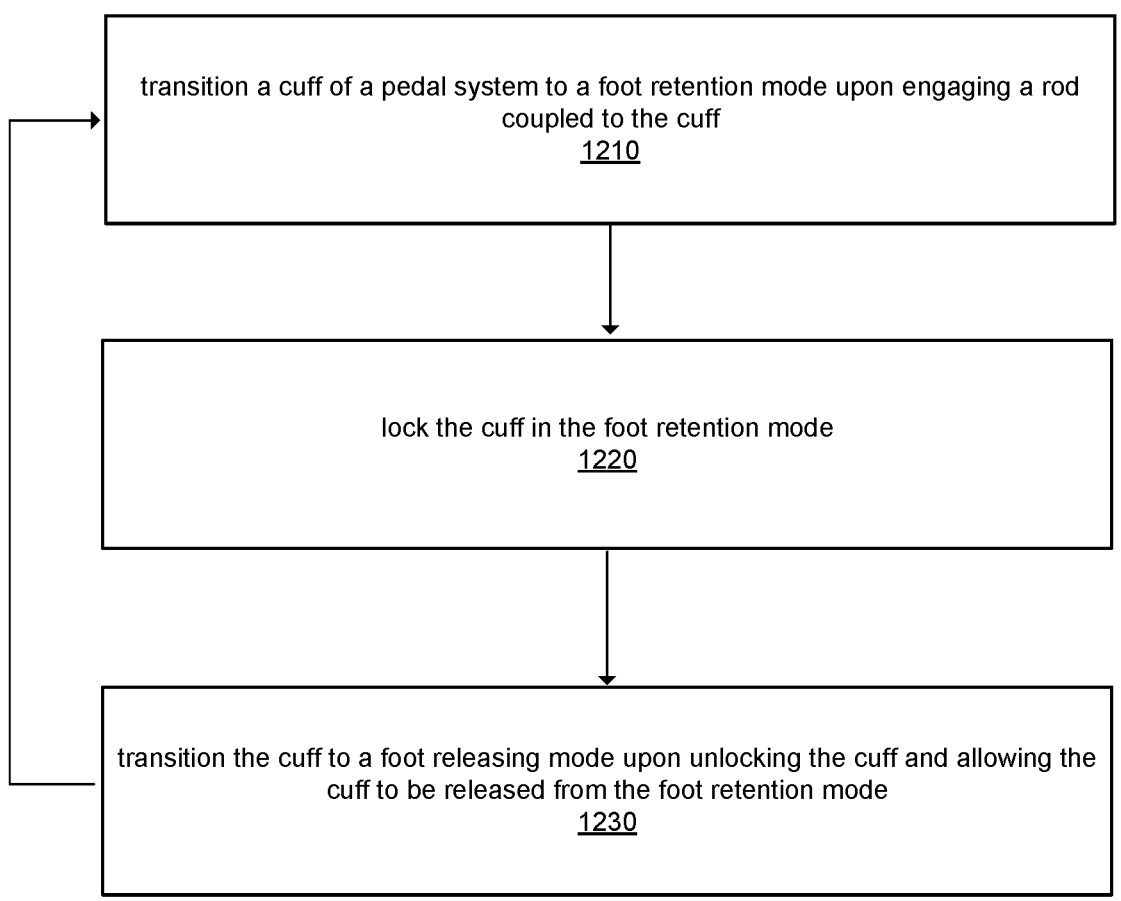
FIG. 12 is a flowchart illustrating a method for changing pedal configuration, in accordance with another embodiment.
Figure 8A:
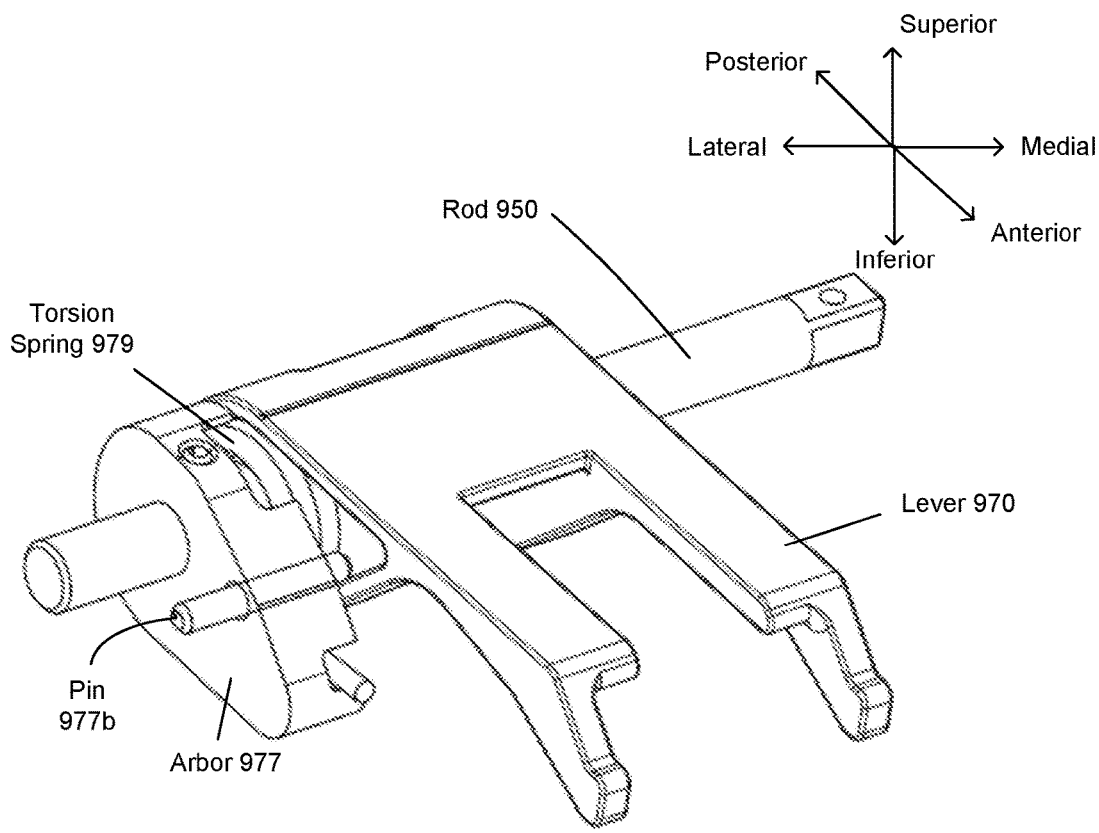
Figure 8B:
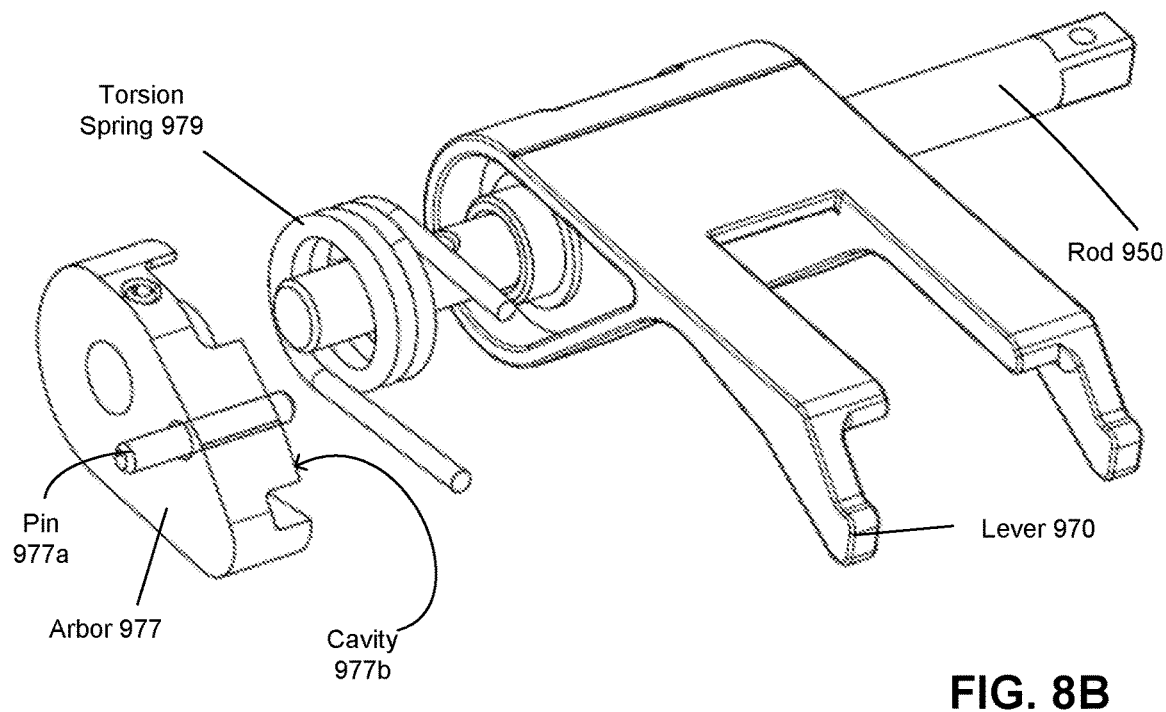

FIG. 12 is a flowchart illustrating a method for changing pedal configuration, in accordance with another embodiment. The method 1100 of FIG. 12 may be performed by an embodiment or variation of the pedal system described above.

The pedal system includes a pedal, a rod rotatably coupled to the pedal, a cuff coupled to the rod, a lever coupled to the rod that controls movement of the cuff, a locking subsystem that causes locking of the cuff, and a trigger coupled to the locking subsystem. The lever transitions 1210 the cuff of the pedal system to a foot retention mode upon engaging the rod coupled to the cuff. Motion of the rod by the lever can occur simultaneously with motion of the trigger (e.g., due to coupling between the rod and the lever in certain directions of motion, as described above). Furthermore, motion of the trigger and/or the lever can occur against a biasing force provided by a torsion spring coupled to the lever and/or trigger and to a surface of the pedal, as described above. As such, a force applied to the trigger and to the lever (e.g., a torsional force) can cause the rod to rotate, thereby changing a position of the cuff. The pedal, rod, cuff, lever, locking subsystem, and trigger can be embodiments or variations of the pedal, rod, cuff, lever, locking subsystem, and trigger described above. Furthermore, as described above, the pedal, rod, cuff, lever, locking subsystem, and trigger can include, be coupled to, or otherwise be associated with bearings, bushings, pins, guides, linear springs, torsional springs, and/or any other suitable elements that constrain motion, guide motion, provide a biasing force, provide a restoring force, and/or affect movement of the elements in any other suitable manner.

Motion of the trigger can also cause locking 1220 of the cuff in the foot retention mode, where a component of the trigger interacts with the locking subsystem to transition the locking subsystem between different states of operation. As described above, the locking subsystem can operate by way of a pawl and a sector gear, where, as the trigger is rotated, a trigger pin coupled to the trigger comes out of contact with a portion of the pawl, allowing teeth of the pawl to come into contact with teeth of the sector gear, thereby allowing the cuff to ratchet toward the user's foot and comfortably compress the user's foot at the pedal.

As described above, locking 1220 of the cuff by the locking subsystem can include locking the cuff in the foot retention mode without exceeding a threshold level of force applied to the user's foot between the cuff and the pedal. Locking without exceeding the threshold force level be implemented in coordination with an arbor coupled to the rod and to the lever, and torsion spring coupled to the arbor and to the lever, where the arbor and torsion spring allows the lever to continue to rotate (e.g., in response to a force applied to the user's foot at the lever) while preventing the cuff from applying beyond a threshold level of force to the foot of the user at the pedal. As such, once a force applied to the user's foot by the cuff and the pedal reaches a certain level, additional forces generated by further rotation of the lever as the user fully steps onto the pedal are absorbed by the torsion spring and the arbor.

As shown in FIG. 12, the pedal system can also transition 1230 the cuff to a foot releasing mode responsive to unlocking the cuff and allowing the cuff to be released from the foot retention mode. Unlocking the cuff can occur in response to an interaction between the trigger and the locking subsystem. In more detail, the trigger pin coupled to the trigger can rapidly push the pawl out of contact with the sector gear as the user removes his or her foot from the pedal, based upon the restoring force provided by the torsion spring coupled to the trigger. Unlocking the locking subsystem can then allow the lever to be rotated back to its baseline position, allowing the cuff to return to a fully open position.

In relation to transitioning 1230 the cuff to the foot releasing mode, unlocking of the cuff can occur rapidly due to features of the pawl. In more detail, a set of teeth of the pawl can include biting edges with different angles (e.g., profile angles or pressure angles) defined by arcs of concentric circles centered about an axis of rotation of the pawl relative to the pedal. A first tooth of the pawl can be associated with a first concentric circle having a first radius, a second tooth can be associated with a second concentric circle having a second radius, and a third tooth can be associated with a third concentric circle having a third radius, where the second radius is longer than the first radius by an incremental length and the third radius is longer than the second radius by the incremental length. The first tooth thus fills a first volume of its corresponding sector gear space, the second tooth fills a second volume (larger than the first volume) of its corresponding sector gear space, and the third tooth fills a third volume (larger than the second volume) of its corresponding sector gear space. This configuration can allow the locking subsystem provided by the pawl and the sector gear to be rapidly released in relation to transitioning 1030 the cuff to the foot releasing mode.

The method 1200 can be performed cyclically, such that the pedal system can be repeatedly transitioned between the foot retention mode and the foot releasing mode any suitable number of times. Furthermore, the methods 1000 and 1100 can be implemented simultaneously, for instance, in response to motion of the trigger performing multiple actions simultaneously (e.g., in interacting with a plunger and a locking subsystem contemporaneously to produce multiple responses in the system).

While embodiments, variations, and examples of pedal systems are described above, the pedal system(s) can additionally or alternatively include any other suitable elements that promote retention and/or release of a foot of a user. Furthermore, sub elements (e.g., sub elements of a trigger, sub elements of a lever, sub elements of a main drive shaft, etc.) described in relation to a main elements above can, in alternative variations, be swapped across other main elements to achieve alternative variations of described mechanisms.

CONCLUSION

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:
1. A pedal system, the system comprising:
a pedal having a top surface configured to come in contact with a sole of footwear;

a main drive shaft secured to the pedal in a rotatable manner, the main drive shaft configured to adjoin to a body of a sport equipment; and a plunger configured to move along an axial direction of the main drive shaft to engage a region of the main drive shaft to prevent rotation of the pedal relative to the main drive shaft in a locked mode, and to disengage the region of the main drive shaft to enable the pedal to rotate relative to the main drive shaft in a released mode.

2. The pedal system of claim 1, wherein the pedal comprises an internal cavity, wherein the internal cavity is defined by the top surface and a pair of side walls extending from the top surface, and wherein the main drive shaft extends through the internal cavity.

3. The pedal system of claim 1, wherein the region of the main drive shaft is configured to interact with a first plunger region of the plunger in the locked mode and is physically separated from the first plunger region in the released mode.

4. The pedal system of claim 3, wherein the first plunger region comprises a first interlocking surface.

5. The pedal system of claim 4, wherein the region of the main drive shaft is coupled to a collar comprising a second interlocking surface that physically contacts the first interlocking surface in the locked mode, thereby preventing rotation of the pedal relative to the main drive shaft.

6. The pedal system of claim 5, wherein the first interlocking surface comprises a first set of teeth configured to interlock with a second set of teeth of the second interlocking surface.

7. The pedal system of claim 2, further comprising a trigger having a first trigger region coupled to a rod retained within the internal cavity, a second trigger region extending through an opening of the top surface in the locked mode, and an active face positioned between the first trigger region and the second trigger region and configured to interact with the plunger.

8. The pedal system of claim 7, wherein the plunger comprises a first plunger arm extending from the plunger and configured to contact the active face of the trigger, and wherein rotation of the trigger about the rod adjusts contact between the active face of the trigger and the first plunger arm and displaces the plunger relative to the region of the main drive shaft.

9. The pedal system of claim 7, wherein the plunger comprises a second plunger region contacting a spring that biases the plunger into engagement with the region of the main drive shaft in the locked mode, and wherein the spring is compressed by rotation of the trigger in transitioning from the locked mode to the released mode.

10. The pedal system of claim 2, wherein the plunger is in communication with a plunger stop retained within the internal cavity of the pedal, and wherein the plunger stop governs a range of translation of the plunger along a pitch axis of the main drive shaft.

11. The pedal system of claim 10, wherein the plunger stop comprises a ridge configured to contact the plunger at a terminal portion of the range of translation.

12. The pedal system of claim 10, wherein the plunger stop comprises a channel to retain the main drive shaft within an internal cavity of the pedal.

13. The pedal system of claim 1, wherein the sport equipment comprises a bicycle, and wherein the main drive shaft is configured to couple to a crank arm of the bicycle.

14. A method for adjusting pedal configuration, the method comprising:

responsive to engaging a region of a main drive shaft of a pedal with a plunger by moving the plunger along a first axial direction of the main drive shaft, placing the pedal in a locked mode to prevent rotation of the pedal relative to the main drive shaft;

responsive to displacing the plunger relative to the region of the main drive shaft, transitioning from the locked mode to a released mode; and responsive to disengaging the region of the main drive shaft from the plunger by moving the plunger along a second axial direction of the main drive shaft that is opposite the first axial direction, placing the pedal in the released mode to enable rotation of the pedal relative to the main drive shaft.

15. The method of claim 14, wherein engaging the region of the main drive shaft comprises translating a first interlocking surface of the plunger into physical contact with a second interlocking surface of a collar positioned at the region of the main drive shaft.

16. The method of claim 15, wherein the first interlocking surface comprises a first set of teeth configured to interlock with a second set of teeth of the second interlocking surface.

17. The method of claim 15, wherein disengaging the region of the main drive shaft comprises translating a first interlocking surface of the plunger into physical separation from a second interlocking surface of the collar positioned at the region of the main drive shaft.

18. The method of claim 14, wherein disengaging the region of the main drive shaft comprises transitioning a spring, coupled to a second region of the plunger, between a first state and a second state.

19. The method of claim 14, wherein disengaging the region of the main drive shaft comprises biasing, with a spring coupled to the plunger, a first plunger arm toward a plunger stop retained within an internal cavity of the pedal.

20. The method of claim 14, wherein disengaging the region of the main drive shaft comprises adjusting an amount of contact between an active face of a trigger and the plunger, wherein the trigger comprises a first trigger region coupled to a rod retained within an internal cavity of the pedal, a second trigger region extending through an opening of a top surface of the pedal, and wherein the active face is positioned between the first trigger region and the second trigger region.

* * * * *